United States Patent [19]
Engel et al.

[11] Patent Number: 6,115,393
[45] Date of Patent: Sep. 5, 2000

[54] NETWORK MONITORING

[75] Inventors: Ferdinand Engel, Northborough; Kendall S. Jones, Newton Center; Kary Robertson, Bedford, all of Mass.; David M. Thompson, Redmond, Wash.; Gerard White, Tyngsborough, Mass.

[73] Assignee: Concord Communications, Inc., Marlboro, Mass.

[21] Appl. No.: 08/505,083

[22] Filed: Jul. 21, 1995

Related U.S. Application Data

[60] Division of application No. 07/761,269, Sep. 17, 1991, abandoned, which is a continuation-in-part of application No. 07/684,695, Apr. 12, 1991, abandoned.

[51] Int. Cl.[7] .................................. H04J 3/16; H04J 3/22
[52] U.S. Cl. ............................................................. 370/469
[58] Field of Search .............................. 370/94.1, 85.13, 370/85.14, 94.2, 110.1, 79, 241, 252, 254, 465, 464, 466, 467, 469; 395/200, 183.15, 189.01, 189.04, 200.54, 285, 831; 371/20.1

[56] References Cited

U.S. PATENT DOCUMENTS

| | | | |
|---|---|---|---|
| 4,648,061 | 3/1987 | Foster | 340/825.06 |
| 4,817,080 | 3/1989 | Soha . | |
| 4,887,260 | 12/1989 | Carden et al. . | |
| 4,930,159 | 5/1990 | Kravitz et al. . | |
| 5,021,949 | 6/1991 | Morten et al. | 364/200 |
| 5,025,491 | 6/1991 | Tsuchiya et al. . | |
| 5,038,345 | 8/1991 | Roth | 340/825.15 |
| 5,060,228 | 10/1991 | Tsutsui et al. | 370/85.13 |
| 5,097,469 | 3/1992 | Douglas . | |
| 5,101,402 | 3/1992 | Chiu et al. . | |
| 5,136,580 | 8/1992 | Videlock et al. | 370/85.13 |
| 5,142,528 | 8/1992 | Kobayashi et al. | 370/79 |
| 5,142,622 | 8/1992 | Owens | 395/200 |
| 5,150,464 | 9/1992 | Sidhu et al. | 395/200 |
| 5,347,524 | 9/1994 | I'Anson et al. | 371/20.1 |

FOREIGN PATENT DOCUMENTS

WO 88/06822  9/1988  WIPO .

OTHER PUBLICATIONS

Hewlett–Packard brochure regarding local area network protocol analyzer (HP 4972A), Jun. 1987.
F. Kaplan et al., "Application of Expert Systems to Transmission Maintenance", IEEE, 1986, pp. 449–453.
D.M. Chiu et al., "Studying the User and Application Behaviour of a Large Network", Jun. 30, 1988, pp. 1–23.
R. Sudama et al., "The Design of a Realtime DECnet Performance Monitor", Jul. 15, 1988, pp. 1–23.
B.L. Hitson, "Knowledge–Based Monitoring and Control: An Approach to Understanding the Behavior of TCP/IP Network Protocols", ACM, 1988, pp. 210–221.
A.T. Dahbura et al., "Formal Methods for Generating Protocol Conformance Test Sequences", Proceedings of the IEEE, vol. 78, No. 8, Aug. 1990, pp. 1317–1326.
Hewlett–Packard Datasheet brochure, "Analyzing TCP/IP Networks with the HP 4972A", Sep. 1989, pp. 1–8.

*Primary Examiner*—Ajit Patel
*Attorney, Agent, or Firm*—Fish & Richardson P.C.

[57] ABSTRACT

Monitoring is done of communications which occur in a network of nodes, each communication being effected by a transmission of one or more packets among two or more communicating nodes, each communication complying with a predefined communication protocol selected from among protocols available in the network. The contents of packets are detected passively and in real time, communication information associated with multiple protocols is derived from the packet contents.

25 Claims, 38 Drawing Sheets

| STATE / EVENT | UNKNOWN | CONNECTING | DATA | CLOSING | CLOSED | INACTIVE |
|---|---|---|---|---|---|---|
| UNKNOWN | | | | | S= UNKNOWN<br>AFTER CLOSE ++ | S= UNKNOWN |
| CONNECT REQ OR CONNECT CNF (E.G. TCP SYN) | S= CONNECTING | CONNECTION RETRY ++ | S= UNKNOWN<br>OUT OF ORDER ++<br>ACTIVE CONN ++ | S= UNKNOWN<br>OUT OF ORDER ++ | S=CONNECTING<br>AFTER CLOSE ++ | S=CONNECTING |
| ABORT (E.G. TCP RST) | S= CLOSED<br>START CLOSE TIMER | S= CLOSED<br>FAILED CONN ++<br>START CLOSE TIMER | S= CLOSED<br>ACTIVE CONN --<br>START CLOSE TIMER | S= CLOSED<br>ACTIVE CONN --<br>START CLOSE TIMER | AFTER CLOSE ++ | S= CLOSED<br>START CLOSE TIMER |
| DATA ACK (E.G. TCP ACK) | LOOK FOR DATA STATE | LOOK FOR DATA STATE | LOOK AT HISTORY | LOOK AT HISTORY | S= UNKNOWN<br>AFTER CLOSE ++ | S= UNKNOWN<br>LOOK FOR DATA STATE |
| RELEASE REQ OR RELEASE CNF (E.G. TCP FIN) | S= CLOSING<br>START CLOSE TIMER | S= CLOSING<br>START CLOSE TIMER | S= CLOSING<br>ACTIVE CONN --<br>START CLOSE TIMER | | S= UNKNOWN<br>AFTER CLOSE ++ | S= CLOSING |
| DATA | LOOK FOR DATA STATE | LOOK FOR DATA STATE | LOOK AT HISTORY | OUT OF ORDER ++ | S= UNKNOWN<br>AFTER CLOSE ++ | S= UNKNOWN<br>LOOK FOR DATA STATE |
| CLOSE TIMER EXPIRES | | | | S= CLOSED | | |
| INACTIVE TIMER EXPIRES | RECYCLE RESOURCES | RECYCLE RESOURCES<br>FAILED CONN ++ | RECYCLE RESOURCES<br>ACTIVE CONN -- | RECYCLE RESOURCES | RECYCLE RESOURCES | RECYCLE RESOURCES |

FIG 8

Data Link

|  | Current | 5 Min. | 15 Min. | 10 Min. Max | 60 Min. Max | Accum.Val. |
|---|---|---|---|---|---|---|
| Frame Rate: | nn,nnn /s | nn,nnn /s | nn,nnn /s | nn,nnn /s | nn,nnn /s | n,nnn,nnn |
| Byte Rate: | nn,nnn /s | nn,nnn /s | nn,nnn /s | nn,nnn /s | nn,nnn /s | n,nnn,nnn |
| Errors: | nnn,nnn | nnn,nnn | nnn,nnn | - | - | n,nnn,nnn |
| Broadcast Frm. Rate: | nn,nnn /s | nn,nnn /s | nn,nnn /s | nn,nnn /s | nn,nnn /s | n,nnn,nnn |
| Multicast Frm. Rate: | nn,nnn /s | nn,nnn /s | nn,nnn /s | nn,nnn /s | nn,nnn /s | n,nnn,nnn |

Off Segment Frames

|  | | | | | | |
|---|---|---|---|---|---|---|
| In: | nnn % | nnn % | nnn % | nnn % | nnn % | n,nnn,nnn |
| Out: | nnn % | nnn % | nnn % | nnn % | nnn % | n,nnn,nnn |
| **Transit: | nnn % | nnn % | nnn % | nnn % | nnn % | n,nnn,nnn |

| Most Active Protocols (Frm. Rate) | | Most Active Nodes (Frm. Rate) | |
|---|---|---|---|
| 1234567890123456 | nnn % | 1234567890123456 | nnn % |
| <protocol> | nnn % | <node> | nnn % |
| <protocol> | nnn % | <node> | nnn % |
| <protocol> | nnn % | <node> | nnn % |
| <protocol> | nnn % | <node> | nnn % |

Total Segment Bandwidth: nnn %          Total Active Dialogs: nn, nnn

|  | Current | 5 Min. | 15 Min. | 10 Min. Max | 60 Min. Max | Accum.Val. |
|---|---|---|---|---|---|---|
| Packet Rate: | nn,nnn /s | nn,nnn /s | nn,nnn /s | nn,nnn /s | nn,nnn /s | n,nnn,nnn |
| Byte Rate: | nn,nnn /s | nn,nnn /s | nn,nnn /s | nn,nnn /s | nn,nnn /s | n,nnn,nnn |
| Errors: | nnn,nnn | nnn,nnn | nnn,nnn | - | - | n,nnn,nnn |
| Broadcast Pkt. Rate: | nn,nnn /s | nn,nnn /s | nn,nnn /s | nn,nnn /s | nn,nnn /s | n,nnn,nnn |
| Multicast Pkt. Rate: | nn,nnn /s | nn,nnn /s | nn,nnn /s | nn,nnn /s | nn,nnn /s | n,nnn,nnn |
| Flow Controls: | nnn,nnn | nnn,nnn | nnn,nnn | - | - | n,nnn,nnn |
| Fragments: | nnn,nnn | nnn,nnn | nnn,nnn | - | - | n,nnn,nnn |

Off Segment Packets

|  | | | | | | |
|---|---|---|---|---|---|---|
| In: | nnn % | nnn % | nnn % | nnn % | nnn % | n,nnn,nnn |
| Out: | nnn % | nnn % | nnn % | nnn % | nnn % | n,nnn,nnn |
| **Transit: | nnn % | nnn % | nnn % | nnn % | nnn % | n,nnn,nnn |

| Most Active Protocols (Pkt. Rate) | | Most Active Nodes (Pkt. Rate) | |
|---|---|---|---|
| 1234567890123456 | nnn % | 1234567890123456 | nnn % |
| <protocol> | nnn % | <node> | nnn % |
| <protocol> | nnn % | <node> | nnn % |
| <protocol> | nnn % | <node> | nnn % |
| <protocol> | nnn % | <node> | nnn % |

Total Segment Bandwidth: nnn %          Total Active Dialogs: nn, nnn

FIG 20B

UDP

| | Current | 5 Min. | 15 Min. | 10 Min. Max | 60 Min. Max | Accum.Val. |
|---|---|---|---|---|---|---|
| Packet Rate: | nn,nnn /s | nn,nnn /s | nn,nnn /s | nn,nnn /s | nn,nnn /s | n,nnn,nnn |
| Byte Rate: | nn,nnn /s | nn,nnn /s | nn,nnn /s | nn,nnn /s | nn,nnn /s | n,nnn,nnn |
| Errors: | nnn,nnn | nnn,nnn | nnn,nnn | - | - | n,nnn,nnn |
| Flow Controls: | nnn,nnn | nnn,nnn | nnn,nnn | - | - | n,nnn,nnn |

Off Segment Packets

| | | | | | | |
|---|---|---|---|---|---|---|
| In: | nnn % | nnn % | nnn % | nnn % | nnn % | n,nnn,nnn |
| Out: | nnn % | nnn % | nnn % | nnn % | nnn % | n,nnn,nnn |
| **Transit: | nnn % | nnn % | nnn % | nnn % | nnn % | n,nnn,nnn |

| Most Active Protocols (Pkt. Rate) | | Most Active Nodes (Pkt. Rate) | |
|---|---|---|---|
| 1234567890123456 | nnn % | 1234567890123456 | nnn % |
| <protocol> | nnn % | <node> | nnn % |
| <protocol> | nnn % | <node> | nnn % |
| <protocol> | nnn % | <node> | nnn % |
| <protocol> | nnn % | <node> | nnn % |

Total Segment Bandwidth: nnn %          Total Active Dialogs: nn, nnn

FIG 20C

TCP

| | Current | 5 Min. | 15 Min. | 10 Min. Max | 60 Min. Max | Accum.Val. |
|---|---|---|---|---|---|---|
| Packet Rate: | nn,nnn /s | nn,nnn /s | nn,nnn /s | nn,nnn /s | nn,nnn /s | n,nnn,nnn |
| Byte Rate: | nn,nnn /s | nn,nnn /s | nn,nnn /s | nn,nnn /s | nn,nnn /s | n,nnn,nnn |
| Errors: | nnn,nnn | nnn,nnn | nnn,nnn | - | - | n,nnn,nnn |
| Flow Controls: | nnn,nnn | nnn,nnn | nnn,nnn | - | - | n,nnn,nnn |
| Retransmissions: | nnn,nnn | nnn,nnn | nnn,nnn | - | - | n,nnn,nnn |

Off Segment Packets

| | | | | | | |
|---|---|---|---|---|---|---|
| In: | nnn % | nnn % | nnn % | nnn % | nnn % | n,nnn,nnn |
| Out: | nnn % | nnn % | nnn % | nnn % | nnn % | n,nnn,nnn |
| **Transit: | nnn % | nnn % | nnn % | nnn % | nnn % | n,nnn,nnn |

| Most Active Protocols (Pkt. Rate) | | Most Active Nodes (Pkt. Rate) | |
|---|---|---|---|
| 1234567890123456 | nnn % | 1234567890123456 | nnn % |
| <protocol> | nnn % | <node> | nnn % |
| <protocol> | nnn % | <node> | nnn % |
| <protocol> | nnn % | <node> | nnn % |
| <protocol> | nnn % | <node> | nnn % |

Total Segment Bandwidth: nnn %          Total Active Connections: nn, nnn

FIG 20D

ICMP

|  | Current | 5 Min. | 15 Min. | 10 Min. Max | 60 Min. Max | Accum.Val. |
|---|---|---|---|---|---|---|
| Packet Rate: | nn,nnn /s | nn,nnn /s | nn,nnn /s | nn,nnn /s | nn,nnn /s | n,nnn,nnn |
| Byte Rate: | nn,nnn /s | nn,nnn /s | nn,nnn /s | nn,nnn /s | nn,nnn /s | n,nnn,nnn |
| Errors: | nnn,nnn | nnn,nnn | nnn,nnn | - | - | n,nnn,nnn |

Off Segment Packets

|  | | | | | | |
|---|---|---|---|---|---|---|
| In: | nnn % | nnn % | nnn % | nnn % | nnn % | n,nnn,nnn |
| Out: | nnn % | nnn % | nnn % | nnn % | nnn % | n,nnn,nnn |
| **Transit: | nnn % | nnn % | nnn % | nnn % | nnn % | n,nnn,nnn |

ICMP Types Seen (Count)

| Address Mask: nnn,nnn | Redirect: nnn,nnn |
|---|---|
| Dst. Unreachable: nnn,nnn | Source Quench: nnn,nnn |
| Echo: nnn,nnn | Time Exceeded: nnn,nnn |
| Param. Problem: nnn,nnn | Time Stamp: nnn,nnn |

Most Active Nodes (Pkt. Rate)

| 1234567890123456 | nnn % |
|---|---|
| <node> | nnn % |
| <node> | nnn % |
| <node> | nnn % |
| <node> | nnn % |

Total Segment Bandwidth:   nnn %

FIG 20E

NFS

|  | Current | 5 Min. | 15 Min. | 10 Min. Max | 60 Min. Max | Accum.Val. |
|---|---|---|---|---|---|---|
| Packet Rate: | nn,nnn /s | nn,nnn /s | nn,nnn /s | nn,nnn /s | nn,nnn /s | n,nnn,nnn |
| Byte Rate: | nn,nnn /s | nn,nnn /s | nn,nnn /s | nn,nnn /s | nn,nnn /s | n,nnn,nnn |
| Errors: | nnn,nnn | nnn,nnn | nnn,nnn | - | - | n,nnn,nnn |
| Flow Controls: | nnn,nnn | nnn,nnn | nnn,nnn | - | - | n,nnn,nnn |

Off Segment Packets

|  | | | | | | |
|---|---|---|---|---|---|---|
| In: | nnn % | nnn % | nnn % | nnn % | nnn % | n,nnn,nnn |
| Out: | nnn % | nnn % | nnn % | nnn % | nnn % | n,nnn,nnn |
| **Transit: | nnn % | nnn % | nnn % | nnn % | nnn % | n,nnn,nnn |

Most Active Nodes (Pkt. Rate)

| 1234567890123456 | nnn % |
|---|---|
| <node> | nnn % |
| <node> | nnn % |
| <node> | nnn % |
| <node> | nnn % |

Total Segment Bandwidth:   nnn %          Total Active Dialogs:  nn, nnn

FIG 20F

Arp/Rarp

|  | Current | 5 Min. | 15 Min. | 10 Min. Max | 60 Min. Max | Accum.Val. |
|---|---|---|---|---|---|---|
| Packet Rate: | nn,nnn /s | nn,nnn /s | nn,nnn /s | nn,nnn /s | nn,nnn /s | n,nnn,nnn |
| Byte Rate: | nn,nnn /s | nn,nnn /s | nn,nnn /s | nn,nnn /s | nn,nnn /s | n,nnn,nnn |
| Errors: | nnn,nnn | nnn,nnn | nnn,nnn | - | - | n,nnn,nnn |

Off Segment Packets

|  | | | | | | |
|---|---|---|---|---|---|---|
| In: | nnn % | nnn % | nnn % | nnn % | nnn % | n,nnn,nnn |
| Out: | nnn % | nnn % | nnn % | nnn % | nnn % | n,nnn,nnn |
| **Transit: | nnn % | nnn % | nnn % | nnn % | nnn % | n,nnn,nnn |

Most Active Nodes (Pkt. Rate)

| | |
|---|---|
| 1234567890123456 | nnn % |
| <node> | nnn % |
| <node> | nnn % |
| <node> | nnn % |
| <node> | nnn % |

Total Segment Bandwidth: nnn %

FIG 20G

| Start Time | Last Seen | Dir. | Partner Node | Protocols | Packets Summary Rate | % | Count | Errors |
|---|---|---|---|---|---|---|---|---|
| hh:mm:ss | hh:mm:ss | 1234 | 1234567890123456 | 1234567890123456 | nn,nnn /s | nnn % | n,nnn,nnn | nnn,nnn |
| 10:23:04 | 15:31:47 | To | robin | XNS,XEROX-PUP | 325 /s | 6% | 2,641 | 0 |
| 07:21:38 | 13:25:51 | From | hawk | DOD-IP, X25 BBN-SIMNET | 87 /s | 3% | 127 | 1 |
| 10/31/90 | 08:22:30 | ? | hawk | APPLETALK | 13 /s | 1% | 24,192 | 4 |

FIG 21

|      | Seg1                     | Seg2                     | Seg3                     | ........ | Segn                     |
|------|--------------------------|--------------------------|--------------------------|----------|--------------------------|
| Seg1 |                          | frame<br>byte<br>error   | frame<br>byte<br>error   |          | frame<br>byte<br>error   |
| Seg2 | frame<br>byte<br>error   |                          | frame<br>byte<br>error   |          | frame<br>byte<br>error   |
| Seg3 | frame<br>byte<br>error   | frame<br>byte<br>error   |                          |          | frame<br>byte<br>error   |
| ⋮    |                          |                          |                          |          |                          |
| Segn | frame<br>byte<br>error   | frame<br>byte<br>error   | frame<br>byte<br>error   | ........ |                          |

| DIALOG | ENTRY TYPE | START TIME | AVERAGE TRANSACTION TIME |
|---|---|---|---|
|  |  |  |  |
|  |  |  |  |
|  |  |  |  |
|  |  |  |  |
|  |  |  |  |

FIG 34

NETWORK MONITORING

CROSS REFERENCE TO RELATED APPLICATION

This is a divisional of application Ser. No. 07/761,269 filed on Sep. 17, 1991, now abandoned, which is a continuation-in-part of U.S. patent application, Ser. No. 07/684,695, filed Apr. 12, 1991, now abandoned.

REFERENCE TO MICROFICHE APPENDIX

A Microfiche Appendix containing fourteen microfiche accompanies this patent application pursuant to 37 CFR §1.96(b) and is designated as Appendix VI. The first thirteen microfiche each contain 49 frames and the fourteenth microfiche contains 18 frames.

BACKGROUND OF THE INVENTION

The invention relates to monitoring and managing communication networks for computers.

Today's computer networks are large complex systems with many components from a large variety of vendors. These networks often span large geographic areas ranging from a campus-like setting to world wide networks. While the network itself can be used by many different types of organizations, the purpose of these networks is to move information between computers. Typical applications are electronic mail, transaction processing, remote database, query, and simple file transfer. Usually, the organization that has installed and is running the network needs the network to be running properly in order to operate its are various controls provided by the different equipment to control and manage the network. Network management is the task of planning, engineering, securing and operating a network.

To manage the network properly, the Network Manager has some obvious needs. First, the Network Manager must trouble shoot problems. As the errors develop in a running network, the Network Manager must have some tools that notify him of the errors and allow him to diagnose and repair these errors. Second, the Network Manager needs to configure the network in such a manner that the network loading characteristics provide the best service possible for the network users. To do this the Network Manager must have tools that allow him visibility into access patterns, bottlenecks and general loading. With such data, the Network Manager can reconfigure the network components for better service.

There are many different components that need to be managed in the network. These elements can be, but are not limited to: routers, bridges, PC's, workstations, minicomputers, supercomputers, printers, file servers, switches and pbx's. Each component provides a protocol for reading and writing the management variables in the machine. These variables are usually defined by the component vendor and are usually referred to as a Management Information Base (MIB). There are some standard MIB's, such as the IETF (Internet Engineering Task Force) MIB I and MIB II standard definitions. Through the reading and writing of MIB variables, software in other computers can manage or control the component. The software in the component that provides remote access to the MIB variables is usually called an agent. Thus, an individual charged with the responsibility of managing a large network often will use various tools to manipulate the MIB's of various agents on the network.

Unfortunately, the standards for accessing MIBs are not yet uniformly provided nor are the MIB definitions complete enough to manage an entire network. The Network Manager must therefore use several different types of computers to access the agents in the network. This poses a problem, since the errors occurring on the network will tend to show up in different computers and the Network Manager must therefore monitor several different screens to determine if the network is running properly. Even when the Network Manager is able to accomplish this task, the tools available are not sufficient for the Network Manager to function properly.

Furthermore, there are many errors and loadings on the network that are not reported by agents. Flow control problems, retransmissions, on-off segment loading, network capacities and utilizations are some of the types of data that are not provided by the agents. Simple needs like charging each user for actual network usage are impossible.

SUMMARY OF THE INVENTION

In general, in one aspect, the invention features monitoring communications which occur in a network of nodes, each communication being effected by a transmission of one or more packets among two or more communicating nodes, each communication complying with a predefined communication protocol selected from among protocols available in the network. The contents of packets are detected passively and in real time, communication information associated with multiple protocols is derived from the packet contents.

Preferred embodiments of the invention include the following features. The communication information derived from the packet contents is associated with multiple layers of at least one of the protocols.

In general, in another aspect, the invention features monitoring communication dialogs which occur in a network of nodes, each dialog being effected by a transmission of one or more packets among two or more communicating nodes, each dialog complying with a predefined communication protocol selected from among protocols available in the network. Information about the states of dialogs occurring in the network and which comply with different selected protocols available in the network is derived from the packet contents.

Preferred embodiments of the invention include the following features. A current state is maintained for each dialog, and the current state is updated in response to the detected contents of transmitted packets. For each dialog, a history of events is maintained based on information derived from the contents of packets, and the history of events is analyzed to derive information about the dialog. The analysis of the history includes counting events and gathering statistics about events. The history is monitored for dialogs which are inactive, and dialogs which have been inactive for a predetermined period of time are purged. For example, the current state is updated to data state in response to observing the transmission of at least two data related packets from each node. Sequence numbers of data related packets stored in the history of events are analyzed and retransmissions are detected based on the sequence numbers. The current state is updated based on each new packet associated with the dialog; if an updated current state cannot be determined, information about prior packets associated with the dialog is consulted as an aid in updating the state. The history of events may be searched to identify the initiator of a dialog.

The full set of packets associated with a dialog up to a point in time completely define a true state of the dialog at that point in time, and the step of updating the current state in response to the detected contents of transmitted packets includes generating a current state (e.g., "unknown") which may not conform to the true state. The current state may be updated to the true state based on information about prior packets transmitted in the dialog.

Each communication may involve multiple dialogs corresponding to a specific protocol. Each protocol layer of the communication may be parsed and analyzed to isolate each dialog and statistics may be kept for each dialog. The protocols may include a connectionless-type protocol in which the state of a dialog is implicit in transmitted packets, and the step of deriving information about the states of dialogs includes inferring the states of the dialogs from the packets. Keeping statistics for protocol layers may be temporarily suspended when parsing and statistics gathering is not rapid enough to match the rate of packets to be parsed.

In general, in another aspect, the invention features monitoring the operation of the network with respect to specific items of performance during normal operation, generating a model of the network based on the monitoring, and setting acceptable threshold levels for the specific items of performance based on the model. In preferred embodiments, the operation of the network is monitored with respect to the specific items of performance during periods which may include abnormal operation.

In general, in another aspect, the invention features the combination of a monitor connected to the network medium for passively, and in real time, monitoring transmitted packets and storing information about dialogs associated with the packets, and a workstation for receiving the information about dialogs from the monitor and providing an interface to a user. In preferred embodiments, the workstation includes means for enabling a user to observe events of active dialogs.

In general, in another aspect, the invention features apparatus for monitoring packet communications in a network of nodes in which communications may be in accordance with multiple protocols. The apparatus includes a monitor connected to a communication medium of the network for passively, and in real time, monitoring transmitted packets of different protocols and storing information about communications associated with the packets, the communications being in accordance with different protocols, and a workstation for receiving the information about the communications from the monitor and providing an interface to a user. The monitor and the workstation include means for relaying the information about multiple protocols with respect to communication in the different protocols from the monitor to the workstation in accordance with a single common network management protocol.

In general, in another aspect, the invention features diagnosing communication problems between two nodes in a network of nodes interconnected by links. The operation of the network is monitored with respect to specific items of performance during normal operation. A model of normal operation of the network is generated based on the monitoring. Acceptable threshold levels are set for the specific items of performance based on the model. The operation of the network is monitored with respect to the specific items of performance during periods which may include abnormal operation. When abnormal operation of the network with respect to communication between the two nodes is detected, the problem is diagnosed by separately analyzing the performance of each of the nodes and each of the links connecting the two nodes to isolate the abnormal operation.

In general, in another aspect, the invention features a method of timing the duration of a transaction of interest occurring in the course of communication between nodes of a network, the beginning of the transaction being defined by the sending of a first packet of a particular kind from one node to the other, and the end of the transaction being defined by the sending of another packet of a particular kind between the nodes. In the method, packets transmitted in the network are monitored passively and in real time. The beginning time of the transaction is determined based on the appearance of the first packet. A determination is made of when the other packet has been transmitted. The timing of the duration of the transaction is ended upon the appearance of the other packet.

In general, in another aspect, the invention features, tracking node address to node name mappings in a network of nodes of the kind in which each node has a possibly nonunique node name and a unique node address within the network and in which node addresses can be assigned and reassigned to node names dynamically using a name binding protocol message incorporated within a packet. In the method, packets transmitted in the network are monitored, and a table linking node names to node addresses is updated based on information contained in the name binding protocol messages in the packets.

One advantage of the invention is that it enables a network manager to passively monitor multi-protocol networks at multiple layers of the communications. In addition, it organizes and presents network performance statistics in terms of dialogs which are occurring at any desired level of the communication. This technique of organizing and displaying network performance statistics provides an effective and useful view of network performance and facilitates a quick diagnosis of network problems.

Other advantages and features will become apparent from the following description of the preferred embodiment and from the claims.

DESCRIPTION OF THE PREFERRED EMBODIMENTS

Figure 7A:
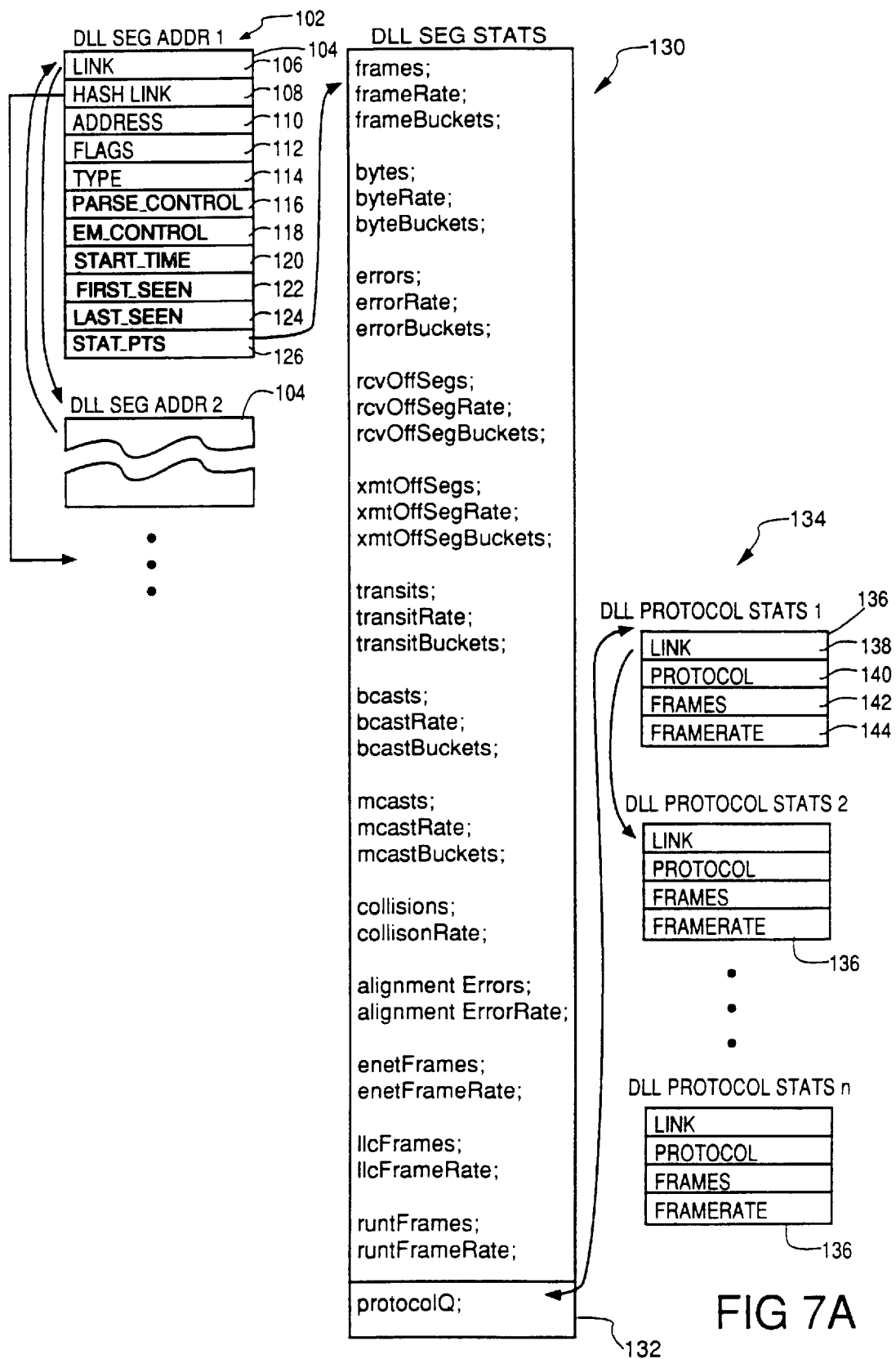
Figure 7B:
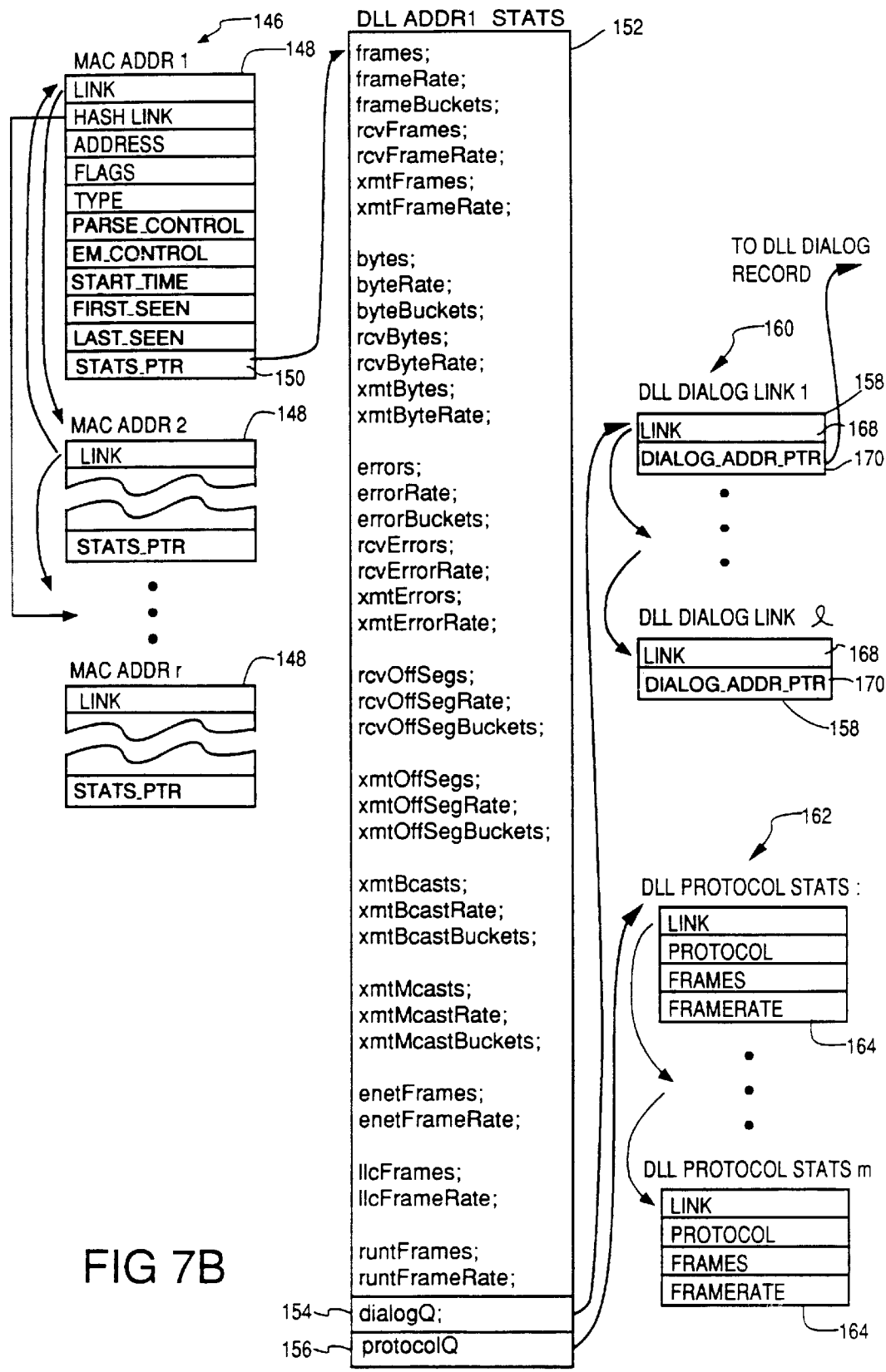
Figure 7C:
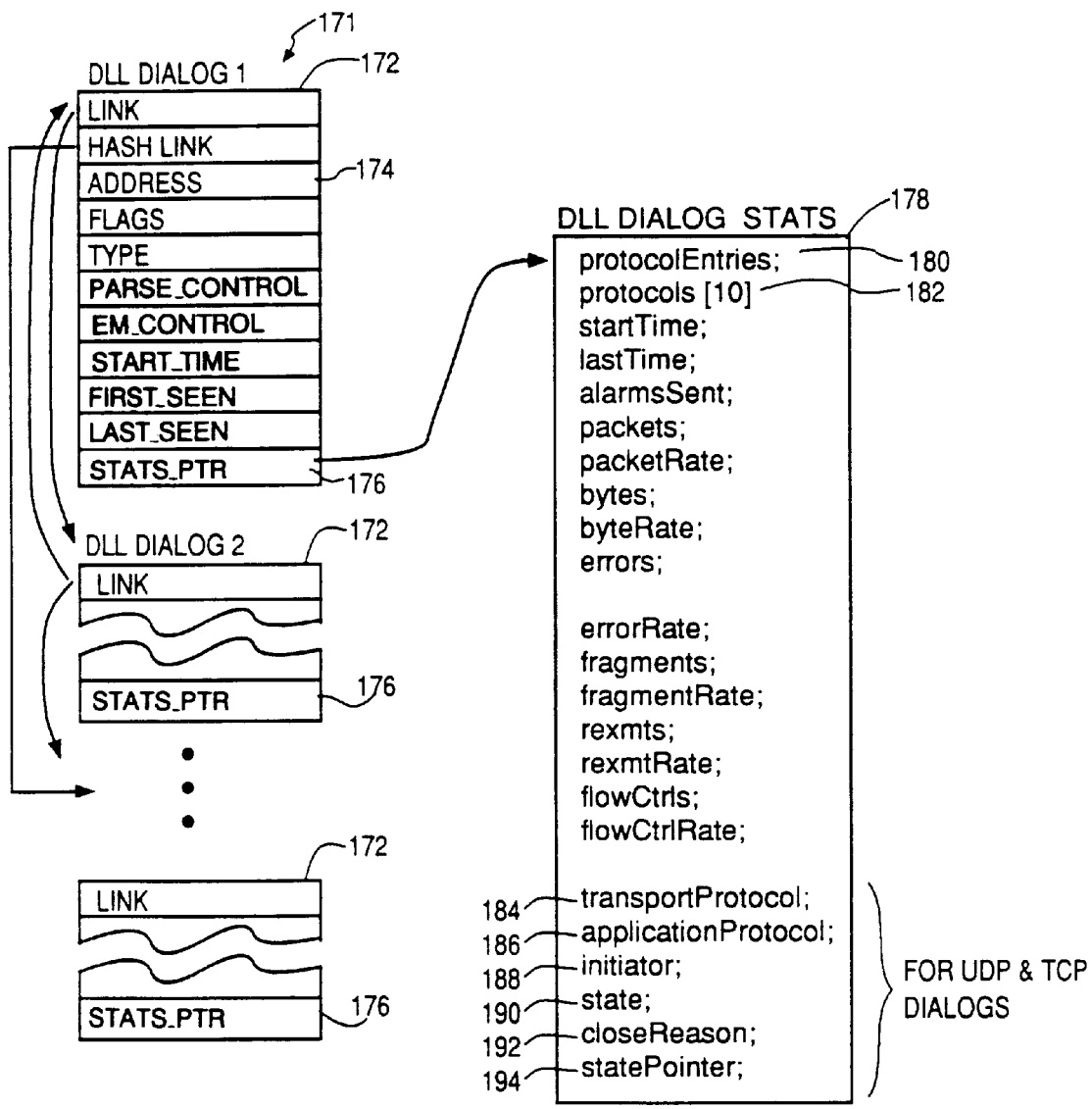
Figure 9A:
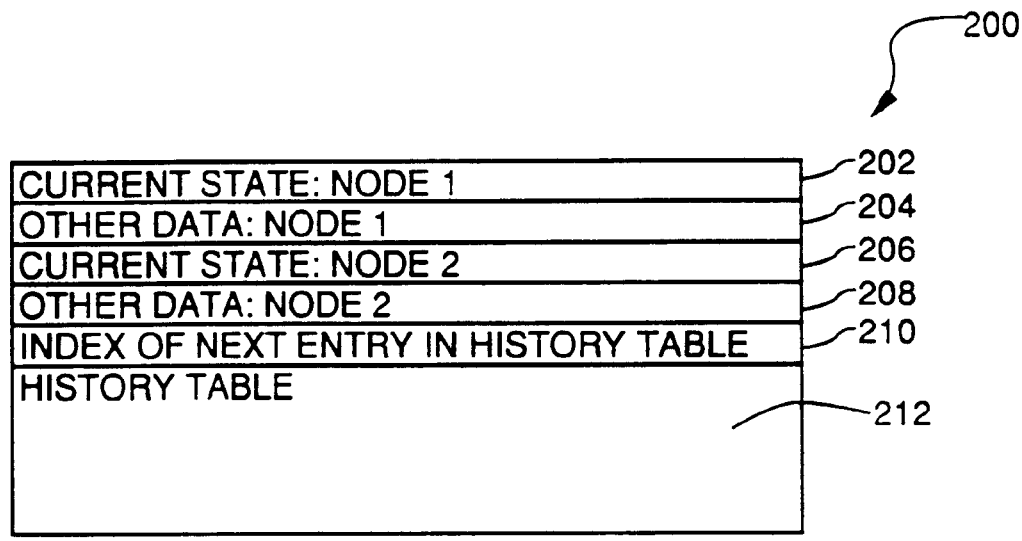
Figure 9B:
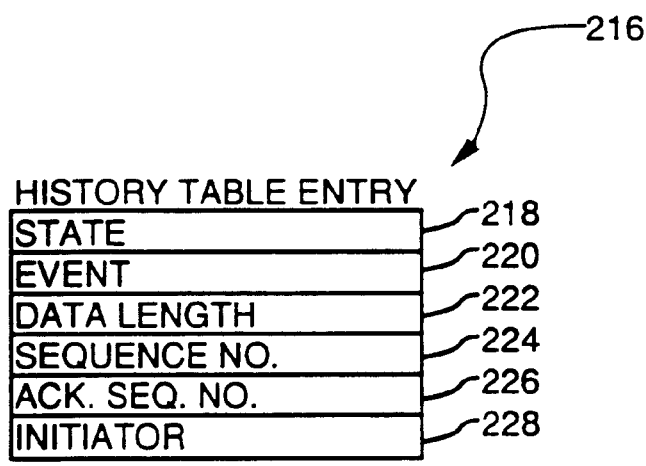
Figure 10:
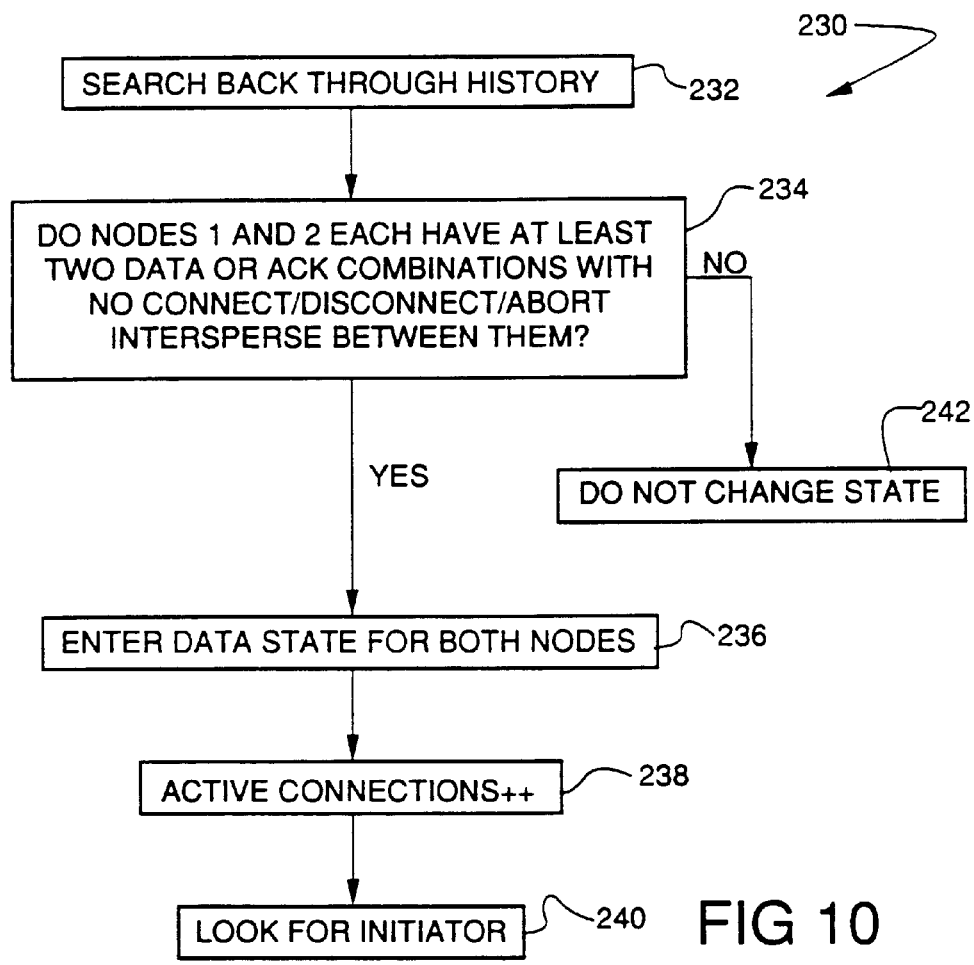
Figure 11:
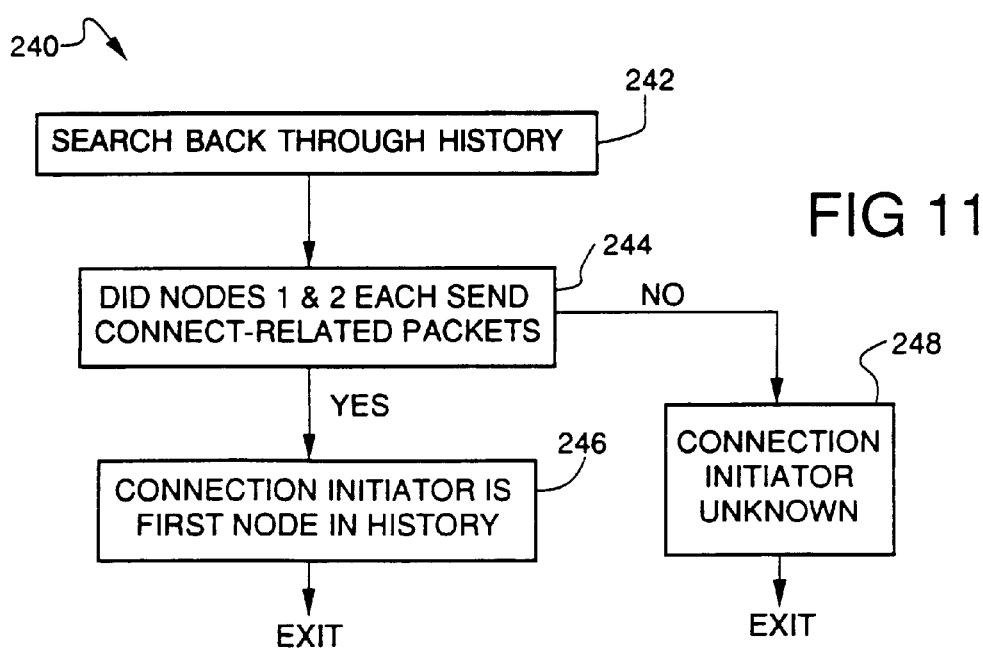
Figure 12:
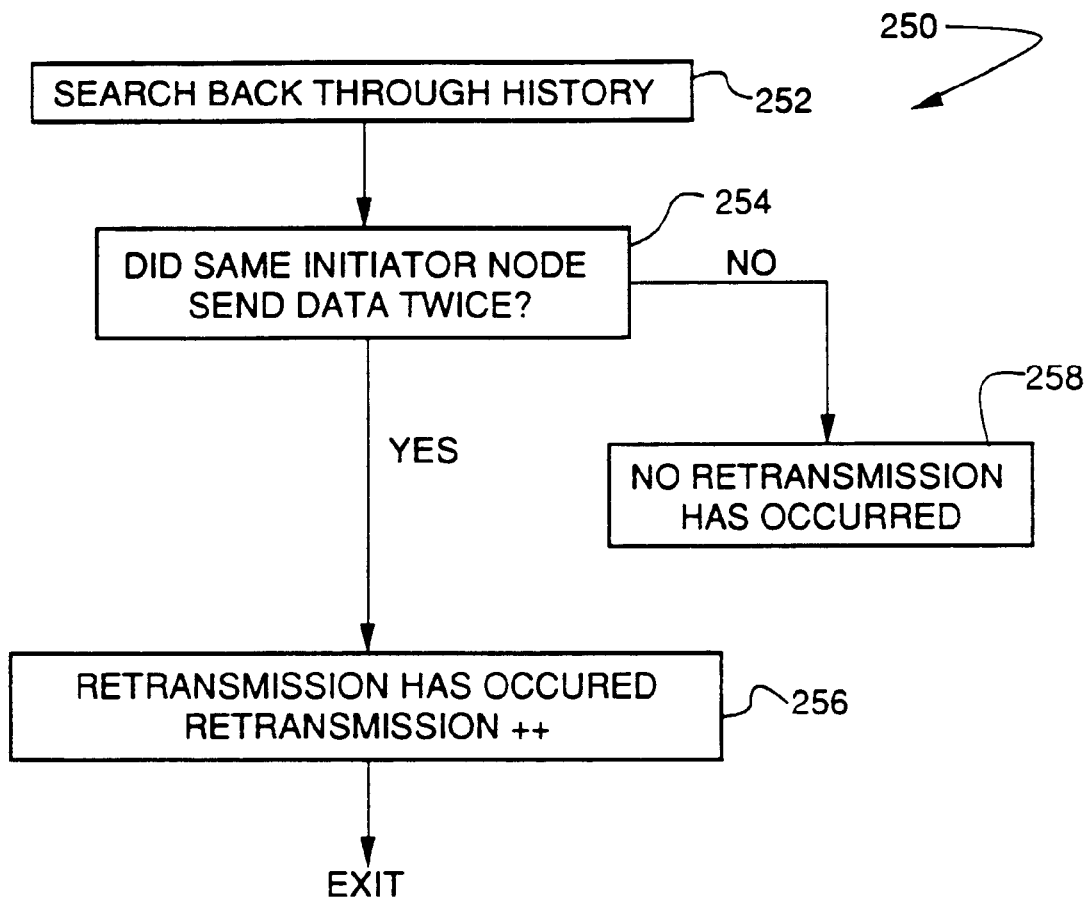
Figure 13:
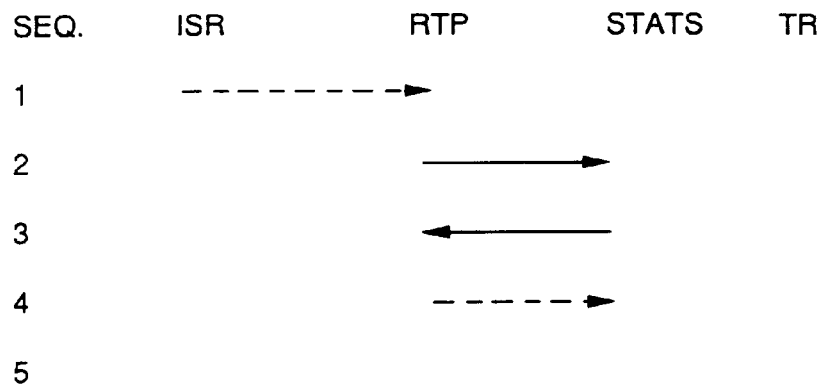
Figure 14:
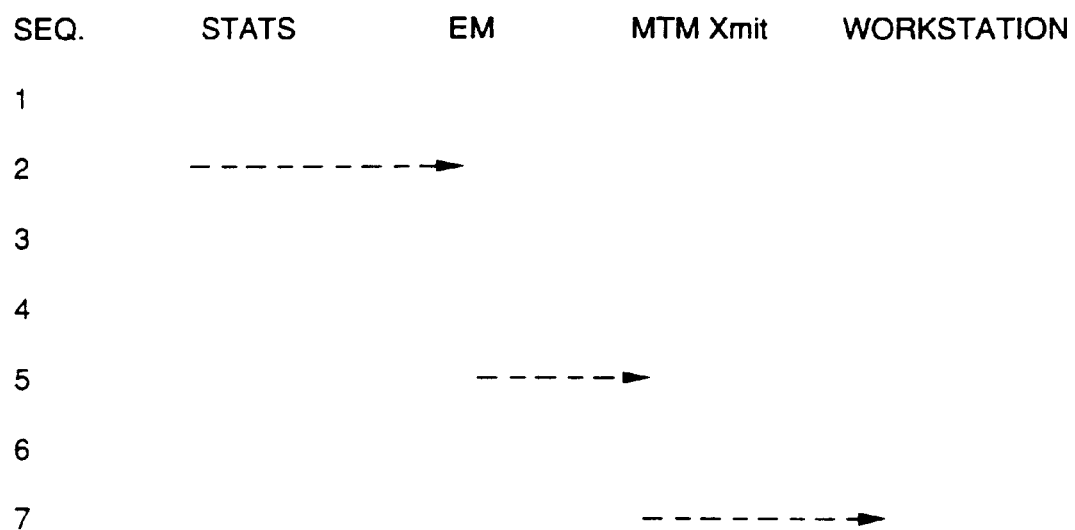
Figure 15:
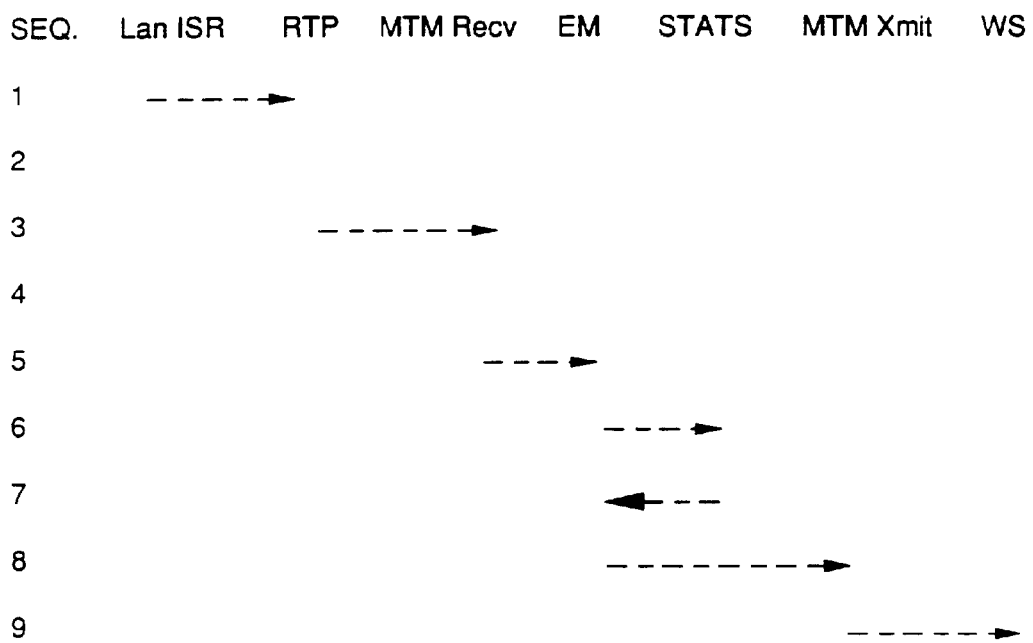
Figure 16:
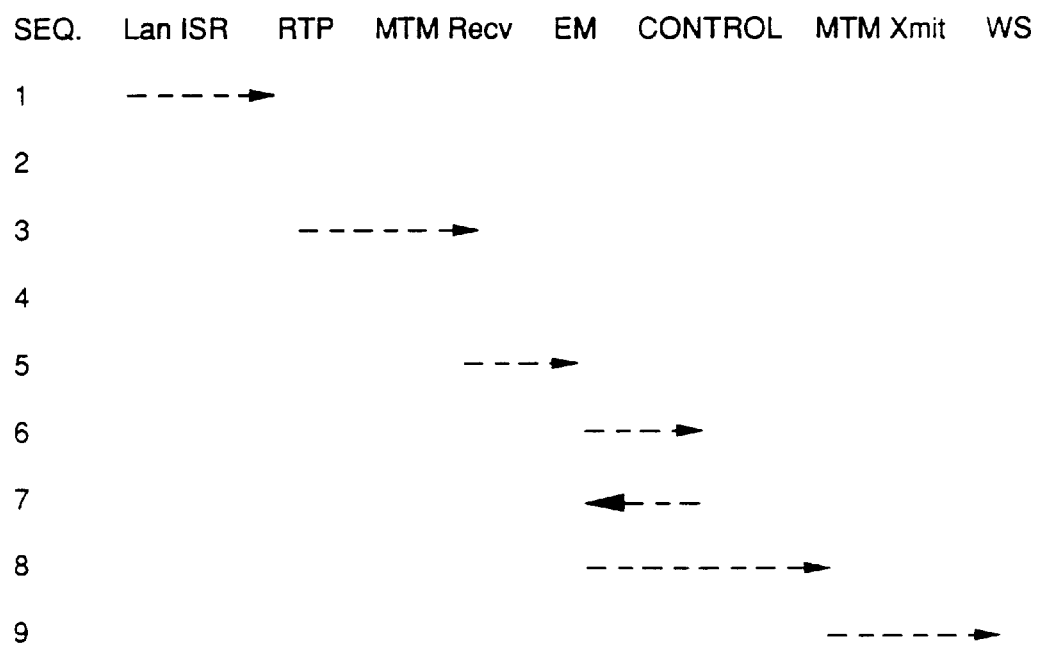
Figure 17:
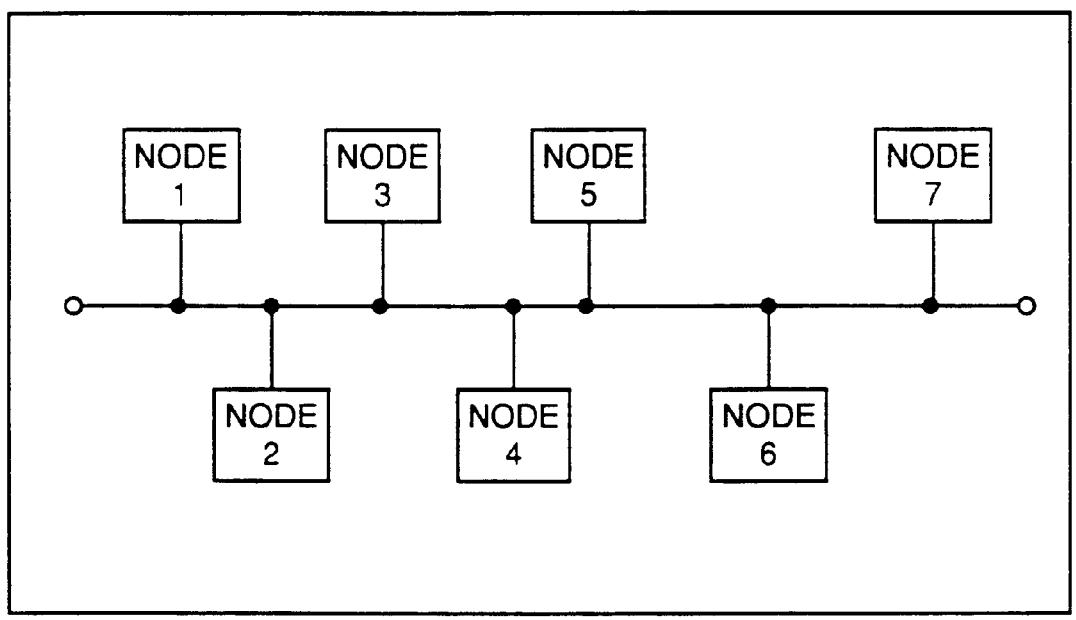
Figure 18:
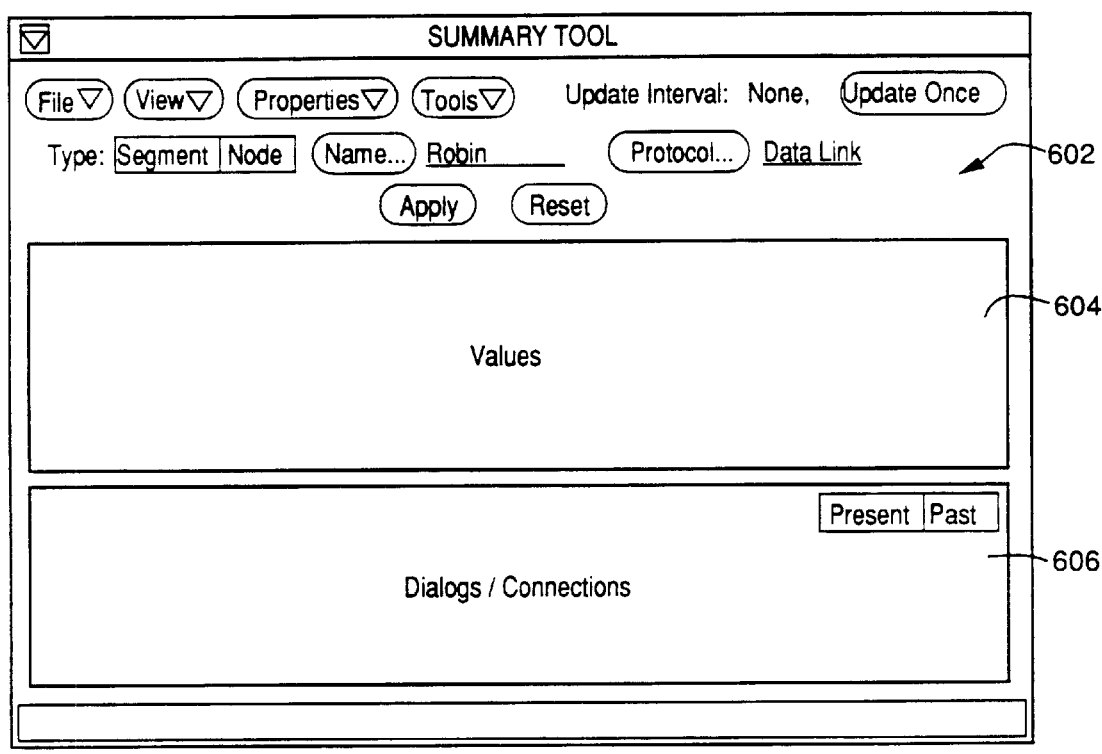
Figure 19:
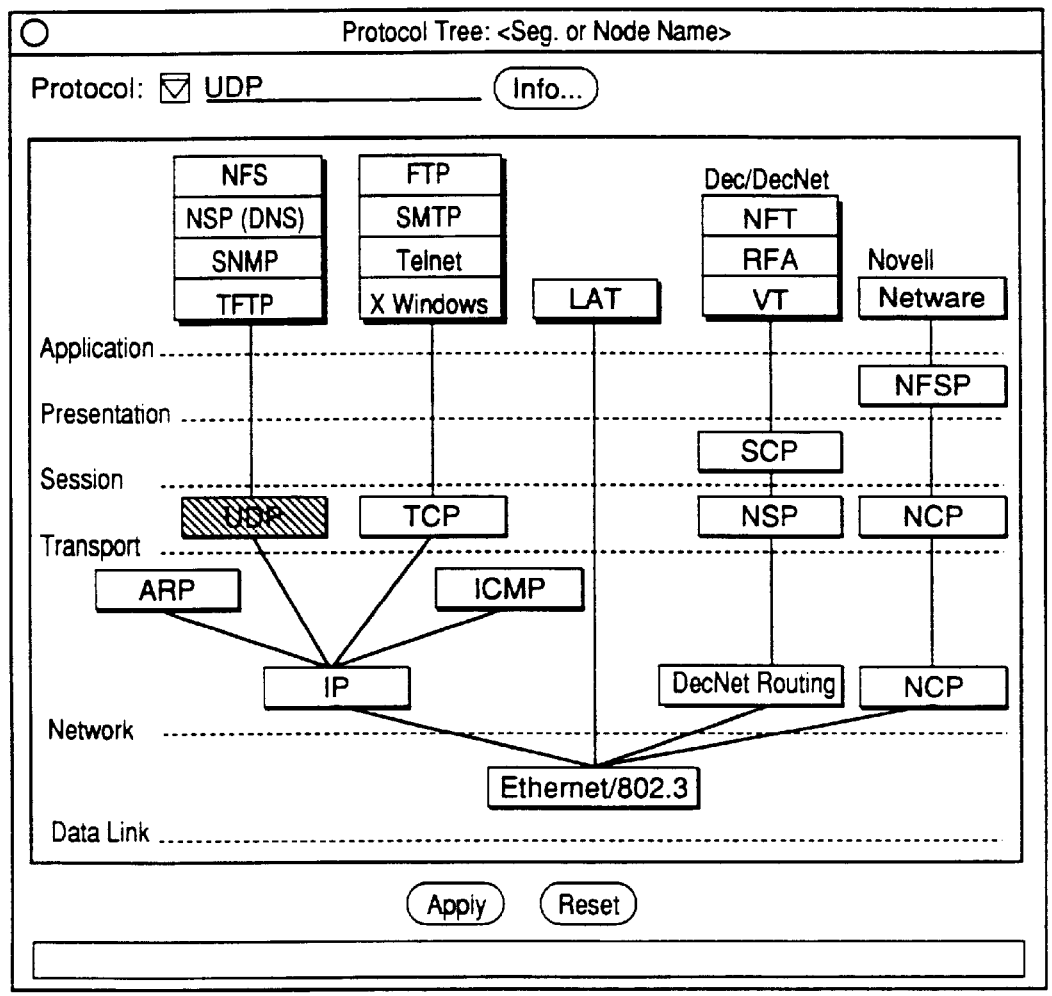
Figure 22:
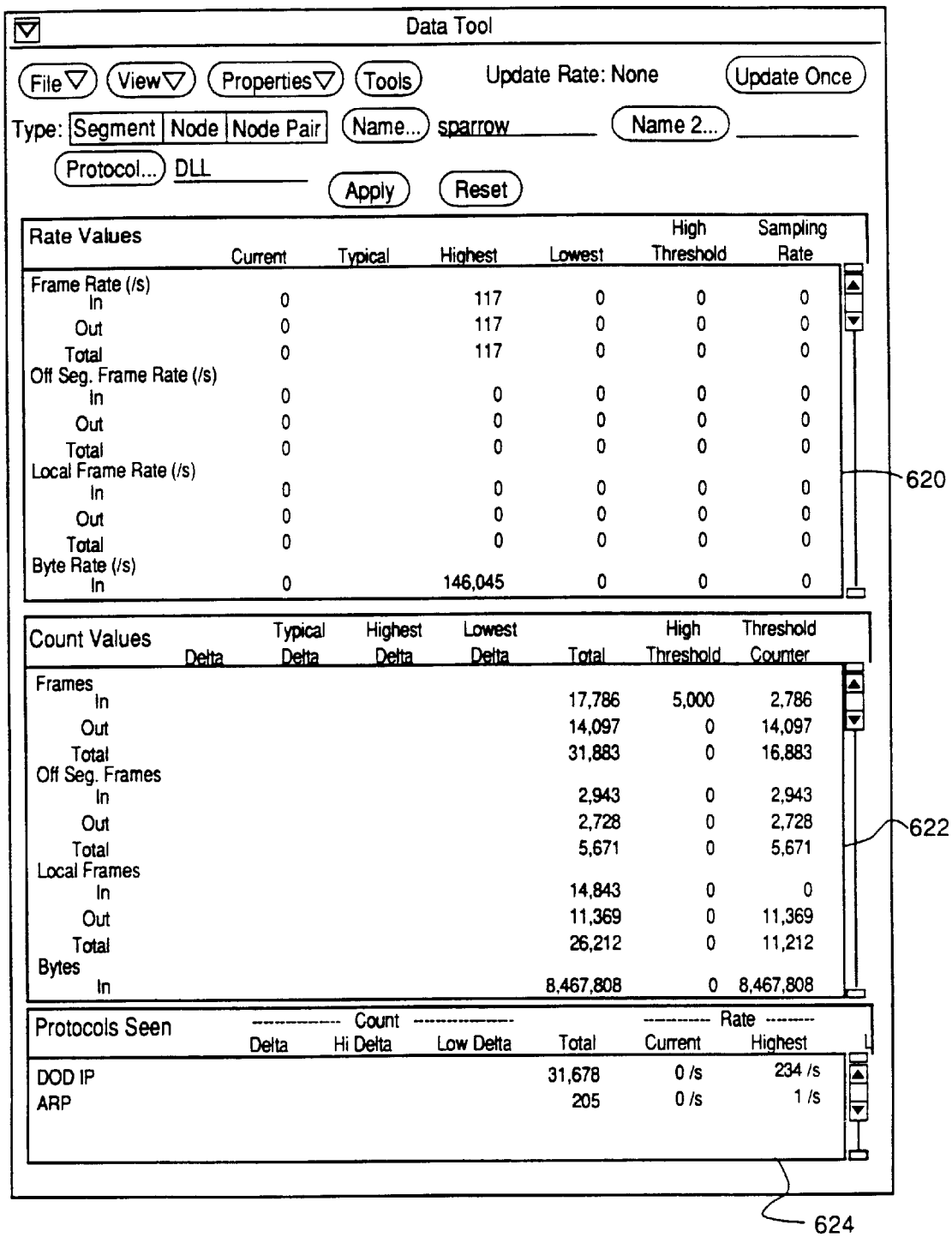
Figure 24:
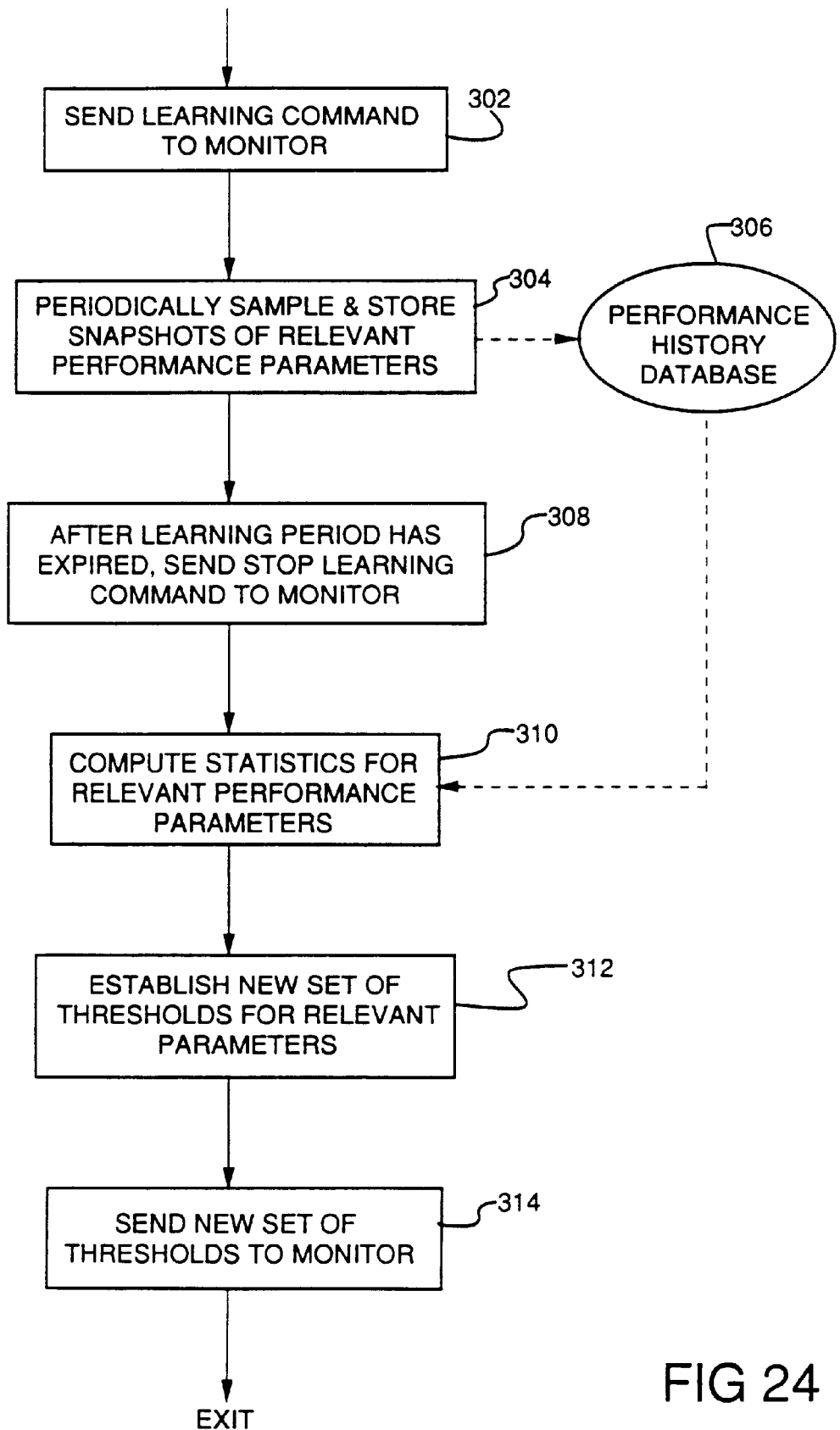
Figure 25:
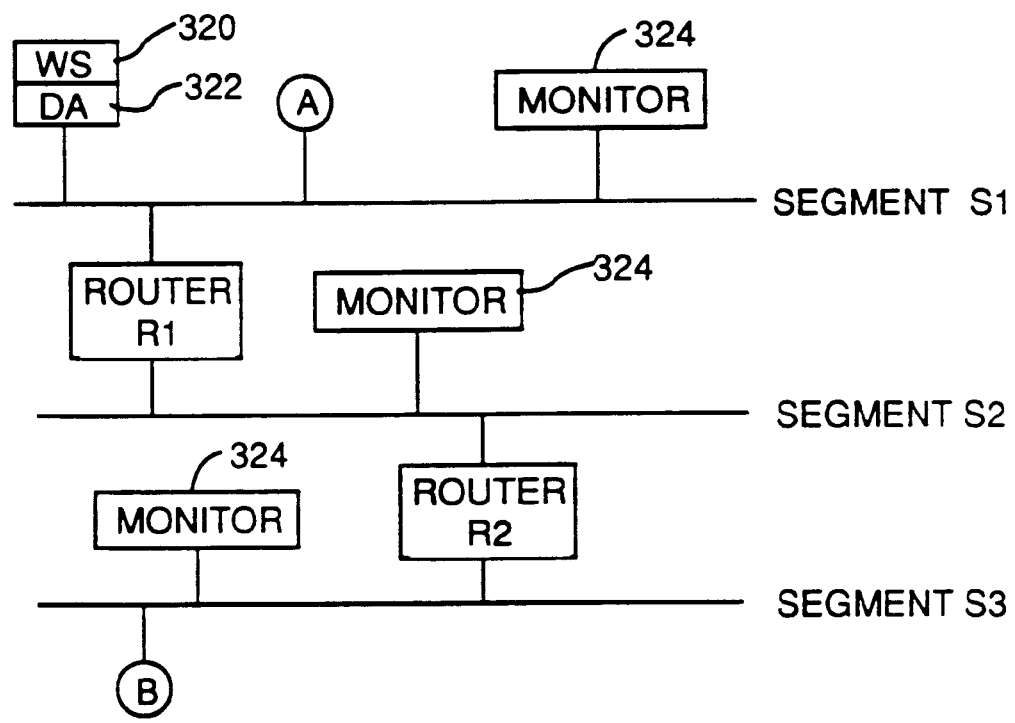
Figure 26:
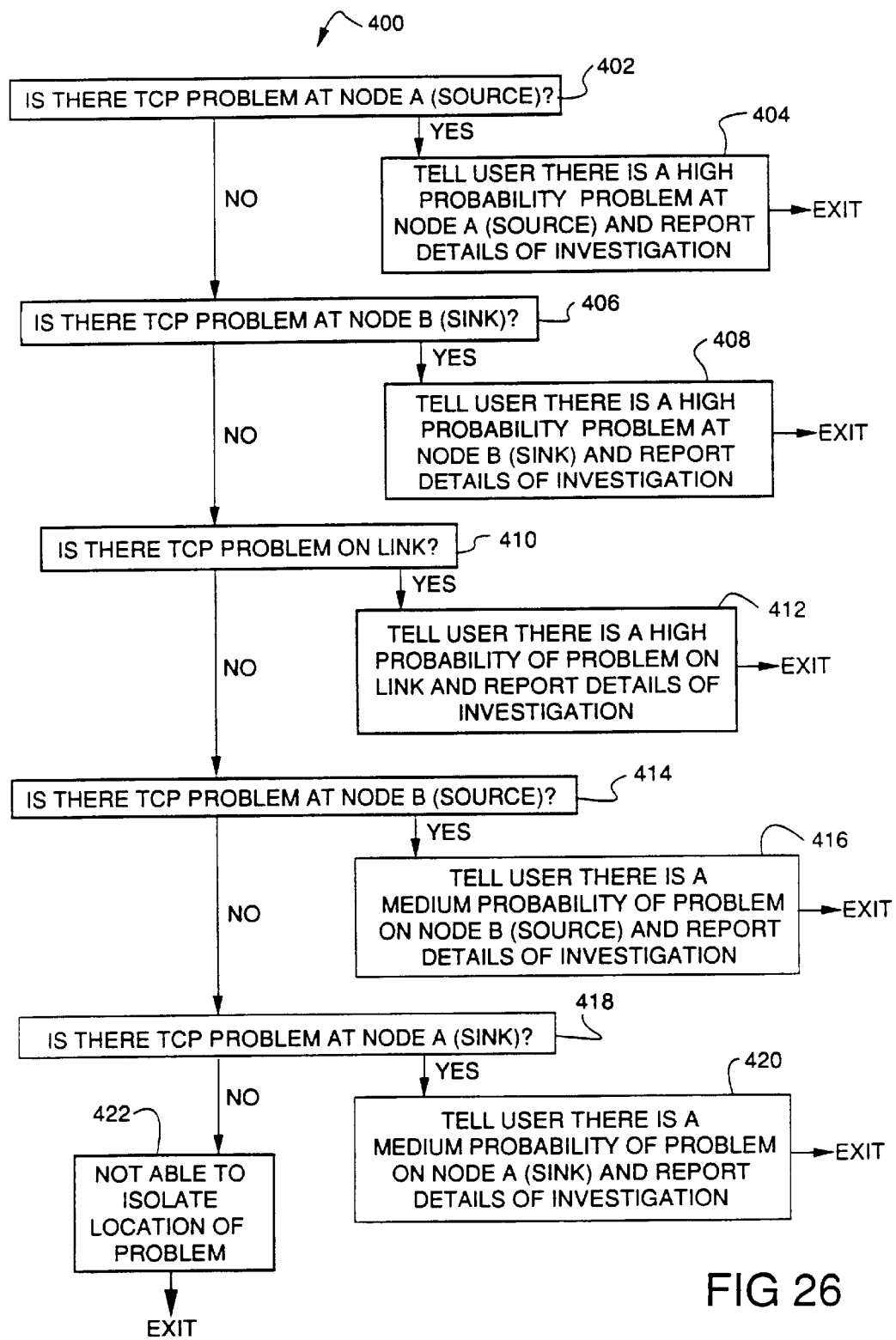
Figure 27:
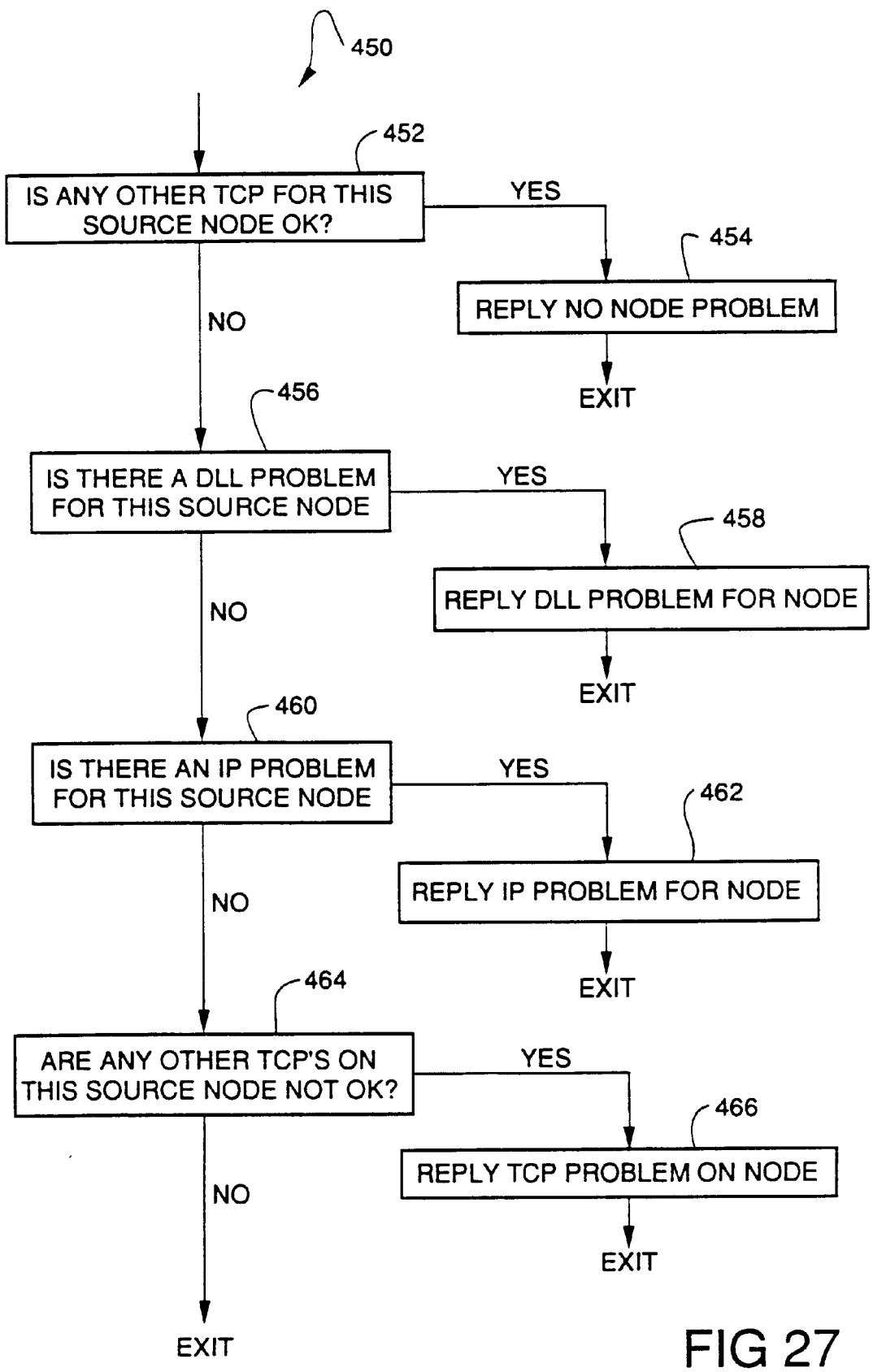
Figure 28:
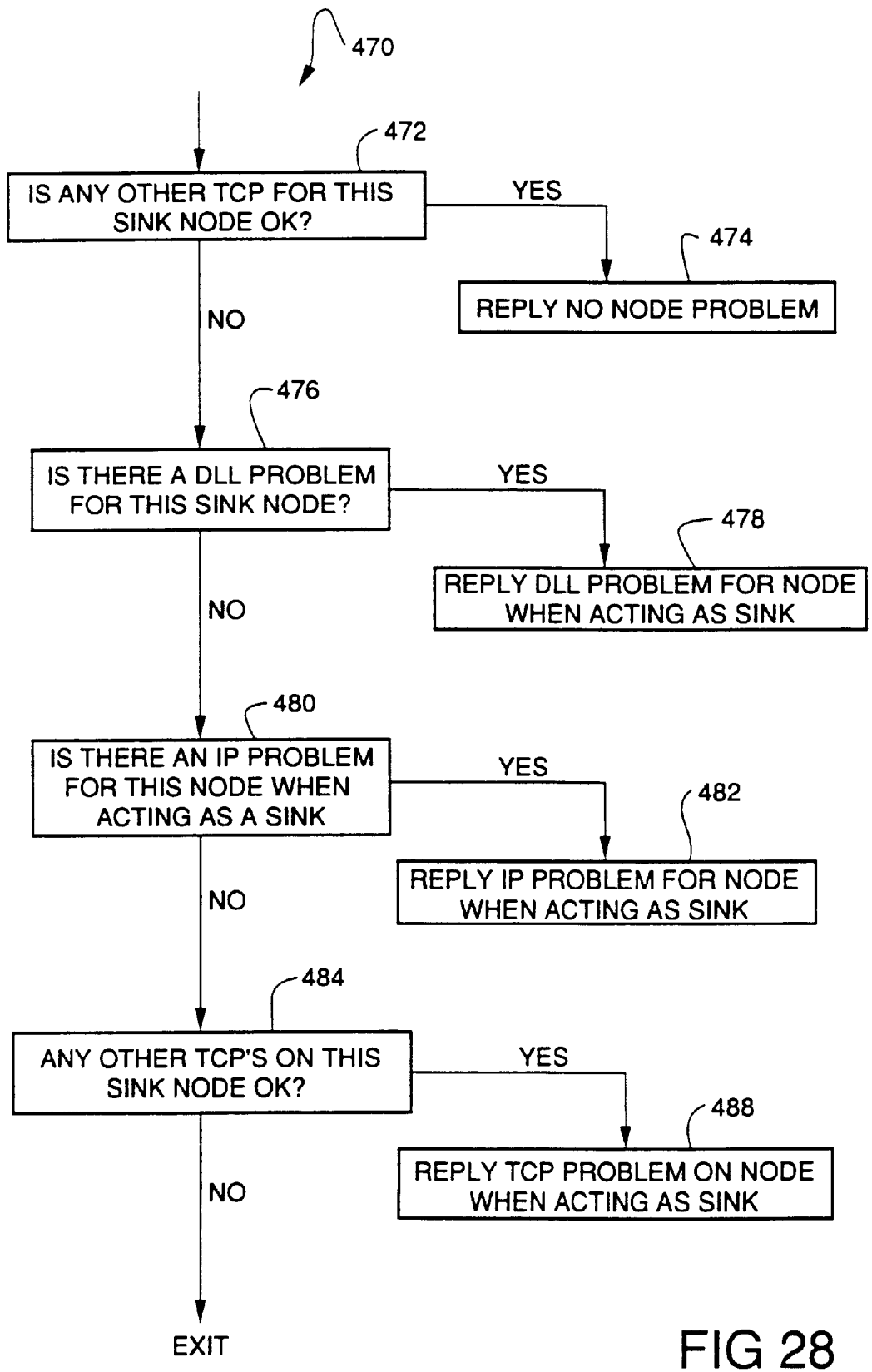
Figure 29:
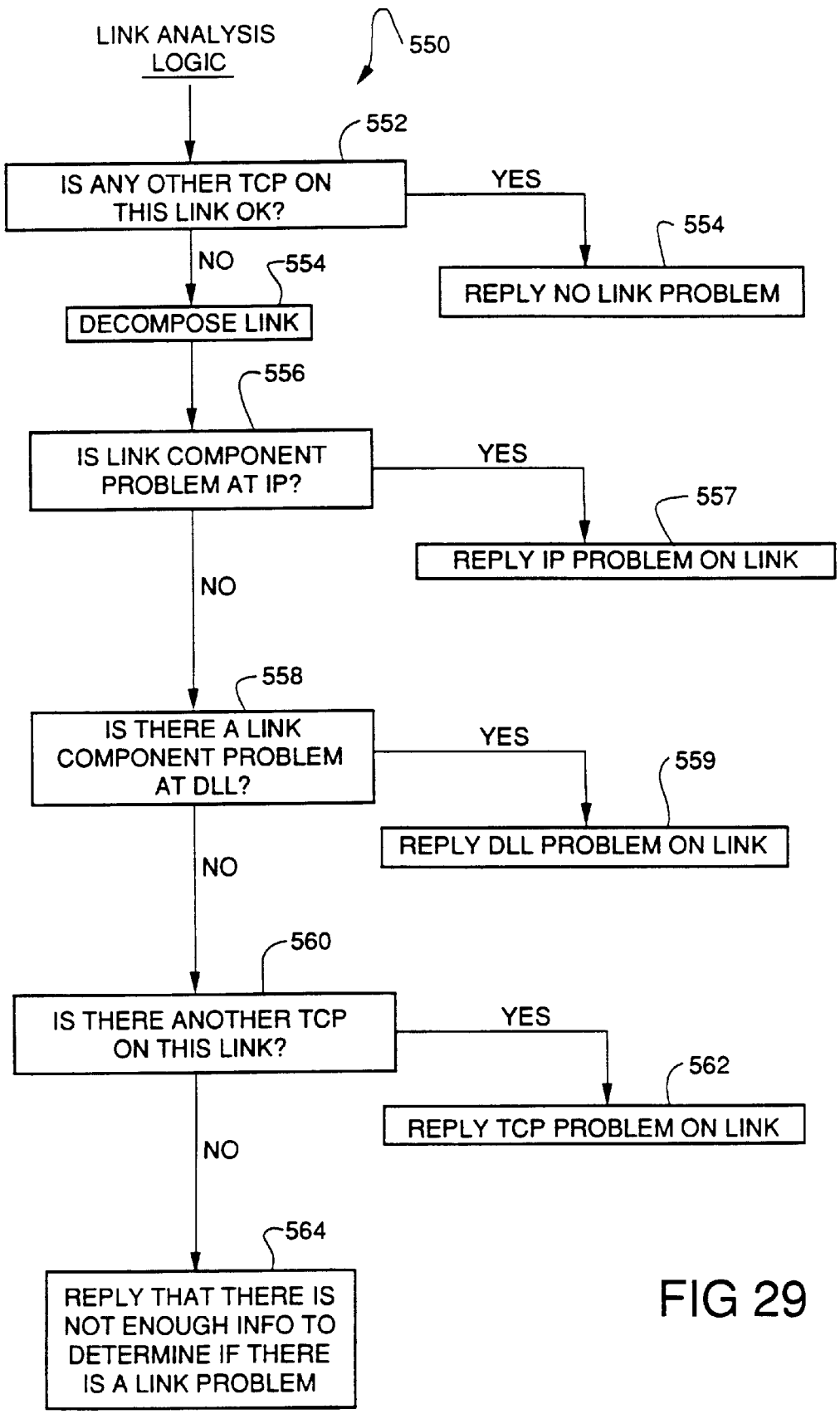
Figure 31:
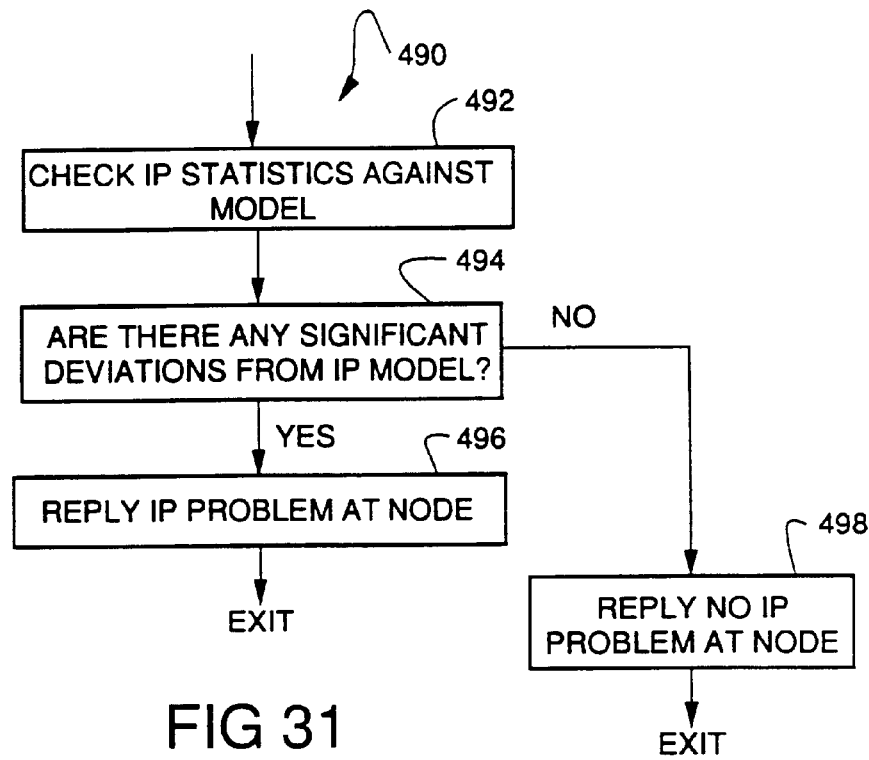
Figure 30:
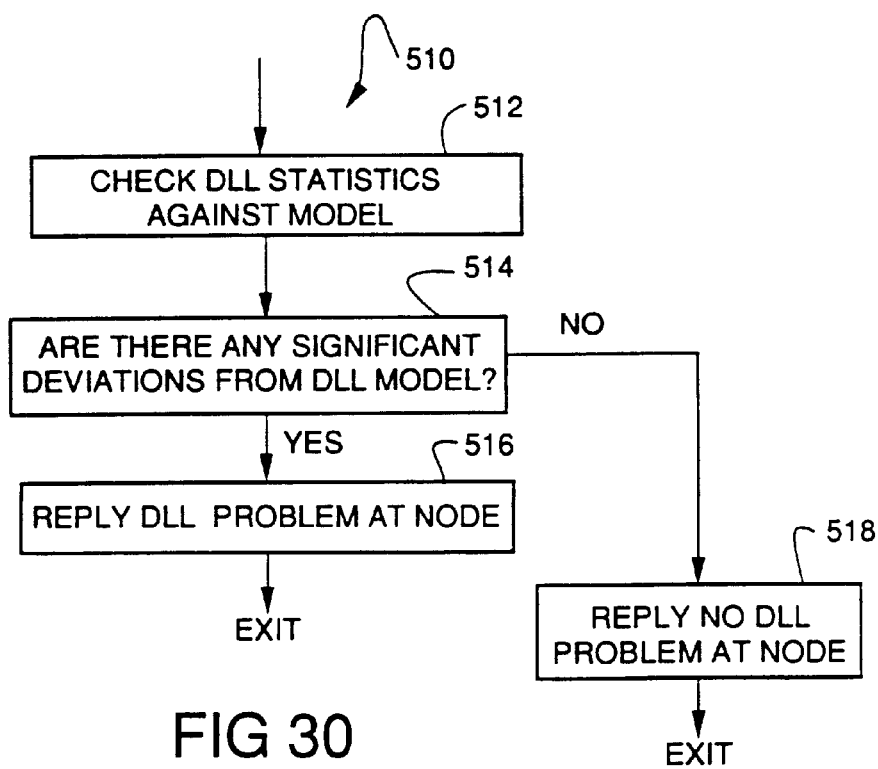
Figure 32:
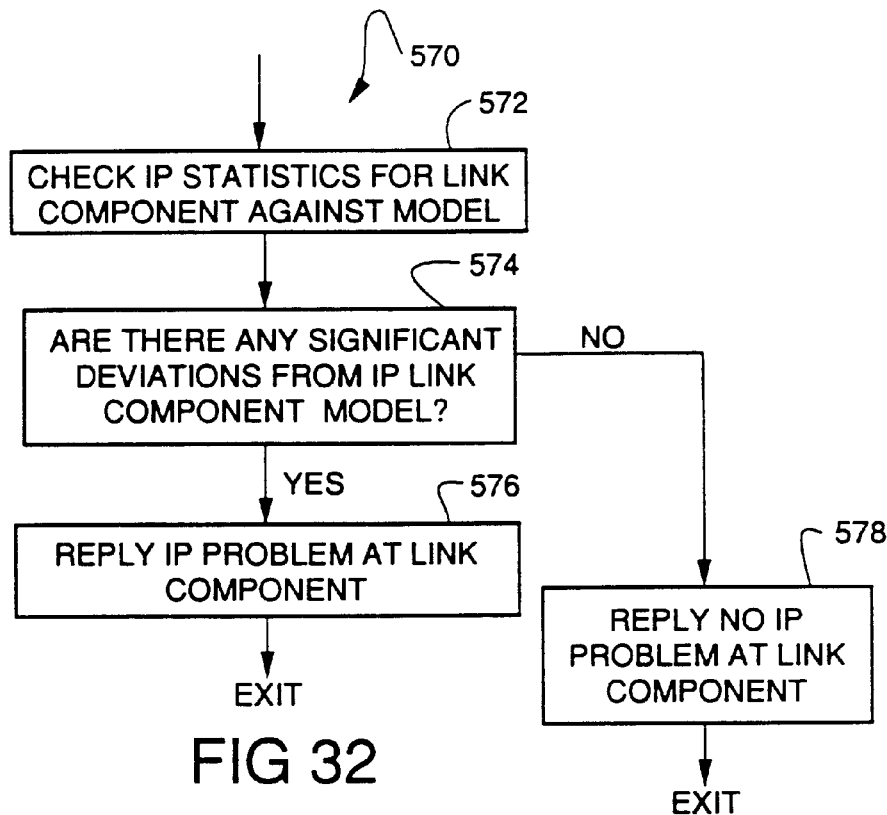
Figure 33:
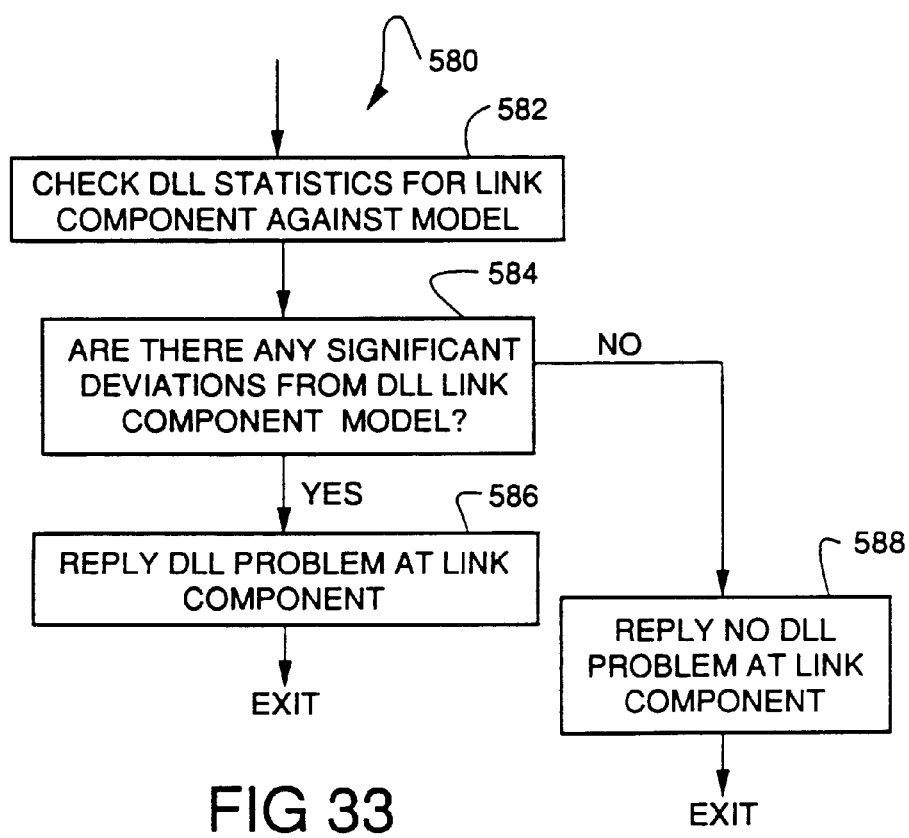
Figure 35:
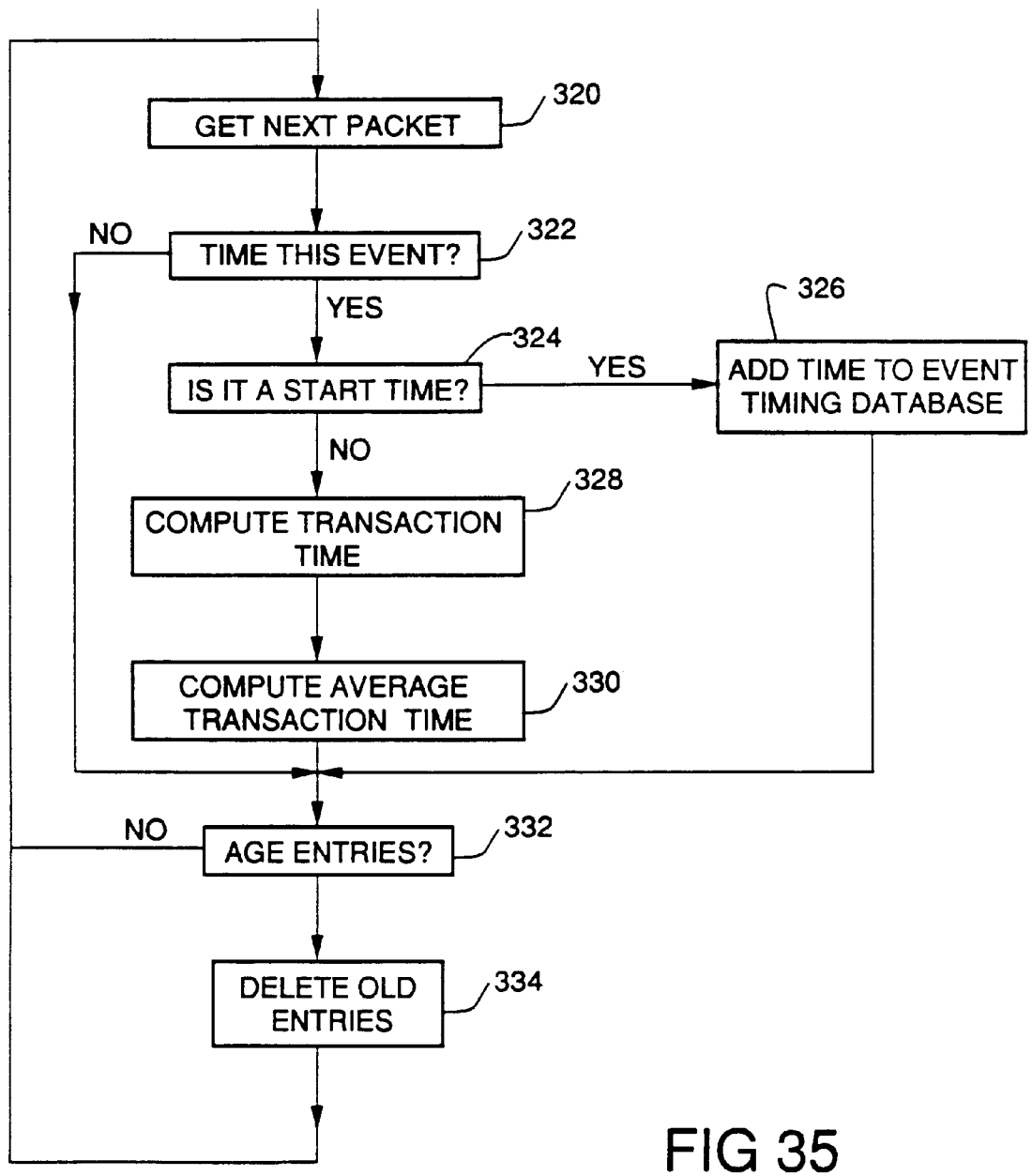
Figure 36:
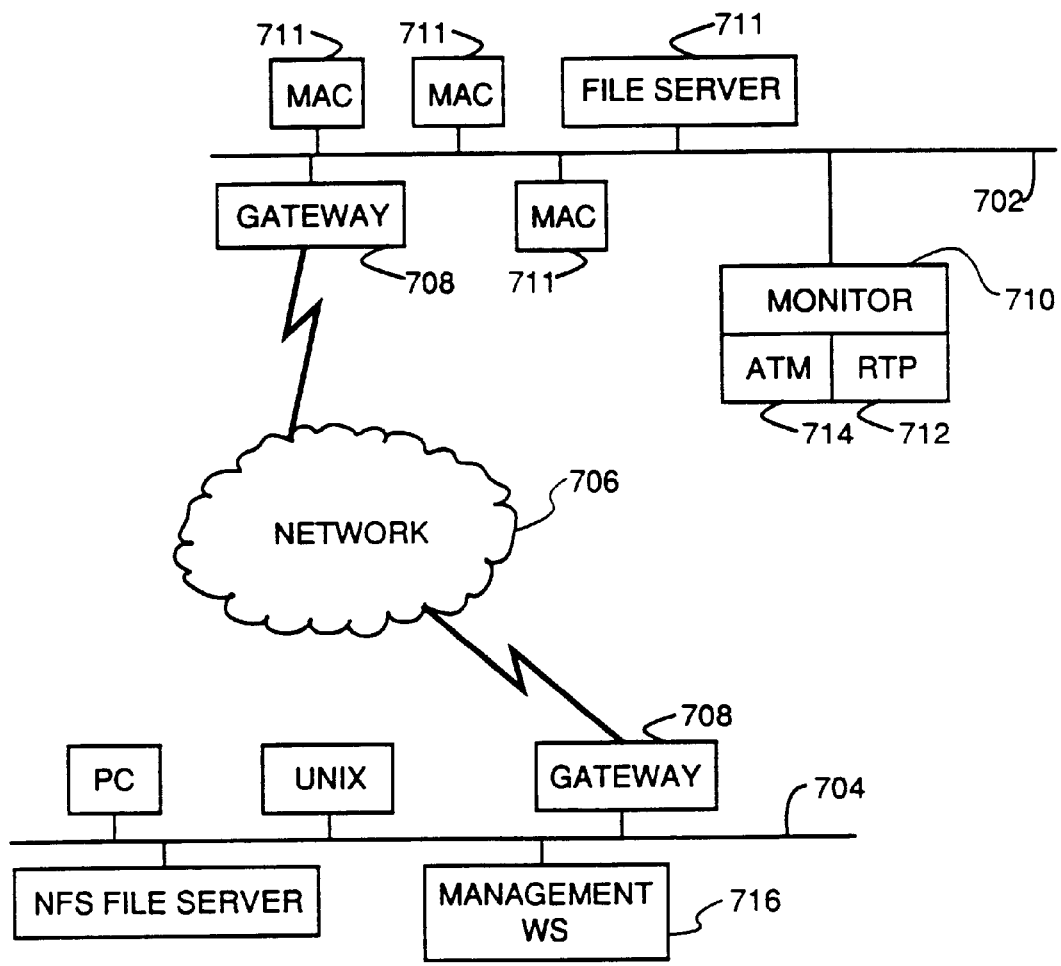
Figure 37:
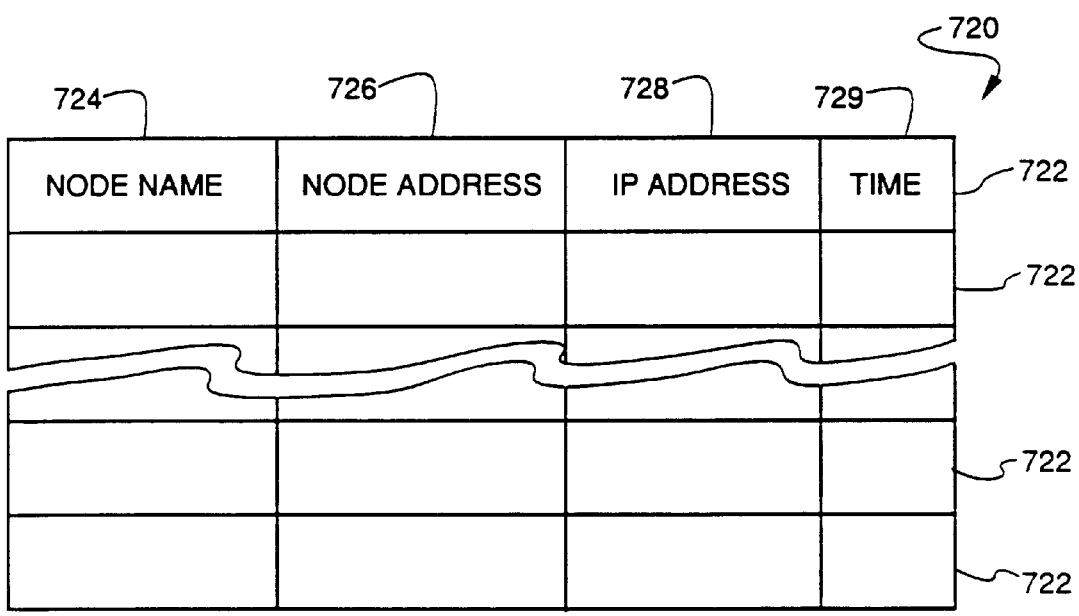
Figure 38:
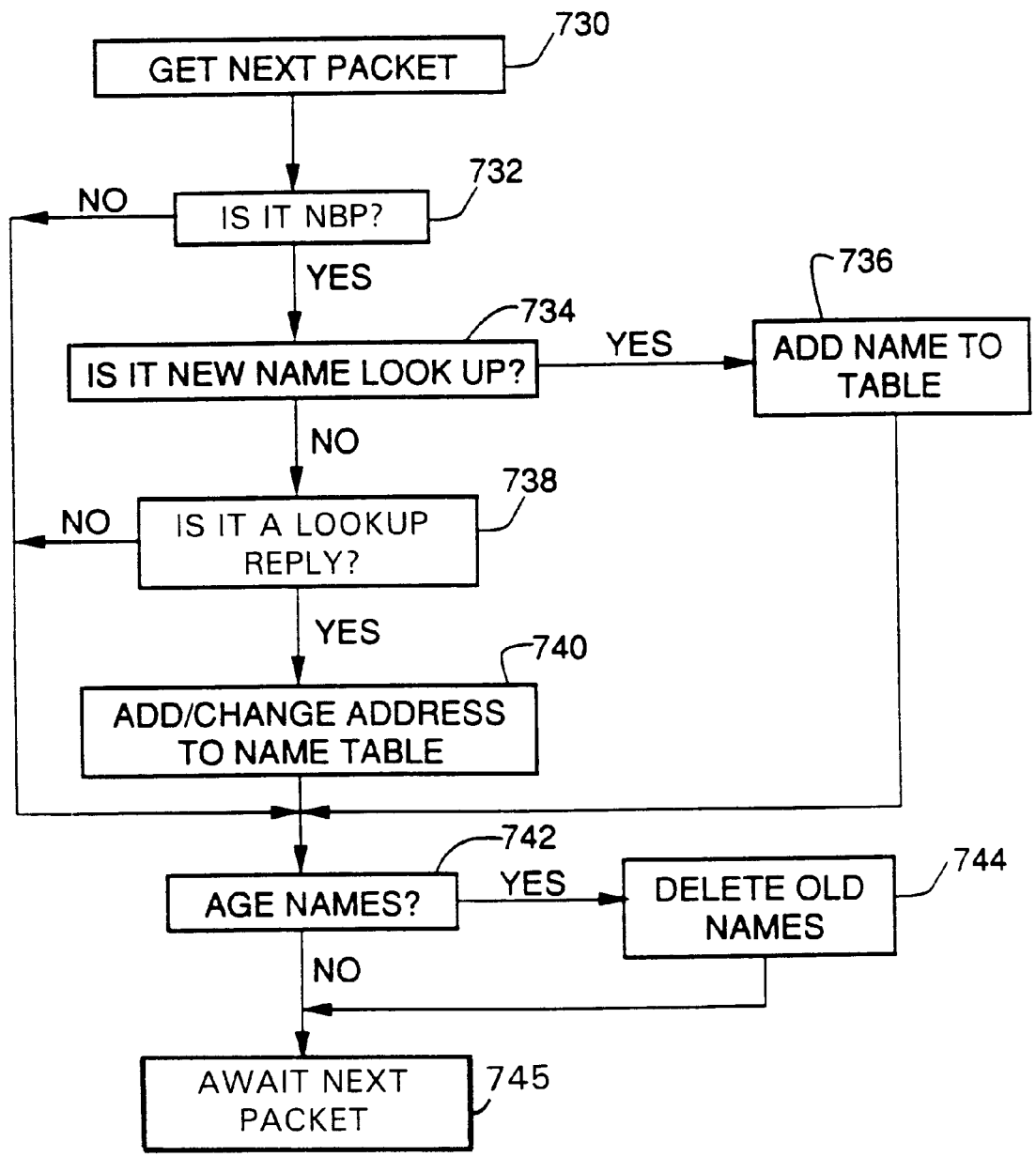

FIGS. 7a–c show the STATS data structures which store performance statistics relating to the data link layer;

FIG. 8 is a event/state table describing the operation of the state machine for a TCP connection;

FIG. 9a is a history data structure that is identified by a pointer found in the appropriate dialog statistics data within STATS;

FIG. 9b is a record from the history table;

FIG. 10 is a flow diagram of the Look_for_Data_State routine;

FIG. 11 is a flow diagram of the Look_for_Initiator routine that is called by the Look_for_Data_State routine;

FIG. 12 is a flow diagram of the Look_for_Retransmission routine which is called by the Look_at_History routine;

FIG. 13 is a diagram of the major steps in processing a frame through the Real Time Parser (RTP);

FIG. 14 is a diagram of the major steps in the processing a statistics threshold event;

FIG. 15 is a diagram of the major steps in the processing of a database update;

FIG. 16 is a diagram of the major steps in the processing of a monitor control request;

FIG. 17 is a logical map of the network as displayed by the Management Workstation;

FIG. 18 is a basic summary tool display screen;

FIG. 19 is a protocol selection menu that may be invoked through the summary tool display screen;

FIGS. 20a–g are examples of the statistical variables which are displayed for different protocols;

FIG. 21 is an example of information that is displayed in the dialogs panel of the summary tool display screen;

FIG. 22 is a basic data screen presenting a rate values panel, a count values panel and a protocols seen panel;

FIG. 23 is a traffic matrix screen;

FIG. 24 is a flow diagram of the algorithm for adaptively establishing network thresholds based upon actual network performance;

FIG. 25 is a simple multi-segment network;

FIG. 26 is a flow diagram of the operation of the diagnostic analyzer algorithm;

FIG. 27 is a flow diagram of the source node analyzer algorithm;

FIG. 28 is a flow diagram of the sink node analyzer algorithm;

FIG. 29 is a flow diagram of the link analysis logic;

FIG. 30 is a flow diagram of the DLL problem checking routine;

FIG. 31 is a flow diagram of the IP problem checking routine;

FIG. 32 is a flow diagram of the IP link component problem checking routine;

FIG. 33 is a flow diagram of the DLL link component problem checking routine;

FIG. 34 shows the structure of the event timing database;

FIG. 35 is a flow diagram of the operation of the event timing module (ETM) in the Network Monitor;

FIG. 36 is a network which includes an Appletalk® segment;

FIG. 37 is a Name Table that is maintained by the Address Tracking Module (ATM);

FIG. 38 is a flow diagram of the operation of the ATM; and

Figure 39:
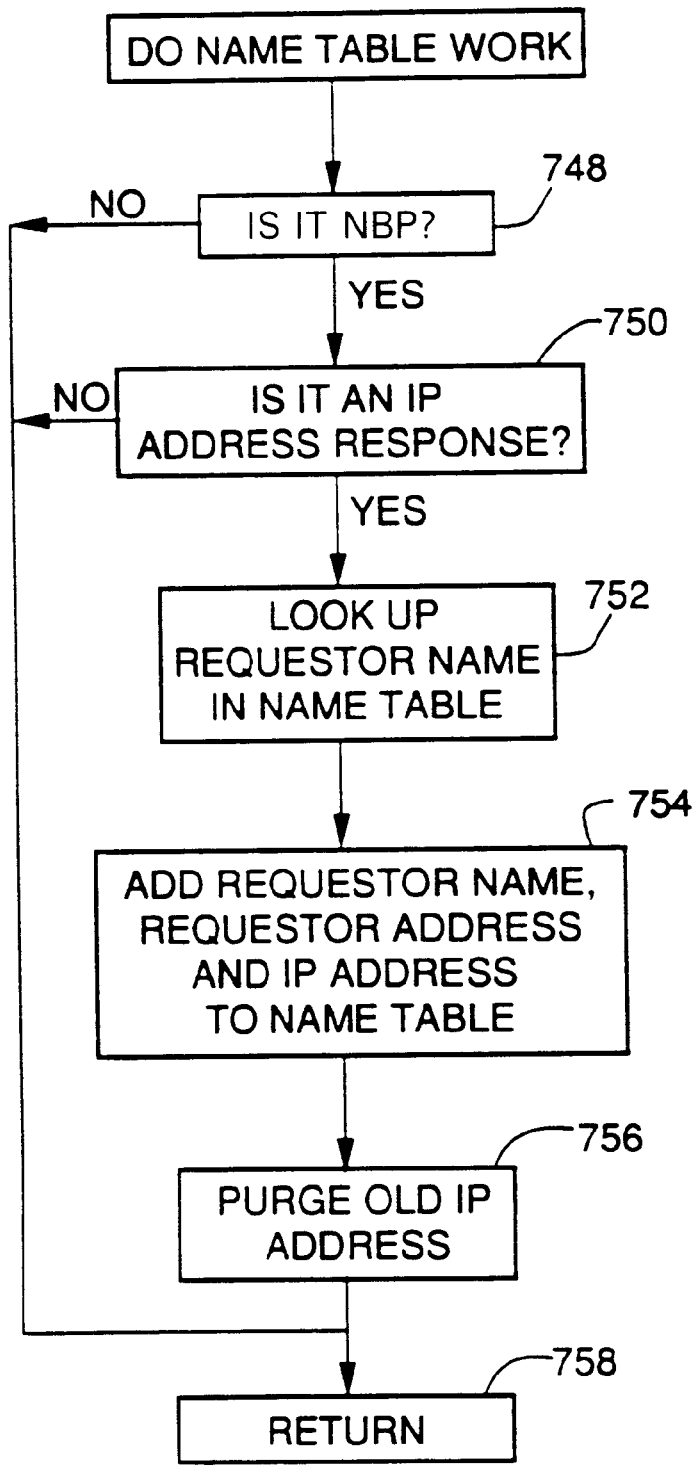

FIG. 39 is a flow diagram of the operation of the ATM.

Also attached hereto before the claims are the following appendices:

Appendix I identifies the SNMP MIB subset that is supported by the Monitor and the Management Workstation (2 pages);

Appendix II defines the extension to the standard MIB that are supported by the Monitor and the Management Workstation (25 pages);

Appendix III is a summary of the protocol variables for which the Monitor gathers statistics and a brief description of the variables, where appropriate (17 pages);

Appendix IV is a list of the Summary Tool Values Display Fields with brief descriptions (2 pages); and Appendix V is a description of the actual screens for the Values Tool (34 pages).

Appendix VI is a microfiche appendix presenting source code for the real time parser, the statistics data structures and the statistics modules.

Structure and Operation

Figure 1:
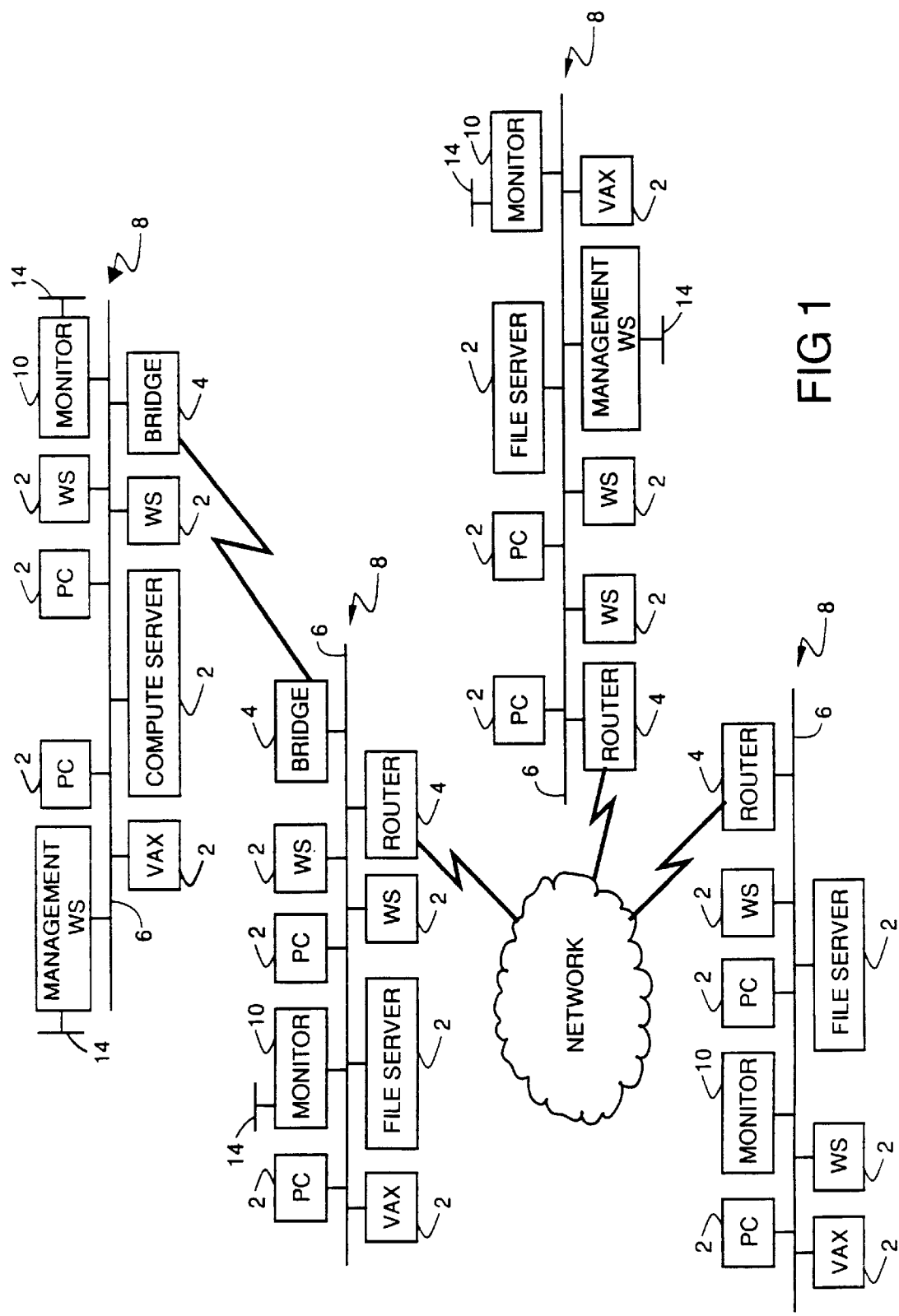
FIG. 1 is a block diagram of a network.

The Network:

A typical network, such as the one shown in FIG. 1, includes at least three major components, namely, network nodes 2, network elements 4 and communication lines 6. Network nodes 2 are the individual computers on the network. They are the very reason the network exists. They include but are not limited to workstations (WS), personal computers (PC), file servers (FS), compute servers (CS) and host computers (e.g., a VAX), to name but a few. The term server is often used as though it was different from a node, but it is, in fact, just a node providing special services.

In general, network elements 4 are anything that participate in the service of providing data movement in a network, i.e., providing the basic communications. They include, but are not limited to, LAN's, routers, bridges, gateways, multiplexors, switches and connectors. Bridges serve as connections between different network segments. They keep track of the nodes which are connected to each of the segments to which they are connected. When they see a packet on one segment that is addressed to a node on another of their segments, they grab the packet from the one segment and transfer it to the proper segment. Gateways generally provide connections between different network segments that are operating under different protocols and serve to convert communications from one protocol to the other. Nodes send packets to routers so that they may be directed over the appropriate segments to the intended destination node.

Finally, network or communication lines 6 are the components of the network which connect nodes 2 and elements 4 together so that communications between nodes 2 may take place. They can be private lines, satellite lines or Public Carrier lines. They are expensive resources and are usually managed as separate entities. Often networks are organized into segments 8 that are connected by network elements 4. A segment 8 is a section of a LAN connected at a physical level (this may include repeaters). Within a segment, no protocols at layers above the physical layer are needed to enable signals from two stations on the same segment to reach each other (i.e., there are no routers, bridges, gateways . . . ).

The Network Monitor and the Management Workstation:

In the described embodiment, there are two basic elements to the monitoring system which is to be described, namely, a Network Monitor 10 and a Management Workstation 12. Both elements interact with each other over the local area network (LAN).

Network Monitor 10 (referred to hereinafter simply as Monitor 10) is the data collection module which is attached to the LAN. It is a high performance real time front end processor which collects packets on the network and performs some degree of analysis to search for actual or potential problems and to maintain statistical information for use in later analysis. In general, it performs the following functions. It operates in a promiscuous mode to capture and analyze all packets on the segment and it extracts all items of interest from the frames. It generates alarms to notify the Management Workstation of the occurrence of significant events. It receives commands from the Management Workstation, processes them appropriately and returns responses.

Management Workstation 12 is the operator interface. It collects and presents troubleshooting and performance information to the user. It is based on the SunNet Manager (SNM) product and provides a graphical network-map-based interface and sophisticated data presentation and analysis tools. It receives information from Monitor 10, stores it and displays the information in various ways. It also instructs Monitor 10 to perform certain actions. Monitor 10, in turn, sends responses and alarms to Management Workstation 12 over either the primary LAN or a backup serial link 14 using SNMP with the MIB extensions defined later.

These devices can be connected to each other over various types of networks and are not limited to connections over a local area network. As indicated in FIG. 1, there can be multiple Workstations 12 as well as multiple Monitors 10.

Before describing these components in greater detail, background information will first be reviewed regarding communication protocols which specify how communications are conducted over the network and regarding the structure of the packets.

Figure 2:
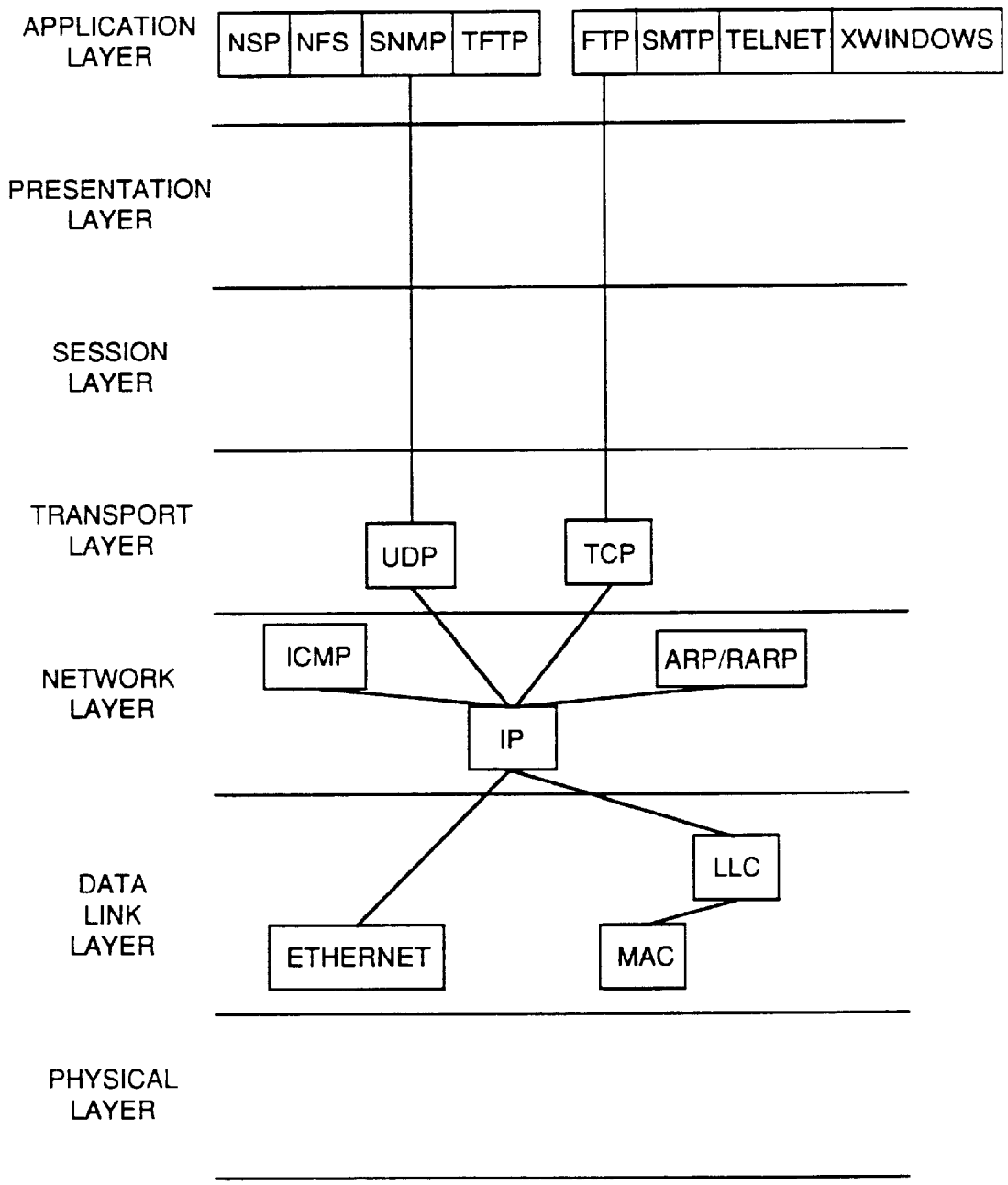
FIG. 2 shows the layered structure of a network communication and a protocol tree within that layered environment.

The Protocol Tree:

As shown in FIG. 2, communication over the network is organized as a series of layers or levels, each one built upon the next lower one, and each one specified by one or more protocols (represented by the boxes). Each layer is responsible for handling a different phase of the communication between nodes on the network. The protocols for each layer are defined so that the services offered by any layer are relatively independent of the services offered by the neighbors above and below. Although the identities and number of layers may differ depending on the network (i.e., the protocol set defining communication over the network), in general, most of them share a similar structure and have features in common.

For purposes of the present description, the Open Systems Interconnection (OSI) model will be presented as representative of structured protocol architectures. The OSI model, developed by the International Organization for Standardization, includes seven layers. As indicated in FIG. 2, there is a physical layer, a data link layer (DLL), a network layer, a transport layer, a session layer, a presentation layer and an application layer, in that order. As background for what is to follow, the function of each of these layers will be briefly described.

The physical layer provides the physical medium for the data transmission. It specifies the electrical and mechanical interfaces of the network and deals with bit level detail. The data link layer is responsible for ensuring an error-free physical link between the communicating nodes. It is responsible for creating and recognizing frame boundaries (i.e., the boundaries of the packets of data that are sent over the network.) The network layer determines how packets are routed within the network. The transport layer accepts data from the layer above it (i.e., the session layer), breaks the packets up into smaller units, if required, and passes these to the network layer for transmission over the network. It may insure that the smaller pieces all arrive properly at the other end. The session layer is the user's interface into the network. The user must interface with the session layer in order to negotiate a connection with a process in another machine. The presentation layer provides code conversion and data reformatting for the user's application. Finally, the application layer selects the overall network service for the user's application.

FIG. 2 also shows the protocol tree which is implemented by the described embodiment. A protocol tree shows the protocols that apply to each layer and it identifies by the tree structure which protocols at each layer can run "on top of" the protocols of the next lower layer. Though standard abbreviations are used to identify the protocols, for the convenience of the reader, the meaning of the abbreviations are as follows:

| | |
|---|---|
| ARP | Address Resolution Protocol |
| ETHERNET | Ethernet Data Link Control |
| FTP | File Transfer Protocol |
| ICMP | Internet Control Message Protocol |
| IP | Internet Protocol |
| LLC | 802.2 Logical Link Control |
| MAC | 802.3 CSMA/CD Media Access Control |
| NFS | Network File System |
| NSP | Name Server Protocol |
| RARP | Reverse Address Resolution Protocol |
| SMTP | Simple Mail Transfer Protocol |
| SNMP | Simple Network Management Protocol |
| TCP | Transmission Control Protocol |
| TFTP | Trivial File Transfer Protocol |
| UDP | User Datagram Protocol |

Two terms are commonly used to describe the protocol tree, namely, a protocol stack and a protocol family (or suite). A protocol stack generally refers to the underlying protocols that are used when sending a message over a network. For example, FTP/TCP/IP/LLC is a protocol stack. A protocol family is a loose association of protocols which tend to be used on the same network (or derive from a common source). Thus, for example, the TCP/IP family includes IP, TCP, UDP, ARP, TELNET and FTP. The Decnet family includes the protocols from Digital Equipment Corporation. And the SNA family includes the protocols from IBM.

Figure 3:
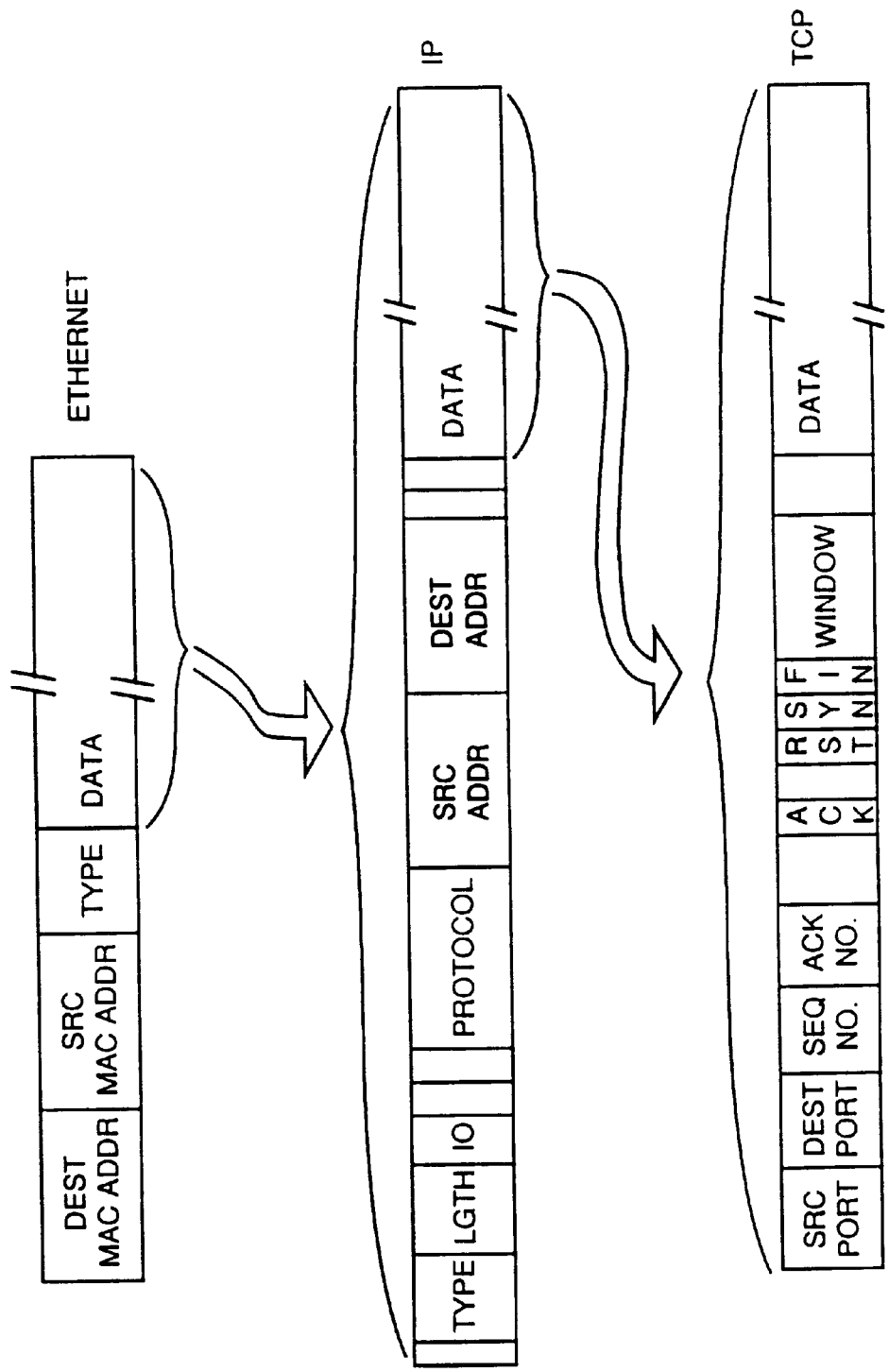
FIG. 3 illustrates the structure of an ethernet/IP/TCP packet.

The Packet:

The relevant protocol stack defines the structure of each packet that is sent over the network. FIG. 3, which shows an TCP/IP packet, illustrates the typical structure of a packet. In general, each level of the protocol stack takes the data from the next higher level and adds header information to form a protocol data unit (PDU) which it passes to the next lower level. That is, as the data from the application is passed down through the protocol layers in preparation for transmission over the network, each layer adds its own information to the data passed down from above until the complete packet is assembled. Thus, the structure of a packet resembles that of an onion, with each PDU of a given layer wrapped within the PDU of the adjacent lower level.

At the ethernet level, the PDU includes a destination address (DEST MAC ADDR), a source address (SRC MAC ADDR), a type (TYPE) identifying the protocol which is running on top of this layer, and a DATA field for the PDU from the IP layer.

Like the ethernet packet, the PDU for the IP layer includes an IP header plus a DATA field. The IP header includes a type field (TYPE) for indicating the type of service, a length field (LGTH) for specifying the total length of the PDU, an identification field (ID), a protocol field (PROT) for identifying the protocol which is running on top of the IP layer (in this case, TCP), a source address field (SRC ADDR) for specifying the IP address of the sender, a destination address field (DEST ADDR) for specifying the IP address of the destination node, and a DATA field.

The PDU built by the TCP protocol also consists of a header and the data passed down from the next higher layer. In this case the header includes a source port field (SRC PORT) for specifying the port number of the sender, a destination port field (DEST PORT) for specifying the port number of the destination, a sequence number field (SEQ NO.) for specifying the sequence number of the data that is being sent in this packet, and an acknowledgment number field (ACK NO.) for specifying the number of the acknowledgment being returned. It also includes bits which identify the packet type, namely, an acknowledgment bit (ACK), a reset connection bit (RST), a synchronize bit (SYN), and a no more data from sender bit (FIN). There is also a window size field (WINDOW) for specifying the size of the window being used.

The Concept of a Dialog:

The concept of a dialog is used throughout the following description. As will become apparent, it is a concept which provides a useful way of conceptualizing, organizing and displaying information about the performance of a network—for any protocol and for any layer of the multilevel protocol stack.

As noted above, the basic unit of information in communication is a packet. A packet conveys meaning between the sender and the receiver and is part of a larger framework of packet exchanges. The larger exchange is called a dialog within the context of this document. That is, a dialog is a communication between a sender and a receiver, which is composed of one or more packets being transmitted between the two. There can be multiple senders and receivers which can change roles. In fact, most dialogs involve exchanges in both directions.

Figure 4:
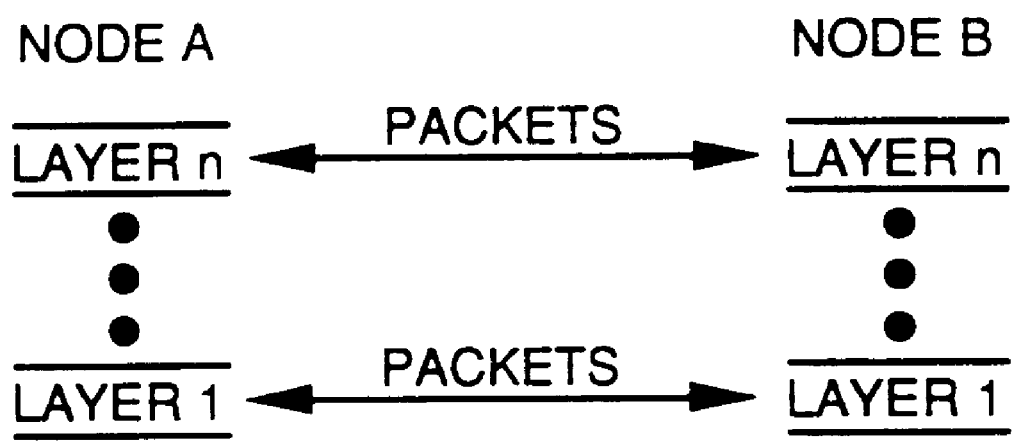
FIG. 4 illustrates the different layers of a communication between two nodes.

Stated another way, a dialog is the exchange of messages and the associated meaning and state that is inherent in any particular exchange at any layer. It refers to the exchange between the peer entities (hardware or software) in any communication. In those situations where there is a layering of protocols, any particular message exchange could be viewed as belonging to multiple dialogs. For example, in FIG. 4 Nodes A and B are exchanging packets and are engaged in multiple dialogs. Layer 1 in Node A has a dialog with Layer 1 in Node B. For this example, one could state that this is the data link layer and the nature of the dialog deals with the message length, number of messages, errors and perhaps the guarantee of the delivery. Simultaneously, Layer n of Node A is having a dialog with Layer n of node B. For the sake of the example, one could state that this is an application layer dialog which deals with virtual terminal connections and response rates. One can also assume that all of the other layers (2 through n-1) are also having simultaneous dialogs.

In some protocols there are explicit primitives that deal with the dialog and they are generally referred to as connections or virtual circuits. However, dialogs exist even in stateless and connectionless protocols. Two more examples will be described to help clarify the concept further, one dealing with a connection oriented protocol and the other dealing with a connectionless protocol.

In a typical connection oriented protocol, Node A sends a connection request (CR) message to Node B. The CR is an explicit request to form a connection. This is the start of a particular dialog, which is no different from the start of the connection. Nodes A and B could have other dialogs active simultaneously with this particular dialog. Each dialog is seen as unique. A connection is a particular type of dialog.

In a typical connectionless protocol, Node A sends Node B a message that is a datagram which has no connection paradigm, in fact, neither do the protocol(s) at higher layers. The application protocol designates this as a request to initiate some action. For example, a file server protocol such as Sun Microsystems' Network File System (NFS) could make a mount request. A dialog comes into existence once the communication between Nodes A and B has begun. It is possible to determine that communication has occurred and to determine the actions being requested. If in fact there exists more than one communication thread between Nodes A and B, then these would represent separate, different dialogs.

Inside the Network Monitor:

Monitor 10 includes a MIPS R3000 general purpose microprocessor (from MIPS Computer Systems, Inc.) running at 25 MHz. It is capable of providing 20 mips processing power. Monitor 10 also includes a 64Kbyte instruction cache and a 64Kbyte data cache, implemented by SRAM.

Figure 5:
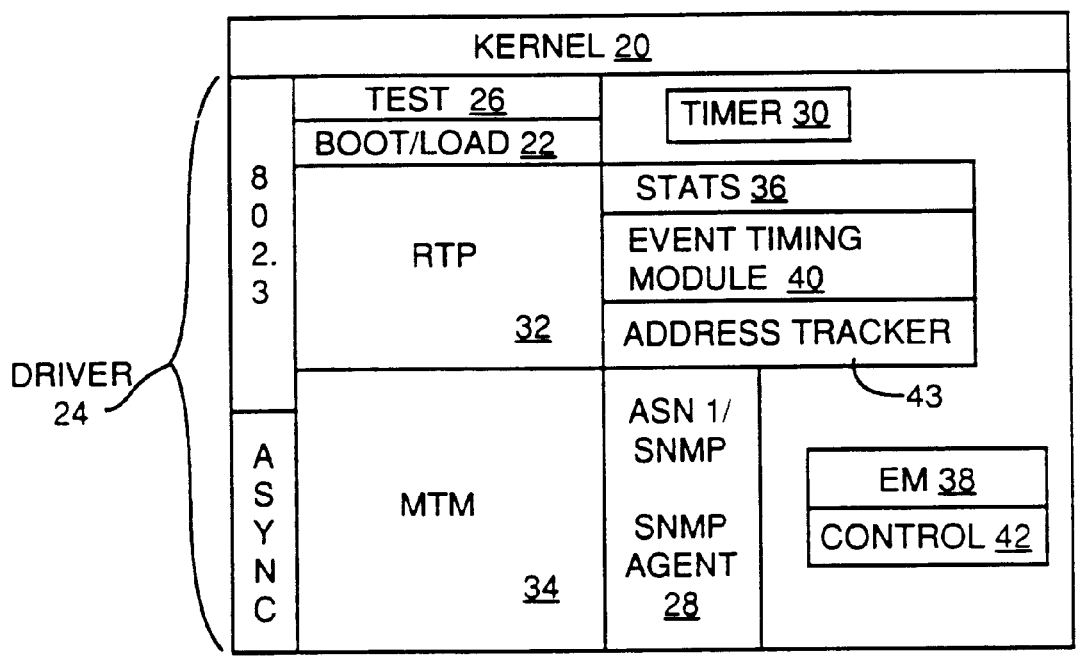
FIG. 5 shows the software modules within the Monitor.

The major software modules of Monitor 10 are implemented as a mixture of tasks and subroutine libraries as shown in FIG. 5. It is organized this way so as to minimize the context switching overhead incurred during critical processing sequences. There is NO PREEMPTION of any module in the monitor subsystem. Each module is cognizant of the fact that it should return control to the kernel in order to let other tasks run. Since the monitor subsystem is a closed environment, the software is aware of real time constraints.

Among the major modules which make up Monitor 10 is a real time kernel 20, a boot/load module 22, a driver 24, a test module 26, an SNMP Agent 28, a Timer module 30, a real time parser (RTP) 32, a Message Transport Module (MTM) 34, a statistics database (STATS) 36, an Event Manager (EM) 38, an Event Timing Module (ETM) 40 and a control module 42. Each of these will now be described in greater detail.

Real Time Kernel 20 takes care of the general housekeeping activities in Monitor 10. It is responsible for scheduling, handling intertask communications via queues, managing a potentially large number of timers, manipulating linked lists, and handling simple memory management.

Boot/Load Module 22, which is FProm based, enables Monitor 10 to start itself when the power is turned on in the box. It initializes functions such as diagnostics, and environmental initialization and it initiates down loading of the Network Monitor Software including program and configuration files from the Management Workstation. Boot/load module 22 is also responsible for reloading program and/or configuration data following internal error detection or on command from the Management Workstation. To accomplish down loading, boot/load module 22 uses the Trivial File Transfer Protocol (TFTP). The protocol stack used for loading is TFTP/UDP/IP/ethernet over the LAN and TFTP/UDP/IP/SLIP over the serial line.

Device Driver 24 manages the network controller hardware so that Monitor 10 is able to read and write packets from the network and it manages the serial interface. It does so both for the purposes of monitoring traffic (promiscuous mode) and for the purposes of communicating with the Management Workstation and other devices on the network. The communication occurs through the network controller hardware of the physical network (e.g. Ethernet). The drivers for the LAN controller and serial line interface are used by the boot load module and the MTM. They provide access to the chips and isolate higher layers from the hardware specifics.

Test module 26 performs and reports results of physical layer tests (TDR, connectivity, . . . ) under control of the Management Workstation. It provides traffic load information in response to user requests identifying the particular traffic data of interest. The load information is reported either as a percent of available bandwidth or as frame size(s) plus rate.

SNMP Agent 28 translates requests and information into the network management protocol being used to communicate with the Management Workstation, e.g., the Simple Network Management Protocol (SNMP).

Control Module 42 coordinates access to monitor control variables and performs actions necessary when these are altered. Among the monitor control variables which it handles are the following:

set reset monitor—transfer control to reset logic;

set time of day—modify monitor hardware clock and generate response to Management Workstation;

get time of day—read monitor hardware clock and generate response to Workstation;

set trap permit—send trap control ITM to EM and generate response to Workstation;

get trap permit—generate response to Workstation;

Control module 42 also updates parse control records within STATS when invoked by the RTP (to be described) or during overload conditions so that higher layers of parsing are dropped until the overload situation is resolved. When overload is over it restores full parsing.

Timer 30 is invoked periodically to perform general housekeeping functions. It pulses the watchdog timer at appropriate intervals. It also takes care of internal time stamping and kicking off routines like the EM routine which periodically recalculates certain numbers within the statistical database (i.e., STATS).

Real Time Parser (RTP) 32 sees all frames on the network and it determines which protocols are being used and interprets the frames. The RTP includes a protocol parser and a state machine. The protocol parser parses a received frame in the "classical" manner, layer-by-layer, lowest layer first. The parsing is performed such that the statistical objects in STATS (i.e., the network parameters for which performance data is kept) are maintained. Which layers are to have statistics stored for them is determined by a parse control record that is stored in STATS (to be described later). As each layer is parsed, the RTP invokes the appropriate functions in the statistics module (STATS) to update those statistical objects which must be changed.

The state machine within RTP 32 is responsible for tracking state as appropriate to protocols and connections. It is responsible for maintaining and updating the connection oriented statistical elements in STATS. In order to track connection states and events, the RTP invokes a routine within the state machine. This routine determines the state of a connection based on past observed frames and keeps track of sequence numbers. It is the routine that determines if a connection is in data transfer state and if a retransmission has occurred. The objectives of the state machine are to keep a brief history of events, state transitions, and sequence numbers per connection; to detect data transfer state so that sequence tracking can begin; and to count inconsistencies but still maintain tracking while falling into an appropriate state (e.g. unknown).

RTP 32 also performs overload control by determining the number of frames awaiting processing and invoking control module 42 to update the parse control records so as to reduce the parsing depth when the number becomes too large.

Statistics Module (STATS) 36 is where Monitor 10 keeps information about the statistical objects it is charged with monitoring. A statistical object represents a network parameter for which performance information is gathered. This information is contained in an extended MIB (Management Information Base), which is updated by RTP 32 and EM 38.

STATS updates statistical objects in response to RTP invocation. There are at least four statistical object classes, namely, counters, timers, percentages (%), and meters. Each statistical object is implemented as appropriate to the object class to which it belongs. That is, each statistical object behaves such that when invoked by RTP 32 it updates and then generates an alarm if its value meets a preset threshold. (Meets means that for a high threshold the value is equal to or greater than the threshold and for a low threshold the value is equal to or less than the threshold. Note that a single object may have both high and low thresholds.)

STATS 36 is responsible for the maintenance and initial analysis of the database. This includes coordinating access to the database variables, ensuring appropriate interlocks are applied and generating alarms when thresholds are crossed. Only STATS 36 is aware of the internal structure of the database, the rest of the system is not.

STATS 36 is also responsible for tracking events of interest in the form of various statistical reductions. Examples are counters, rate meters, and rate of change of rate meters. It initiates events based on particular statistics reaching configured limits, i.e., thresholds. The events are passed to the EM which sends a trap (i.e., an alarm) to the Management Workstation. The statistics within STATS 36 are readable from the Management Workstation on request.

STATS performs lockup on all addressing fields. It assigns new data structures to address field values not currently present. It performs any hashing for fast access to the database. More details will be presented later in this document.

Event Manager (EM) 38 extracts statistics from STATS and formats it in ways that allow the Workstation to understand it. It also examines the various statistics to see if their behavior warrants a notification to the Management Workstation. If so, it uses the SNMP Agent software to initiate such notifications.

If the Workstation asks for data, EM 38 gets the data from STATS and sends it to the Workstation. It also performs some level of analysis for statistical, accounting and alarm filtering and decides on further action (e.g. delivery to the Management Workstation). EM 38 is also responsible for controlling the delivery of events to the Management Workstation, e.g., it performs event filtering. The action to be taken on receipt of an event (e.g. threshold exceeded in STATS) is specified by the event action associated with the threshold. The event is used as an index to select the defined action (e.g. report to Workstation, run local routine xxxx, ignore). The action can be modified by commands from the Management Workstation (e.g., turn off an alarm) or by the control module in an overload situation. An update to the event action, however, does not affect events previously processed even if they are still waiting for transmission to the Management Workstation. Discarded events are counted as such by EM 38.

EM 38 also implements a throttle mechanism to limit the rate of delivery of alarms to the console based on configured limits. This prevents the rapid generation of multiple alarms. In essence, Monitor 10 is given a maximum frequency at which alarms may be sent to the Workstation. Although alarms in excess of the maximum frequency are discarded, a count is kept of the number of alarms that were discarded.

EM 38 invokes routines from the statistics module (STATS) to perform periodic updates such as rate calculations and threshold checks. It calculates time averages, e.g., average traffic by source stations, destination stations. EM 38 requests for access to monitor control variables are passed to the control module.

EM 38 checks whether asynchronous traps (i.e., alarms) to the Workstation are permitted before generating any.

EM 38 receives database update requests from the Management Workstation and invokes the statistics module (STATS) to process these.

Message Transport Module (MTM) 34, which is DRAM based, has two distinct but closely related functions. First, it is responsible for the conversion of Workstation commands and responses from the internal format used within Monitor 10 to the format used to communicate over the network. It isolates the rest of the system from the protocol used to communicate within Management Workstation. It translates between the internal representation of data and ASN.1 used for SNMP. It performs initial decoding of Workstation requests and directs the requests to appropriate modules for processing. It implements SNMP/UDP/IP/LLC or ETHER-NET protocols for LAN and SNMP/UDP/IP/SLIP protocols for serial line. It receives network management commands from the Management Workstation and delivers these to the appropriate module for action. Alarms and responses destined for the Workstation are also directed via this module.

Second, MTM 34 is responsible for the delivery and reception of data to and from the Management Workstation using the protocol appropriate to the network. Primary and backup communication paths are provided transparently to the rest of the monitor modules (e.g. LAN and dial up link). It is capable of full duplex delivery of messages between the console and monitoring module. The messages carry event, configuration, test and statistics data.

Event Timing Module (ETM) 40 keeps track of the start time and end times of user specified transactions over the network. In essence, this module monitors the responsiveness of the network at any protocol or layer specified by the user.

Address Tracking Module 42 keeps track of the node name to node address bindings on networks which implement dynamic node addressing protocols.

Memory management for Monitor 10 is handled in accordance with following guidelines. The available memory is divided into four blocks during system initialization. One block includes receive frame buffers. They are used for receiving LAN traffic and for receiving secondary link traffic. These are organized as linked lists of fixed sized buffers. A second block includes system control message blocks. They are used for intertask messages within Monitor and are organized as a linked list of free blocks and multiple linked lists of in process intertask messages. A third block includes transmit buffers. They are used for creation and transmission of workstation alarms and responses and are organized as a linked list of fixed sized buffers. A fourth block is the statistics. This is allocated as a fixed size area at system initialization and managed by the statistics module during system operation.

Figure 6:
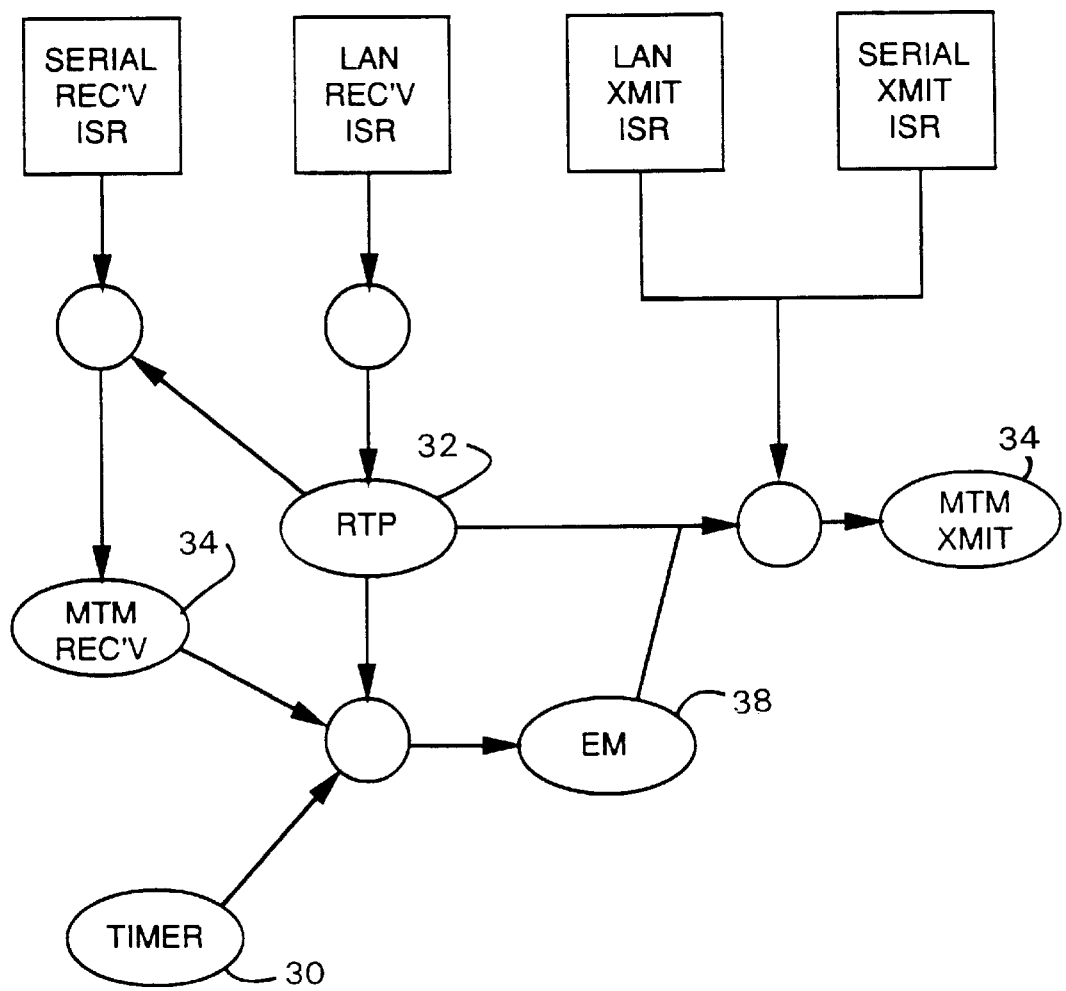
FIG. 6 shows the structure of the Monitor software in terms of tasks and intertask communication mechanisms.

Task Structure of Monitor;

The structure of the Monitor in terms of tasks and intertask messages is shown in FIG. 6. The rectangular blocks represent interrupt service routines, the ovals represent tasks and the circles represent input queues.

Each task in the system has a single input queue which it uses to receive all input. All inter-process communications take place via messages placed onto the input queue of the destination task. Each task waits on a (well known) input queue and processes events or inter-task messages (i.e., ITM's) as they are received. Each task returns to the kernel within an appropriate time period defined for each task (e.g. after processing a fixed number of events).

Interrupt service routines (ISR's) run on receipt of hardware generated interrupts. They invoke task level processing by sending an ITM to the input queue of the appropriate task.

The kernel scheduler acts as the base loop of the system and calls any runnable tasks as subroutines. The determination of whether a task is runnable is made from the input queue, i.e., if this has an entry the task has work to perform. The scheduler scans the input queues for each task in a round robin fashion and invokes a task with input pending. Each task processes items from its input queue and returns to the scheduler within a defined period. The scheduler then continues the scan cycle of the input queues. This avoids any task locking out others by processing a continuously busy input queue. A task may be given an effectively higher priority by providing it with multiple entries in the scan table.

Database accesses are generally performed using access routines. This hides the internal structure of the database from other modules and also ensures that appropriate interlocks are applied to shared data.

The EM processes a single event from the input queue and then returns to the scheduler.

The MTM Xmit task processes a single event from its input queue and then returns control to the scheduler. The MTM Recv task processes events from the input queue until it is empty or a defined number (e.g. 10) events have been processed and then returns control to the scheduler.

The timer task processes a single event from the input queue and then returns control to the scheduler.

RTP continues to process frames until the input queue is empty or it has processed a defined number (e.g. 10) frames. It then returns to the scheduler.

The following sections contain a more detailed description of some of the above-identified software modules.

The Statistics Module (STATS):

The functions of the statistics module are:

| | |
|---|---|
| * | to define statistics records; |
| * | to allocate and initialize statistics records; |
| * | to provide routines to lookup statistics records, e.g. lookup_id_addr; |
| * | to provide routines to manipulate the statistics within the records, e.g. stats_age, stats_incr and stats_rate; |
| * | to provide routines to free statistics records, e.g. stats_allocate and stats_deallocate |

It provides these services to the Real Time Parser (RTP) module and to the Event Manager (EM) module.

STATS defines the database and it contains subroutines for updating the statistics which it keeps.

STATS contains the type definitions for all statistics records (e.g. DLL, IP, TCP statistics). It provides an initialization routine whose major function is to allocate statistics records at startup from cacheable memory. It provides lookup routines in order to get at the statistics. Each type of statistics record has its own lookup routine (e.g. lookup_ip_address) which returns a pointer to a statistics record of the appropriate type or NULL.

As a received frame is being parsed, statistics within statistics records need to be manipulated (e.g. incremented) to record relevant information about the frame. STATS provides the routines to manipulate those statistics. For example, there is a routine to update counters. After the counter is incremented/decremented and if there is a non-zero threshold associated with the counter, the internal routine compares its value to the threshold. If the threshold has been exceeded, the Event Manager is signaled in order to send a trap to the Workstation. Besides manipulating statistics, these routines, if necessary, signal the Event Manager via an Intertask Message (ITM) to send a trap to the Management Workstation.

The following is an example of some of the statistics records that are kept in STATS.

o monitor statistics
o mac statistics for segment
o llc statistics for segment
o statistics per ethernet/lsap type for segment
o ip statistics for segment
o icmp statistics for segment
o tcp statistics for segment
o udp statistics for segment
o nfs statistics for segment
o ftp control statistics for segment
o ftp data statistics for segment
o telnet statistics for segment
o smtp statistics for segment
o arp statistics for segment
o statistics per mac address
o statistics per ethernet type/lasp per mac address
o statistics per ip address (includes icmp)
o statistics per tcp socket
o statistics per udp socket
o statistics per nfs socket
o statistics per ftp control socket
o statistics per ftp data socket
o statistics per telnet socket
o statistics per smtp socket
o arp statistics per ip address
o statistics per mac address pair
o statistics per ip pair (includes icmp)
o statistics per tcp connection
o statistics per udp pair
o statistics per nfs pair
o statistics per ftp control connection
o statistics per ftp data connection
o statistics per telnet connection
o statistics per smtp connection
o connection histories per udp and tcp socket All statistics are organized similarly across protocol types. The details of the data structures for the DLL level are presented later.

As noted earlier, there are four statistical object classes (i.e., variables), namely, counts, rates, percentages (%), and meters. They are defined and implemented as follows.

A count is a continuously incrementing variable which rolls around to 0 on overflow. It may be reset on command from the user (or from software). A threshold may be applied to the count and will cause an alarm when the threshold count is reached. The threshold count fires each time the counter increments past the threshold value. For example, if the threshold is set to 5, alarms are generated when the count is 5, 10, 15, . . . .

A rate is essentially a first derivative of a count variable. The rate is calculated at a period appropriate to the variable. For each rate variable, a minimum, maximum and average value is maintained. Thresholds may be set on high values of the rate. The maximums and minimums may be reset on command. The threshold event is triggered each time the rate calculated is in the threshold region.

As commonly used, the % is calculated at a period appropriate to the variable. For each % variable a minimum, maximum and average value is maintained. A threshold may be set on high values of the %. The threshold event is triggered each time the % calculated is in the threshold region.

Finally, a meter is a variable which may take any discrete value within a defined range. The current value has no correlation to past or future values. A threshold may be set on a maximum and/or minimum value for a meter.

The rate and % fields of network event variables are updated differently than counter or meter fields in that they are calculated at fixed intervals rather than on receipt of data from the network.

Structures for statistics kept on a per address or per address pair basis are allocated at initialization time. There are several sizes for these structures. Structures of the same size are linked together in a free pool. As a new structure is needed, it is obtained from a free queue, initialized, and linked into an active list. Active lists are kept on a per statistics type basis.

As an address or address pair (e.g. mac, ip, tcp . . . ) is seen, RTP code calls an appropriate lookup routine. The lookup routine scans active statistics structures to see if a structure has already been allocated for the statistics. Hashing algorithms are used in order to provide for efficient lookup. If no structure has been allocated, the lookup routine examines the appropriate parse control records to determine whether statistics should be kept, and, if so, it allocates a structure of the appropriate size, initializes it and links it into an active list.

Either the address of a structure or a NULL is returned by these routines. If NULL is returned, the RTP does not stop parsing, but it will not be allowed to store the statistics for which the structure was requested.

The RTP updates statistics within the data base as it runs. This is done via macros defined for the RTP. The macros call on internal routines which know how to manipulate the relevant statistic. If the pointer to the statistics structure is NULL, the internal routine will not be invoked.

The EM causes rates to be calculated. The STATS module supplies routines (e.g. stats_rate) which must be called by the EM in order to perform the rate calculations. It also calls subroutines to reformat the data in the database in order to present it to the Workstation (i.e., in response to a get from the Workstation).

The calculation algorithms for the rate and % fields of network event variables are as follows.

The following rates are calculated in units per second, at the indicated (approximate) intervals:
1. 10 second intervals:
    e.g. DLL frame, byte, ethernet, 802.3, broadcast, multicast rates
2. 60 second intervals
    e.g., all DLL error, ethertype/dsap rates all IP rates.
    TCP packets, bytes, errors, retransmitted packets, retransmitted bytes, acks, rsts UDP packet, error, byte rates
    FTP file transfer, byte transfer, error rates For these rates, the new average replaces the previous value directly. Maximum and minimum values are retained until reset by the user.

The following rates are calculated in units per hour at the indicated time intervals:
1. 15 minute interval.
    e.g., TCP—connection rate
    Telnet connection rate
    FTP session rate The hourly rate is calculated from a sum of the last twelve 5 minute readings, as obtained from the buckets for the pertinent parameter. Each new reading replaces the oldest of the twelve values maintained. Maximum and minimum values are retained until reset by the user.

There are a number of other internal routines in STATS. For example, all statistical data collected by the Monitor is subject to age out. Thus, if no activity is seen for an address (or address pair) in the time period defined for age out, then the data is discarded and the space reclaimed so that it may be recycled. In this manner, the Monitor is able to use the memory for active elements rather than stale data. The user can select the age out times for the different components. The EM periodically kicks off the aging mechanism to perform this recycling of resources. STATS provides the routines which the EM calls, e.g. stats_age.

There are also routines in STATS to allocate and deallocate Statistics, e.g., stats_allocate and stats_deallocate. The allocate routine is called when stations and dialogs are picked up by the Network Monitor. The deallocate routine is called by the aging routines when a structure is to be recycled.

The Data Structures in STATS

The general structure of the database within STATS is illustrated by FIGS. 7a–c, which shows information that is maintained for the Data Link Layer (DLL) and its organization. A set of data structures is kept for each address associated with the layer. In this case there are three relevant addresses, namely a segment address, indicating which segment the node is on, a MAC address for the node on the segment, and an address which identifies the dialog occurring over that layer. The dialog address is the combination of the MAC addresses for the two nodes which make up the dialog. Thus, the overall data structure has three identifiable components: a segment address data structure (see FIG. 7a), a MAC address data structure (see FIG. 7b) and a dialog data structure (see FIG. 7c).

The segment address structure includes a doubly linked list 102 of segment address records 104, each one for a different segment address. Each segment address record 104 contains a forward and backward link (field 106) for forward and backward pointers to neighboring records and a hash link (field 108). In other words, the segment address records are accessed by either walking down the doubly linked list or by using a hashing mechanism to generate a pointer into the doubly linked list to the first record of a smaller hash linked list. Each record also contains the address of the segment (field 110) and a set of fields for other information. Among these are a flags field 112, a type field 114, a parse_control field 116, and an EM_control field 118. Flags field 112 contains a bit which indicates whether the identified address corresponds to the address of another Network Monitor. This field only has meaning in the MAC address record and not in the segment or dialog address record. Type field 114 identifies the MIB group which applies to this address. Parse control field 116 is a bit mask which indicates what subgroups of statistics from the identified MIB group are maintained, if any. Flags field 112, type field 114 and parse control field 116 make up what is referred to as the parse control record for this MAC address. The Network Monitor uses a default value for parse control field 116 upon initialization or whenever a new node is detected. The default value turns off all statistics gathering. The statistics gathering for any particular address may subsequently be turned on by the Workstation through a Network Monitor control command that sets the appropriate bits of the parse control field to one.

EM_control field 118 identifies the subgroups of statistics within the MIB group that have changed since the EM last serviced the database to update rates and other variables. This field is used by the EM to identify those parts of STATS which must be updated or for which recalculations must be performed when the EM next services STAT.

Each segment address record 104 also contains three fields for time related information. There is a start_time field 120 for the time that is used to perform some of the rate calculations for the underlying statistics; a first_seen field 122 for the time at which the Network Monitor first saw the communication; and a last_seen field 124 for the time at which the last communication was seen. The last_seen time is used to age out the data structure if no activity is seen on the segment after a preselected period of time elapses. The first_seen time is a statistic which may be of interest to the network manager and is thus retrievable by the Management Workstation for display.

Finally, each segment address record includes a stats_pointer field 126 for a pointer to a DLL segment statistics data structure 130 which contains all of the statistics that are maintained for the segment address. If the bits in parse_control field 116 are all set to off, indicating that no statistics are to be maintained for the address, then the pointer in stats_pointer field 126 is a null pointer.

The list of events shown in data structure 130 of FIG. 7a illustrates the type of data that is collected for this address when the parse control field bits are set to on. Some of the entries in DLL segment statistics data structure 130 are pointers to buckets for historical data. In the case where buckets are maintained, there are twelve buckets each of which represents a time period of five minutes duration and each of which generally contains two items of information, namely, a count for the corresponding five minute time period and a MAX rate for that time period. MAX rate records any spikes which have occurred during the period and which the user may not have observed because he was not viewing that particular statistic at the time.

At the end of DLL segment statistics data structure 130, there is a protocol_Q pointer 132 to a linked list 134 of protocol statistics records 136 identifying all of the protocols which have been detected running on top of the DLL layer for the segment. Each record 136 includes a link 138 to the next record in the list, the identity of the protocol (field 140), a frames count for the number of frames detected for the identified protocol (field 142); and a frame rate (field 144).

The MAC address data structure is organized in a similar manner to that of the segment data structure (see FIG. 7b). There is a doubly linked list 146 of MAC address records 148, each of which contains the same type of information as is stored in DLL segment address records 104. A pointer 150 at the end of each MAC address record 148 points to a DLL address statistics data structure 152, which like the DLL segment address data structure 130, contains fields for all of the statistics that are gathered for that DLL MAC address. Examples of the particular statistics are shown in FIG. 7b.

At the end of DLL address statistics data structure 152, there are two pointer fields 152 and 154, one for a pointer to a record 158 in a dialog link queue 160, and the other for a pointer to a linked list 162 of protocol statistics records 164. Each dialog link queue entry 158 contains a pointer to the next entry (field 168) in the queue and it contains a dialog_addr pointer 170 which points to an entry in the DLL dialog queue which involves the MAC address. (see FIG. 7c). Protocol statistics records 164 have the same structure and contain the same categories of information as their counterparts hanging off of DLL segment statistics data structure 130.

The above-described design is repeated in the DLL dialog data structures. That is, dialog record 172 includes the same categories of information as its counterpart in the DLL segment address data structure and the MAC address data structure. The address field 174 contains the addresses of both ends of the dialog concatenated together to form a single address. The first and second addresses within the single address are arbitrarily designated nodes 1 and 2, respectively. In the stats_pointer field 176 there is a pointer to a dialog statistics data structure 178 containing the relevant statistics for the dialog. The entries in the first two fields in this data structure (i.e., fields 180 and 182) are designated protocol entries and protocols. Protocol entries is the number of different protocols which have been seen between the two MAC addresses. The protocols that have been seen are enumerated in the protocols field 182.

DLL dialog statistics data structure 178, illustrated by FIG. 7c, includes several additional fields of information which only appear in these structures for dialogs for which state information can be kept (e.g. TCP connection). The additional fields identify the transport protocol (e.g., TCP) (field 184) and the application which is running on top of that protocol (field 186). They also include the identity of the initiator of the connection (field 188), the state of the connection (field 190) and the reason that the connection was closed, when it is closed (field 192). Finally, they also include a state_pointer (field 194) which points to a history data structure that will be described in greater detail later. Suffice it to say, that the history data structure contains a short history of events and states for each end of the dialog. The state machine uses the information contained in the history data structure to loosely determine what the state of each of the end nodes is throughout the course of the connection. The qualifier "loosely" is used because the state machine does not closely shadow the state of the connection and thus is capable of recovering from loss of state due to lost packets or missed communications.

The above-described structures and organization are used for all layers and all protocols within STATS.

Real Time Parser (RTP)

The RTP runs as an application task. It is scheduled by the Real Time Kernel scheduler when received frames are detected. The RTP parses the frames and causes statistics, state tracking, and tracing operations to be performed.

The functions of the RTP are:

| | |
|---|---|
| * | obtain frames from the RTP Input Queue; |
| * | parse the frames; |
| * | maintain statistics using routines supplied by the STATS module; |
| * | maintain protocol state information; |
| * | notify the MTM via an ITM if a frame has been received with the Network Monitor's address as the destination address; and |
| * | notify the EM via an ITM if a frame has been received with any Network Monitor's address as the source address. |

The design of the RTP is straightforward. It is a collection of routines which perform protocol parsing. The RTP interfaces to the Real Time Kernel in order to perform RTP initialization, to be scheduled in order to parse frames, to free frames, to obtain and send an ITM to another task; and to report fatal errors. The RTP is invoked by the scheduler when there is at least one frame to parse. The appropriate parse routines are executed per frame. Each parse routine invokes the next level parse routine or decides that parsing is done. Termination of the parse occurs on an error or when the frame has been completely parsed.

Each parse routine is a separately compilable module. In general, parse routines share very little data. Each knows where to begin parsing in the frame and the length of the data remaining in the frame.

The following is a list of the parse routines that are available within RTP for parsing the different protocols at the various layers.

Data Link Layer Parse—rtp_dll_parse:
  This routine handles Ethernet, IEEE 802.3, IEEE 802.2, and SNAP. See RFC 1010, Assigned Numbers for a description of SNAP (Subnetwork Access Protocol).
Address Resolution Protocol Parse—rtp_arp_parse
  ARP is parsed as specified in RFC 826.
Internet Protocol Parse—rtp_ip_parse
  IP Version 4 is parsed as specified in RFC 791 as amended by RFC 950, RFC 919, and RFC 922.
Internet Control Message Protocol Parse—rtp_icmp_parse
  ICMP is parsed as specified in RFC 792.
Unit Data Protocol Parse—rtp_udp_parse
  UDP is parsed as specified in RFC 768.
Transmission Control Protocol Parse—rtp_tcp_parse
  TCP is parsed as specified in RFC 793.
Simple Mail Transfer Protocol Parse—rtp_smtp_parse
  SMTP is parsed as specified in RFC 821.
File Transfer Protocol Parse—rtp_ftp_parse
  FTP is parsed as specified in RFC 959.
Telnet Protocol Parse—rtp_telnet_parse
  The Telnet protocol is parsed as specified in RFC 854.
Network File System Protocol Parse—rpt_nfs_parse
  The NFS protocol is parsed as specified in RFC 1094.

The RTP calls routines supplied by STATS to look up data structures. By calling these lookup routines, global pointers to data structures are set up. Following are examples of the pointers to statistics data structures that are set up when parse routines call Statistics module lookup routines.

mac_segment, mac_dst_segment, mac_this_segment,
  mac_src, mac_dst, mac dialog
  ip_src_segment, ip_dst_segment, ip_this_segment,
  ip_src, ip_dst, ip_dialog
  tcp_src_segment, tcp_dst_segment, tcp_this_segment,
  tcp_src, tcp_dst, tcp_src_socket, tcp_dst_socket, tcp_connection The mac_src and mac_dst routines return pointers to the data structures within STATS for the source MAC address and the destination MAC address, respectively. The lookup_mac_dialog routine returns a pointer to the data structure within STATS for the dialog between the two nodes on the MAC layer. The other STATS routines supply similar pointers for data structures relevant to other protocols.

The RTP routines are aware of the names of the statistics that must be manipulated within the data base (e.g. frames, bytes) but are not aware of the structure of the data. When a statistic is to be manipulated, the RTP routine invokes a macro which manipulates the appropriate statistics in data structures. The macros use the global pointers which were set up during the lookup process described above.

After a frame has been parsed (whether the parse was successful or not), the RTP routine examines the destination mac and ip addresses. If either of the addresses is that of the Network Monitor, RTP obtains a low priority ITM, initializes it, and sends the ITM to the MTM task. One of the fields of the ITM contains the address of the buffer containing the frame.

The RTP must hand some received frames to the EM in order to accomplish the autotopology function (described later). After a frame has been parsed (whether the parse was successful or not), the RTP routine examines the source mac and ip addresses. If either of the addresses is that of another Network Monitor, RTP obtains a low priority ITM, initializes it and sends the ITM to the EM task. The address data structure (in particular, the flags field of the parse control record) within STATS for the MAC or the IP address indicates whether the source address is that of another Network Monitor. One of the fields of the ITM contains the address of the buffer containing the frame.

The RTP receives traffic frames from the network for analysis. RTP operation may be modified by sending control messages to the Monitor. RTP first parses these messages, then detects that the messages are destined for the Monitor and passes them to the MTM task. Parameters which affect RTP operation may be changed by such control messages.

The general operation of the RTP upon receipt of a traffic frame is as follows:

Get next frame from input queue get address records for these stations

For each level of active parsing

{ get pointer to start of protocol header call layer parse routine determine protocol at next level set pointer to start of next layer protocol }end of frame parsing if this is a monitor command add to MTM input queue if this frame is from another monitor, pass to EM check for overload—if yes tell control The State Machine:

In the described embodiment, the state machine determines and keeps state for both addresses of all TCP connections. TCP is a connection oriented transport protocol, and TCP clearly defines the connection in terms of states of the connection. There are other protocols which do not explicitly define the communication in terms of state, e.g. connectionless protocols such as NFS. Nevertheless, even in the connectionless protocols there is implicitly the concept of state because there is an expected order to the events which will occur during the course of the communication. That is, at the very least, one can identify a beginning and an end of the communication, and usually some sequence of events which will occur during the course of the communication. Thus, even though the described embodiment involves a connection oriented protocol, the principles are applicable to many connectionless protocols or for that matter any protocol for which one can identify a beginning and an end to the communication under that protocol.

Whenever a TCP packet is detected, the RTP parses the information for that layer to identify the event associated with that packet. It then passes the identified event along with the dialog identifier to the state machine. For each address of the two parties to the communication, the state machine determines what the current state of the node is. The code within the state machine determines the state of a connection based upon a set of rules that are illustrated by the event/state table shown in FIG. 8.

The interpretation of the event/state table is as follows. The top row of the table identifies the six possible states of a TCP connection. These states are not the states defined in the TCP protocol specification. The left most column identifies the eight events which may occur during the course of a connection. Within the table is an array of boxes, each of which sits at the intersection of a particular event/state combination. Each box specifies the actions taken by the state machine if the identified event occurs while the connection is in the identified state. When the state machine receives a new event, it may perform three types of action. It may change the recorded state for the node. The state to which the node is changed is specified by the S="STATE" entry located at the top of the box. It may increment or decrement the appropriate counters to record the information relevant to that event's occurrence. (In the table, incrementing and decrementing are signified by the ++ and the -- symbols, respectively, located after the identity of the variable being updated.) or the state machine may take other actions such as those specified in the table as start close timer, Look__for__Data__State, or Look__at__History (to be described shortly). The particular actions which the state machine takes are specified in each box. An empty box indicates that no action is taken for that particular event/state combination. Note, however, that the occurrence of an event is also likely to have caused the update of statistics within STATS, if not by the state machine, then by some other part of the RTP. Also note that it may be desirable to have the state machine record other events, in which case the state table would be modified to identify those other actions.

Two events appearing on the table deserve further explanation, namely, close timer expires and inactivity timer expires. The close timer, which is specified by TCP, is started at the end of a connection and it establishes a period during which any old packets for the connection which are received are thrown away (i.e., ignored). The inactivity timer is not specified by TCP but rather is part of the Network Monitor's resource management functions. Since keeping statistics for dialogs (especially old dialogs) consumes resources, it is desirable to recycle resources for a dialog if no activity has been seen for some period of time. The inactivity timer provides the mechanism for accomplishing this. It is restarted each time an event for the connection is received. If the inactivity timer expires (i.e., if no event is received before the timer period ends), the connection is assumed to have gone inactive and all of the resources associated with the dialog are recycled. This involves freeing them up for use by other dialogs.

The other states and events within the table differ from but are consistent with the definitions provided by TCP and should be self evident in view of that protocol specification.

The event/state table can be read as follows. Assume, for example, that node 1 is in DATA state and the RTP receives another packet from node 1 which it determines to be a TCP FIN packet. According to the entry in the table at the intersection of FIN/DATA (i.e., event/state), the state machine sets the state of the connection for node 1 to CLOSING, it decrements the active connections counter and it starts the close timer. When the close timer expires, assuming no other events over that connection have occurred, the state machine sets node 1's state to CLOSED and it starts the inactivity timer. If the RTP sends another SYN packet to reinitiate a new connection before the inactive timer expires, the state machine sets node 1's state to CONNECTING (see the SYN/CLOSED entry) and it increments an after close counter.

When a connection is first seen, the Network Monitor sets the state of both ends of the connection to UNKNOWN state. If some number of data and acknowledgment frames are seen from both connection ends, the states of the connection ends may be promoted to DATA state. The connection history is searched to make this determination as will be described shortly.

Referring to FIGS. 9a–b, within STATS there is a history data structure 200 which the state machine uses to remember the current state of the connection, the state of each of the nodes participating in the connection and a short history of state related information. History data structure 200 is identified by a state_pointer found at the end of the associated dialog statistics data structure in STATS (see FIG. 7c). Within history data structure 200, the state machine records the current state of node 1 (field 202), the current state of node 2 (field 206) and other data relating to the corresponding node (fields 204 and 208). The other data includes, for example, the window size for the receive and transmit communications, the last detected sequence numbers for the data and acknowledgment frames, and other data transfer information.

History data structure 200 also includes a history table (field 212) for storing a short history of events which have occurred over the connection and it includes an index to the next entry within the history table for storing the information about the next received event (field 210). The history table is implemented as a circular buffer which includes sufficient memory to store, for example, 16 records. Each record, shown in FIG. 9b, stores the state of the node when the event was detected (field 218), the event which was detected (i.e., received) (field 220), the data field length (field 222), the sequence number (field 224), the acknowledgment sequence number (field 226) and the identity of the initiator of the event, i.e., either node 1 or node 2 or 0 if neither (field 228).

Though the Network Monitor operates in a promiscuous mode, it may occasionally fail to detect or it may, due to overload, lose a packet within a communication. If this occurs the state machine may not be able to accurately determine the state of the connection upon receipt of the next event. The problem is evidenced by the fact that the next event is not what was expected. When this occurs, the state machine tries to recover state by relying on state history information stored in the history table in field 212 to deduce what the state is. To deduce the current state from historical information, the state machine uses one of the two previously mentioned routines, namely, Look_for_Data_State and Look_at_History.

Referring to FIG. 10, Look_for_Data_State routine 230 searches back through the history one record at a time until it finds evidence that the current state is DATA state or until it reaches the end of the circular buffer (step 232). Routine 230 detects the existence of DATA state by determining whether node 1 and node 2 each have had at least two data events or two acknowledgment combinations with no intervening connect, disconnect or abort events (step 234). If such a sequence of events is found within the history, routine 230 enters both node 1 and node 2 into DATA state (step 236), it increments the active connections counter (step 238) and then it calls a Look_for_Initiator routine to look for the initiator of the connection (step 240). If such a pattern of events is not found within the history, routine 230 returns without changing the state for the node (step 242).

As shown in FIG. 11, Look_for_Initiator routine 240 also searches back through the history to detect a telltale event pattern which identifies the actual initiator of the connection (step 244). More specifically, routine 240 determines whether nodes 1 and 2 each sent connect-related packets. If they did, routine 240 identifies the initiator as the first node to send a connect-related packet (step 246). If the search is not successful, the identity of the connection initiator remains unknown (step 248).

The Look_at_History routine is called to check back through the history to determine whether data transmissions have been repeated. In the case of retransmissions, the routine calls a Look_for_Retransmission routine 250, the operation of which is shown in FIG. 12. Routine 250 searches back through the history (step 252) and checks whether the same initiator node has sent data twice (step 254). It detects this by comparing the current sequence number of the packet as provided by the RTP with the sequence numbers of data packets that were previously sent as reported in the history table. If a retransmission is spotted, the retransmission counter in the dialog statistics data structure of STATS is incremented (step 256). If the sequence number is not found within the history table, indicating that the received packet does not represent a retransmission, the retransmission counter is not incremented (step 258).

Other statistics such as Window probes and keep alives may also be detected by looking at the received frame, data transfer variables, and, if necessary, the history.

Even if frames are missed by the Network Monitor, because it is not directly "shadowing" the connection, the Network Monitor still keeps useful statistics about the connection. If inconsistencies are detected the Network Monitor counts them and, where appropriate, drops back to UNKNOWN state. Then, the Network Monitor waits for the connection to stabilize or deteriorate so that it can again determine the appropriate state based upon the history table.

Principal Transactions of Network Monitor Modules:

The transactions which represent the major portion of the processing load within the Monitor, include monitoring, actions on threshold alarms, processing database get/set requests from the Management Workstation, and processing monitor control requests from the Management Workstation. Each of these mechanisms will now be briefly described.

Monitoring involves the message sequence shown in FIG. 13. In that figure, as in the other figures involving message sequences, the numbers under the heading SEQ. identify the major steps in the sequence. The following steps occur:

1. ISR puts Received traffic frame ITM on RTP input queue
2. request address of pertinent data structure from STATS (get parse control record for this station)
3. pass pointer to RTP
4. update statistical objects by call to statistical update routine in STATS using pointer to pertinent data structure
5. parse completed—release buffers The major steps which follow a statistics threshold event (i.e., an alarm event) are shown in FIG. 14. The steps are as follows:

1. statistical object update causes threshold alarm
2. STATS generates threshold event ITM to event manager (EM)
3. look up appropriate action for this event
4. perform local event processing
5. generate network alarm ITM to MTM Xmit (if required)
6. format network alarm trap for Workstation from event manager data
7. send alarm to Workstation The major steps in processing of a database update request (i.e., a get/set request) from the Management Workstation are shown in FIG. 15. The steps are as follows:

1. LAN ISR receives frame from network and passes it to RTP for parsing
2. RTP parses frame as for any other traffic on segment.
3. RTP detects frame is for monitor and sends received Workstation message over LAN ITM to MTM Recv.
4. MTM Recv processes protocol stack.

5. MTM Recv sends database update request ITM to EM.
6. EM calls STATS to do database read or database write with appropriate IMPB
7. STATS performs database access and returns response to EM.
8. EM encodes response to Workstation and sends database update response ITM to MTM Xmit
9. MTM Xmit transmits.

The major steps in processing of a monitor control request from the Management Workstation are shown in FIG. 16. The steps are as follows:

1. Lan ISR receives frame from network and passes received frame ITM to RTP for parsing.
2. RTP parses frame as for any other traffic on segment.
3. RTP detects frame is for monitor and sends received workstation message over LAN ITM to MTM Recv.
4. MTM Recv processes protocol stack and decodes workstation command.
5. MTM Recv sends request ITM to EM.
6. EM calls Control with monitor control IMPB.
7. Control performs requested operation and generates response to EM.
8. EM sends database update response ITM to MTM Xmit.
9. MTM Xmit encodes response to Workstation and transmits.

The Monitor/Workstation Interface:

The interface between the Monitor and the Management Workstation is based on the SNMP definition (RFC 1089 SNMP; RFC 1065 SMI; RFC 1066 SNMP MIB—Note: RFC means Request for Comments). All five SNMP PDU types are supported:

get-request
get-next-request
get-response
set-request
trap

The SNMP MIB extensions are designed such that where possible a user request for data maps to a single complex MIB object. In this manner, the get-request is simple and concise to create, and the response should contain all the data necessary to build the screen. Thus, if the user requests the IP statistics for a segment this maps to an IP Segment Group.

The data in the Monitor is keyed by addresses (MAC, IP) and port numbers (telnet, FTP). The user may wish to relate his data to physical nodes entered into the network map. The mapping of addresses to physical nodes is controlled by the user (with support from the Management Workstation system where possible) and the Workstation retains this information so that when a user requests data for node 'Joe' the Workstation asks the Monitor for the data for the appropriate address(es). The node to address mapping need not be one to one.

Loading and dumping of monitors uses TFTP (Trivial File Transfer Protocol). This operates over UDP as does SNMP. The Monitor to Workstation interface follows the SNMP philosophy of operating primarily in a polled mode. The Workstation acts as the master and polls the Monitor slaves for data on a regular (configurable) basis.

The information communicated by the SNMP is represented according to that subset of ASN.1 (ISO 8824 Specification of ASN.1) defined in the Internet standard Structure of Management Information (SMI—RFC 1065). The subset of the standard Management Information Base (MIB) (RFC 1066 SNMP MIB) which is supported by the Workstation is defined in Appendix III. The added value provided by the Workstation is encoded as enterprise specific extensions to the MIB as defined in Appendix IV. The format for these extensions follows the SMI recommendations for object identifiers so that the Workstation extensions fall in the subtree 1.3.6.1.4.1.x.1. where x is an enterprise specific node identifier assigned by the IAB.

Appendix V is a summary of the network variables for which data is collected by the Monitor for the extended MIB and which can be retrieved by the Workstation. The summary includes short descriptions of the meaning and significance of the variables, where appropriate.

The Management Workstation:

The Management Workstation is a SUN Sparcstation (also referred to as a Sun) available from Sun Microsystems, Inc. It is running the Sun flavor of Unix and uses the Open Look Graphical User Interface (GUI) and the SunNet Manager as the base system. The options required are those to run SunNet Manager with some additional disk storage requirement.

The network is represented by a logical map illustrating the network components and the relationships between them, as shown in FIG. 17. A hierarchical network map is supported with navigation through the layers of the hierarchy, as provided by SNM. The Management Workstation determines the topology of the network and informs the user of the network objects and their connectivity so that he can create a network map. To assist with the map creation process, the Management Workstation attempts to determine the stations connected to each LAN segment to which a Monitor is attached. Automatic determination of segment topology by detecting stations is performed using the autotopology algorithms as described in copending U.S. patent application Ser. No. 07/641,156, entitled "Automatic Topology Monitor for Multi-Segment Local Area Network" filed on Jan. 14, 1991 now U.S. Pat. No. 5,546,540 (Attorney Docket No. 13283-NE.APP), incorporated herein by reference.

In normal operation, each station in the network is monitored by a single Monitor that is located on its local segment. The initial determination of the Monitor responsible for a station is based on the results of the autotopology mechanism. The user may override this initial default if required.

The user is informed of new stations appearing on any segment in the network via the alarm mechanism. As for other alarms, the user may select whether stations appearing on and disappearing from the network segment generate alarms and may modify the times used in the aging algorithms. When a new node alarm occurs, the user must add the new alarm to the map using the SNM tools. In this manner, the SNM system becomes aware of the nodes.

The sequence of events following the detection of a new node is:

1. the location of the node is determined automatically for the user.
2. the Monitor generates an alarm for the user indicating the new node and providing some or all of the following information:
   mac address of node
   ip address of node
   segment that the node is believed to be located on
   Monitor to be responsible for the node
3. the user must select the segment and add the node manually using the SNM editor
4. The update to the SNM database will be detected and the file reread. The Workstation database is reconstructed and the parse control records for the Monitors updated if required.

5. The Monitor responsible for the new node has its parse control record updated via SNMP set request(s).

An internal record of new nodes is required for the autotopology. When a new node is reported by a Network Monitor, the Management Workstation needs to have the previous location information in order to know which Network Monitors to involve in autotopology. For example, two nodes with the same IP address may exist in separate segments of the network. The history makes possible the correlation of the addresses and it makes possible duplicate address detection.

Before a new Monitor can communicate with the Management Workstation via SNMP it needs to be added to the SNM system files. As the SNM files are cached in the database, the file must be updated and the SNM system forced to reread it.

Thus, on the detection of a new Monitor the following events need to occur in order to add the Monitor to the Workstation:

1. The Monitor issues, a trap to the Management Workstation software and requests code to be loaded from the Sun Microsystems boot/load server.
2. The code load fails as the Monitor is not known to the unix networking software at this time.
3. The Workstation confirms that the new Monitor does not exceed the configured system limits (e.g. 5 Monitors per Workstation) and terminates the initialization sequence if limits are exceeded. An alarm is issued to the user indicating the presence of the new Monitor and whether it can be supported.
4. The user adds the Monitor to the SNMP.HOSTS file of the SNM system, to the etc/hosts file of the Unix networking system and to the SNM map.
5. When the files have been updated the user resets the Monitor using the set tool (described later).
6. The Monitor again issues a trap to the Management Workstation software and requests code to be loaded from the Sun boot/load server.
7. The code load takes place and the Monitor issues a trap requesting data from the Management Workstation.
8. The Monitor data is issued using SNMP set requests. Note that on receiving the set request, the SNMP proxy rereads in the (updated) SNMP.HOSTS file which now includes the new Monitor. Also note that the SNMP hosts file need only contain the Monitors, not the entire list of nodes in the system.
9. On completion of the set request(s) the Monitor run command is issued by the Workstation to bring the Monitor on line.

The user is responsible for entering data into the SNM database manually. During operation, the Workstation monitors the file write date for the SNM database. When this is different from the last date read, the SNM database is reread and the Workstation database reconstructed. In this manner, user updates to the SNM database are incorporated into the Workstation database as quickly as possible without need for the user to take any action.

When the Workstation is loaded, the database is created from the data in the SNM file system (which the user has possibly updated). This data is checked for consistency and for conformance to the limits imposed by the Workstation at this time and a warning is generated to the user if any problems are seen. If the data errors are minor the system continues operation; if they are fatal the user is asked to correct them and Workstation operation terminates.

The monitoring functions of the Management Workstation are provided as an extension to the SNM system. They consist of additional display tools (i.e., summary tool, values tool, and set tool) which the user invokes to access the Monitor options and a Workstation event log in which all alarms are recorded.

As a result of the monitoring process, the Monitor makes a large number of statistics available to the operator. These are available for examination via the Workstation tools that are provided. In addition, the Monitor statistics (or a selected subset thereof) can be made visible to any SNMP manager by providing it with knowledge of the extended MIB. A description of the statistics maintained are described elsewhere.

Network event statistics are maintained on a per network, per segment and per node basis. Within a node, statistics are maintained on a per address (as appropriate to the protocol layer—IP address, port number, . . . ) and per connection basis. Per network statistics are always derived by the Workstation from the per segment variables maintained by the Monitors. Subsets of the basic statistics are maintained on a node to node and segment to segment basis.

If the user requests displays of segment to segment traffic, the Workstation calculates this data as follows. The inter segment traffic is derived from the node to node statistics for the intersecting set of nodes. Thus, if segment A has nodes 1, 2, and 3 and segment B has nodes 20, 21, and 22, then summing the node to node traffic for

1→20,21,22
2→20,21,22
3→20,21,22 produces the required result. On-LAN/off-LAN traffic for segments is calculated by a simply summing node to node traffic for all stations on the LAN and then subtracting this from total segment counts.

Alarms are reported to the user in the following ways:

1. Alarms received are logged in a Workstation log.
2. The node which the alarm relates to is highlighted on the map.
3. The node status change is propagated up through the (map) hierarchy to support the case where the node is not visible on the screen. This is as provided by SNM.

Summary Tool

After the user has selected an object from the map and invokes the display tools, the summary tool generates the user's initial screen at the Management Workstation. It presents a set of statistical data selected to give an overview of the operational status of the object (e.g., a selected node or segment). The Workstation polls the Monitor for the data required by the Summary Tool display screens.

The Summary Tool displays a basic summary tool screen such as is shown in FIG. 18. The summary tool screen has three panels, namely, a control panel 602, a values panel 604, and a dialogs panel 606. The control panel includes the indicated mouse activated buttons. The functions of each of the buttons is as follows. The file button invokes a traditional file menu. The view button invokes a view menu which allows the user to modify or tailor the visual properties of the tool. The properties button invokes a properties menu containing choices for viewing and sometimes modifying the properties of objects. The tools button invokes a tools menu which provides access to the other Workstation tools, e.g. Values Tool.

The Update Interval field allows the user to specify the frequency at which the displayed statistics are updated by polling the Monitor. The Update Once button enables the user to retrieve a single screen update. When the Update Once button is invoked not only is the screen updated but the update interval is automatically set to "none".

The type field enables the user to specify the type of network objects on which to operate, i.e., segment or node.

The name button invokes a pop up menu containing an alphabetical list of all network objects of the type selected and apply and reset buttons. The required name can then be selected from the (scrolling) list and it will be entered in the name field of the summary tool when the apply button is invoked. Alternatively, the user may enter the name directly in the summary tool name field.

The protocol button invokes a pop up menu which provides an exclusive set of protocol layers which the user may select. Selection of a layer copies the layer name into the displayed field of the summary tool when the apply operation is invoked. An example of a protocol selection menu is shown in FIG. 19. It displays the available protocols in the form of a protocol tree with multiple protocol families. The protocol selection is two dimensional. That is, the user first selects the protocol family and then the particular layer within that family.

As indicated by the protocol trees shown in FIG. 19, the capabilities of the Monitor can be readily extended to handle other protocol families. The particular ones which are implemented depend upon the needs of the particular network environment in which the Monitor will operate.

The user invokes the apply button to indicate that the selection process is complete and the type, name, protocol, etc. should be applied. This then updates the screen using the new parameter set that the user selected. The reset button is used to undo the selections and restore them to their values at the last apply operation.

The set of statistics for the selected parameter set is displayed in values panel 604. The members of the sets differ depending upon, for example, what protocol was selected. FIGS. 20a–g present examples of the types of statistical variables which are displayed for the DLL, IP, UDP, TCP, ICMP, NFS, and ARP/RARP protocols, respectively. The meaning of the values display fields are described in Appendix I, attached hereto.

Dialogs panel 606 contains a display of the connection statistics for all protocols for a selected node. Within the Management Workstation, connection lists are maintained per node, per supported protocol. When connections are displayed, they are sorted on "Last Seen" with the most current displayed first. A single list returned from the Monitor contains all current connection. For TCP, however, each connection also contains a state and TCP connections are displayed as Past and Present based upon the returned state of the connection. For certain dialogs, such as TCP and NFS over UDP, there is an associated direction to the dialog, i.e., from the initiator (source) to the receiver (sink). For these dialogs, the direction is identified in a DIR. field. A sample of information that is displayed in dialogs panel 606 is presented in FIG. 21 for current connections.

Values Tool

The values tool provides the user with the ability to look at the statistical database for a network object in detail. When the user invokes this tool, he may select a basic data screen containing a rate values panel 620, a count values panel 622 and a protocols seen panel 626, as shown in FIG. 22, or he may select a traffic matrix screen 628, as illustrated in FIG. 23.

In rate values and count values panels 620 and 622, value tools presents the monitored rate and count statistics, respectively, for a selected protocol. The parameters which are displayed for the different protocols (i.e., different groups) are listed in Appendix II. In general, a data element that is being displayed for a node shows up in three rows, namely, a total for the data element, the number into the data element, and the number out of the data element. Any exceptions to this are identified in Appendix II. Data elements that are displayed for segments, are presented as totals only, with no distinction between Rx and Tx.

When invoked the Values Tool displays a primary screen to the user. The primary screen contains what is considered to be the most significant information for the selected object. The user can view other information for the object (i.e., the statistics for the other parameters) by scrolling down.

The displayed information for the count values and rate values panels 620 and 622 includes the following. An alarm field reports whether an alarm is currently active for this item. It displays as "*" if active alarm is present. A Current Value/Rate field reports the current rate or the value of the counter used to generate threshold alarms for this item. This is reset following each threshold trigger and thus gives an idea of how close to an alarm threshold the variable is. A Typical Value field reports what this item could be expected to read in a "normal" operating situation. This field is filled in for those items where this is predictable and useful. It is maintained in the Workstation database and is modifiable by the user using the set tool. An Accumulated Count field reports the current accumulated value of the item or the current rate. A Max Value field reports the highest value recently seen for the item. This value is reset at intervals defined by a user adjustable parameter (default 30 minutes). This is not a rolling cycle but rather represents the highest value since it was reset which may be from 1 to 30 minutes ago (for a rest period of 30 minutes). It is used only for rates. A Min Value field reports the lowest value recently seen for the item. This operates in the same manner as Max Value field and is used only for rates.

A Percent (%) field reports only for the following variables:

```
off seg counts:
    100 (in count / total off seg count)
    100 (out count / total off seg count)
    100 (transit count / total off seg count)
    100 (local count / total off seg count)
off seg rates
    100 (transit rate / total off seg rate), etc.
protocols
    100 (frame rate this protocol / total frame rate)
```

On the right half of the basic display, there the following additional fields: a High Threshold field and a Sample period for rates field.

Set Tool

The set tool provides the user with the ability to modify the parameters controlling the operation of the Monitors and the Management Workstation. These parameters affect both user interface displays and the actual operation of the Monitors. The parameters which can be operated on by the set tool can be divided into the following categories: alarm thresholds, monitoring control, segment Monitor administration, and typical values.

The monitoring control variables specify the actions of the segment Monitors and each Monitor can have a distinct set of control variables (e.g., the parse control records that are described elsewhere). The user is able to define those nodes, segments, dialogs and protocols in which he is interested so as to make the best use of memory space available for data storage. This mechanism allows for load sharing, where multiple Monitors on the same segment can divide up the total number of network objects which are to be monitored so that no duplication of effort between them takes place.

The monitor administration variables allow the user to modify the operation of the segment Monitor in a more direct manner than the monitoring control variables. Using the set tool, the user can perform those operations such as reset, time changes etc. which are normally the prerogative of a system administrator.

Note that the above descriptions of the tools available through the Management Workstation are not meant to imply that other choices may not be made regarding the particular information which is displayed and the manner in which it is displayed.

Adaptively Setting Network Monitor Thresholds:

The Workstation sets the thresholds in the Network Monitor based upon the performance of the system as observed over an extended period of time. That is, the Workstation periodically samples the output of the Network Monitors and assembles a model of a normally functioning network. Then, the Workstation sets the thresholds in the Network Monitors based upon that model. If the observation period is chosen to be long enough and since the model represents the "average" of the network performance over the observation period, temporary undesired deviations from normal behavior are smoothed out over time and model tends to accurately reflect normal network behavior.

Referring the FIG. 24, the details of the training procedure for adaptively setting the Network Monitor thresholds are as follows. To begin training, the Workstation sends a start learning command to the Network Monitors from which performance data is desired (step 302). The start learning command disables the thresholds within the Network Monitor and causes the Network Monitor to periodically send data for a predefined set of network parameters to the Management Workstation. (Disabling the thresholds, however, is not necessary. One could have the learning mode operational in parallel with monitoring using existing thresholds.) The set of parameters may be any or all of the previously mentioned parameters for which thresholds are or may be defined.

Throughout the learning period, the Network Monitor sends "snapshots" of the network's performance to the Workstation which, in turn, stores the data in a performance history database 306 (step 304). The network manager sets the length of the learning period. Typically, it should be long enough to include the full range of load conditions that the network experiences so that a representative performance history is generated. It should also be long enough so that short periods of overload or faulty behavior do not distort the resulting averages.

After the learning period has expired, the network manager, through the Management Workstation, sends a stop learning command to the Monitor (step 308). The Monitor ceases automatically sending further performance data updates to the Workstation and the Workstation processes the data in its performance history database (step 310). The processing may involve simply computing averages for the parameters of interest or it may involve more sophisticated statistical analysis of the data, such as computing means, standard deviations, maximum and minimum values, or using curve fitting to compute rates and other pertinent parameter values.

After the Workstation has statistically analyzed the performance data, it computes a new set of thresholds for the relevant performance parameters (step 312). To do this, it uses formulas which are appropriate to the particular parameter for which a threshold is being computed. That is, if the parameter is one for which one would expect to see wide variations in its value during network monitoring, then the threshold should be set high enough so that the normal expected variations do not trigger alarms. On the other hand, if the parameter is of a type for which only small variations are expected and larger variations indicate a problem, then the threshold should be set to a value that is close to the average observed value. Examples of formulae which may be used to compute thresholds are:

| | |
|---|---|
| * | Highest value seen during learning period; |
| * | Highest value seen during learning period + 10%; |
| * | Highest value seen during learning period + 50%; |
| * | Highest value seen during learning period + user-defined percent; |
| * | Any value of the parameter other than zero; |
| * | Average value seen during learning period + 50%; and |
| * | Average value seen during learning period + user-defined percent |

As should be evident from these examples, there is a broad range of possibilities regarding how to compute a particular threshold. The choice, however, should reflect the parameter's importance in signaling serious network problems and its normal expected behavior (as may be evidenced from the performance history acquired for the parameter during the learning mode).

After the thresholds are computed, the Workstation loads them into the Monitor and instructs the Monitor to revert to normal monitoring using the new thresholds (step 314).

This procedure provides a mechanism enabling the network manager to adaptively reset thresholds in response to changing conditions on the network, shifting usage patterns and evolving network topology. As the network changes over time, the network manager merely invokes the adaptive threshold setting feature and updates the thresholds to reflect those changes.

The Diagnostic Analyzer Module:

The Management Workstation includes a diagnostic analyzer module which automatically detects and diagnoses the existence and cause of certain types of network problems. The functions of the diagnostic module may actually be distributed among the Workstation and the Network Monitors which are active on the network. In principle, the diagnostic analyzer module includes the following elements for performing its fault detection and analysis functions.

The Management Workstation contains a reference model of a normally operating network. The reference model is generated by observing the performance of the network over an extended period of time and computing averages of the performance statistics that were observed during the observation period. The reference model provides a reference against which future network performance can be compared so as to diagnose and analyze potential problems. The Network Monitor (in particular, the STATS module) includes alarm thresholds on a selected set of the parameters which it monitors. Some of those thresholds are set on parameters which tend to be indicative of the onset or the presence of particular network problems.

During monitoring, when a Monitor threshold is exceeded, thereby indicating a potential problem (e.g. in a TCP connection), the Network Monitor alerts the Workstation by sending an alarm. The Workstation notifies the user and presents the user with the option of either ignoring the alarm or invoking a diagnostic algorithm to analyze the problem. If the user invokes the diagnostic algorithm, the Workstation compares the current performance statistics to its reference model to analyze the problem and report its results. (Of course, this may also be handled automatically so as to not require user intervention.) The Workstation obtains the data on current performance of the network by retrieving the relevant performance statistics from all of the segment Network Monitors that may have information useful to diagnosing the problem.

The details of a specific example involving poor TCP connection performance will now be described. This example refers to a typical network on which the diagnostic analyzer resides, such as the network illustrated in FIG. 25. It includes three segments labelled S1, S2, and S3, a router R1 connecting S1 to S2, a router R2 connecting S2 to S3, and at least two nodes, node A on S1 which communicates with node B on S3. On each segment there is also a Network Monitor 324 to observe the performance of its segment in the manner described earlier. A Management Workstation 320 is also located on S1 and it includes a diagnostic analyzer module 322. For this example, the symptom of the network problem is degraded performance of a TCP connection between Nodes A and B.

A TCP connection problem may manifest itself in a number of ways, including, for example, excessively high numbers for any of the following:

errors
  packets with bad sequence numbers
  packets retransmitted
  bytes retransmitted
  out of order packets
  out of order bytes
  packets after window closed
  bytes after window closed
  average and maximum round trip times or by an unusually low value for the current window size. By setting the appropriate thresholds, the Monitor is programmed to recognize any one or more of these symptons. If any one of the thresholds is exceeded, the Monitor sends an alarm to the Workstation. The Workstation is programmed to recognize the particular alarm as related to an event which can be further analyzed by its diagnostic analyzer module 322. Thus, the Workstation presents the user with the option of invoking its diagnostic capabilities (or automatically invokes the diagnostic capabilities).

In general terms, when the diagnostic analyzer is invoked, it looks at the performance data that the segment Monitors produce for the two nodes, for the dialogs between them and for the links that interconnect them and compares that data to the reference model for the network. If a significant divergence from the reference model is identified, the diagnostic analyzer informs the Workstation (and the user) about the nature of the divergence and the likely cause of the problem. In conducting the comparison to "normal" network performance, the network circuit involved in communications between nodes A and B is decomposed into its individual components and diagnostic analysis is performed on each link individually in the effort to isolate the problem further.

The overall structure of the diagnostic algorithm 400 is shown in FIG. 26. When invoked for analyzing a possible TCP problem between nodes A and B, diagnostic analyzer 322 checks for a TCP problem at node A when it is acting as a source node (step 402). To perform this check, diagnostic algorithm 400 invokes a source node analyzer algorithm 450 shown in FIG. 27. If a problem is identified, the Workstation reports that there is a high probability that node A is causing a TCP problem when operating as a source node and it reports the results of the investigation performed by algorithm 450 (step 404).

If node A does not appear to be experiencing a TCP problem when acting as a source node, diagnostic analyzer 322 checks for evidence of a TCP problem at node B when it is acting as a sink node (step 406). To perform this check, diagnostic algorithm 400 invokes a sink node analyzer algorithm 470 shown in FIG. 28. If a problem is identified, the Workstation reports that there is a high probability that node B is causing a TCP problem when operating as a sink node and it reports the results of the investigation performed by algorithm 470 (step 408).

Note that source and sink nodes are concepts which apply to those dialogs for which a direction of the communication can be defined. For example, the source node may be the one which initiated the dialog for the purpose of sending data to the other node, i.e., the sink node.

If node B does not appear to be experiencing a TCP problem when acting as a sink node, diagnostic analyzer 322 checks for evidence of a TCP problem on the link between Node A and Node B (step 410). To perform this check, diagnostic algorithm 400 invokes a link analysis algorithm 550 shown in FIG. 29. If a problem is identified, the Workstation reports that there is a high probability that a TCP problem exists on the link and it reports the results of the investigation performed by link analysis algorithm 550 (step 412).

If the link does not appear to be experiencing a TCP problem, diagnostic analyzer 322 checks for evidence of a TCP problem at node B when it is acting as a source node (step 414). To perform this check, diagnostic algorithm 400 invokes the previously mentioned source algorithm 450 for Node B. If a problem is identified, the Workstation reports that there is a medium probability that node B is causing a TCP problem when operating as a source node and it reports the results of the investigation performed by algorithm 450 (step 416).

If node B does not appear to be experiencing a TCP problem when acting as a source node, diagnostic analyzer 322 checks for a TCP problem at node A when it is acting as a sink node (step 418). To perform this check, diagnostic algorithm 400 invokes sink node analyzer algorithm 470 for Node A. If a problem is identified, the Network Monitor reports that there is a medium probability that node A is causing a TCP problem when operating as a sink node and it reports the results of the investigation performed by algorithm 470 (step 420).

Finally, if node A does not appear to be experiencing a TCP problem when acting as a sink node, diagnostic analyzer 322 reports that it was not able to isolate the cause of a TCP problem (step 422).

The algorithms which are called from within the above-described diagnostic algorithm will now be described.

Referring to FIG. 27, source node analyzer algorithm 450 checks whether a particular node is causing a TCP problem when operating as a source node. The strategy is as follows. To determine whether a TCP problem exists at this node which is the source node for the TCP connection, look at other connections for which this node is a source. If other TCP connections are okay, then there is probably not a problem with this node. This is an easy check with a high probability of being correct. If no other good connections exist, then look at the lower layers for possible reasons. Start at DLL and work up as problems at lower layers are more fundamental, i.e., they cause problems at higher layers whereas the reverse is not true.

In accordance with this approach, algorithm 450 first determines whether the node is acting as a source node in any other TCP connection and, if so, whether the other connection is okay (step 452). If the node is performing satisfactorily as a source node in another TCP connection, algorithm 450 reports that there is no problem at the source node and returns to diagnostic algorithm 400 (step 454). If algorithm 450 cannot identify any other TCP connections involving this node that are okay, it moves up through the protocol stack checking each level for a problem. In this case, it then checks for DLL problems at the node when it is acting as a source node by calling an DLL problem checking routine 510 (see FIG. 30) (step 456). If a DLL problem is found, that fact is reported (step 458). If no DLL problems are found, algorithm 450 checks for an IP problem at the node when it is acting as a source by calling an IP problem checking routine 490 (see FIG. 31) (step 460). If an IP problem is found, that fact is reported (step 462). If no IP problems are found, algorithm 450 checks whether any other TCP connection in which the node participates as a source is not okay (step 464). If another TCP connection involving the node exists and it is not okay, algorithm 450 reports a TCP problem at the node (step 466). If no other TCP connections where the node is acting as a source node can be found, algorithm 450 exits.

Referring to FIG. 28, sink node analyzer algorithm 470 checks whether a particular node is causing a TCP problem when operating as a sink node. It first determines whether the node is acting as a sink node in any other TCP connection and, if so, whether the other connection is okay (step 472). If the node is performing satisfactorily as a sink node in another TCP connection, algorithm 470 reports that there is no problem at the source node and returns to diagnostic algorithm 400 (step 474). If algorithm 470 cannot identify any other TCP connections involving this node that are okay, it then checks for DLL problems at the node when it is acting as a sink node by calling DLL problem checking routine 510 (step 476). If a DLL problem is found, that fact is reported (step 478). If no DLL problems are found, algorithm 470 checks for an IP problem at the node when it is acting as a sink by calling IP problem checking routine 490 (step 480). If an IP problem is found, that fact is reported (step 482). If no IP problems are found, algorithm 470 checks whether any other TCP connection in which the node participates as a sink is not okay (step 484). If another TCP connection involving the node as a sink exists and it is not okay, algorithm 470 reports a TCP problem at the node (step 486). If no other TCP connections where the node is acting as a sink node can be found, algorithm 470 exits.

Referring to FIG. 31, IP problem checking routine 490 checks for IP problems at a node. It does this by comparing the IP performance statistics for the node to the reference model (steps 492 and 494). If it detects any significant deviations from the reference model, it reports that there is an IP problem at the node (step 496). If no significant deviations are noted, it reports that there is no IP problem at the node (step 498).

As revealed by examining FIG. 30, DLL problem checking routine 510 operates in a similar manner to IP problem checking routine 490, with the exception that it examines a different set of parameters (i.e., DLL parameters) for significant deviations.

Referring the FIG. 29, link analysis logic 550 first determines whether any other TCP connection for the link is operating properly (step 552). If a properly operating TCP connection exists on the link, indicating that there is no link problem, link analysis logic 550 reports that the link is okay (step 554). If a properly operating TCP connection cannot be found, the link is decomposed into its constituent components and an IP link component problem checking routine 570 (see FIG. 32) is invoked for each of the link components (step 556). IP link component problem routine 570 evaluates the link component by checking the IP layer statistics for the relevant link component.

The decomposition of the link into its components arranges them in order of their distance from the source node and the analysis of the components proceeds in that order. Thus, for example, the link components which make up the link between nodes A and B include in order: segment S1, router R1, segment S2, router R2, and segment S3. The IP data for these various components are analyzed in the following order:

IP data for segment S1
IP data for address R1
IP data for source node to R1
IP data for S1 to S2
IP data for S2
IP data for address R2
IP data for S3
IP data for S2 to S3
IP data for S1 to S3

As shown in FIG. 32, IP link component problem checking routine 570 compares IP statistics for the link component to the reference model (step 572) to determine whether network performance deviates significantly from that specified by the model (step 574). If significant deviations are detected, routine 570 reports that there is an IP problem at the link component (step 576). Otherwise, it reports that it found no IP problem (step 578).

Referring back to FIG. 29, after completing the IP problem analysis for all of the link components, logic 550 then invokes a DLL link component problem checking routine 580 (see FIG. 33) for each link component to check its DLL statistics (step 558).

DLL link problem routine 580 is similar to IP link problem routine 570. As shown in FIG. 33, DLL link problem checking routine 580 compares DLL statistics for the link to the reference model (step 582) to determine whether network performance at the DLL deviates significantly from that specified by the model (step 584). If significant deviations are detected, routine 580 reports that there is a DLL problem at the link component (step 586). Otherwise, it reports that no DLL problems were found (step 588).

Referring back to FIG. 29, after completing the DLL problem analysis for all of the link components, logic 550 checks whether there is any other TCP on the link (step 560). If another TCP exists on the link (which implies that the other TCP is also not operating properly), logic 550 reports that there is a TCP problem on the link (step 562). Otherwise, logic 550 reports that there was not enough information from the existing packet traffic to determine whether there was a link problem (step 564)

If the analysis of the link components does not isolate the source of the problem and if there were components for which sufficient information was not available (due possibly to lack of traffic over through that component), the user may send test messages to those components to generate the information needed to evaluate its performance.

The reference model against which comparisons are made to detect and isolate malfunctions may be generated by examining the behavior of the network over an extended period of operation or over multiple periods of operation. During those periods of operation, average values and maximum excursions (or standard deviations) for observed statistics are computed. These values provide an initial estimate of a model of a properly functioning system. As more experience with the network is obtained and as more historical data on the various statistics is accumulated the thresholds for detecting actual malfunctions or imminent malfunctions and the reference model can be revised to reflect the new experience.

What constitutes at significant deviation from the reference model depends upon the particular parameter involved. Some parameters will not deviate from the expected norm and thus any deviation would be considered to be significant, for example, consider ICMP messages of type "destination unreachable," IP errors, TCP errors. Other parameters will normally vary within a wide range of acceptable values, and only if they move outside of that range should the deviation be considered significant. The acceptable ranges of variation can be determined by watching network performance over a sustained period of operation.

The parameters which tend to provide useful information for identifying and isolating problems at the node level for the different protocols and layers include the following.

TCP
  error rate
  header byte rate
  packets retransmitted
  bytes retransmitted
  packets after window closed
  bytes after window closed
UDP
  error rate
  header byte rate
IP
  error rate
  header byte rate
  fragmentation rate
  all ICMP messages of type destination
    unreachable, parameter problem,
    redirection
DLL
  error rate
  runts For diagnosing network segment problems, the above-identified parameters are also useful with the addition of the alignment rate and the collision rate at the DLL. All or some subset of these parameters may be included among the set of parameters which are examined during the diagnostic procedure to detect and isolate network problems.

The above-described technique can be applied to a wide range of problems on the network, including among others, the following:

TCP Connection fails to establish
  UDP Connection performs poorly
  UDP not working at all
  IP poor performance/high error rate
  IP not working at all
  DLL poor performance/high error rate
  DLL not working at all For each of these problems, the diagnostic approach would be similar to that described above, using, of course, different parameters to identify the potential problem and isolate its cause.

The Event Timing Module

Referring again to FIG. 5, the RTP is programmed to detect the occurrence of certain transactions for which timing information is desired. The transactions typically occur within a dialog at a particular layer of the protocol stack and they involve a first event (i.e., an initiating event) and a subsequent partner event or response. The events are protocol messages that arrive at the Network Monitor, are parsed by the RTP and then passed to Event Timing Module (ETM) for processing. A transaction of interest might be, for example, a read of a file on a server. In that case, the initiating event is the read request and the partner event is the read response. The time of interest is the time required to receive a response to the read request (i.e., the transaction time). The transaction time provides a useful measure of network performance and if measured at various times throughout the day under different load conditions gives a measure of how different loads affect network response times. The layer of the communication protocol at which the relevant dialog takes place will of course depend upon the nature of the event.

In general, when the RTP detects an event, it transfers control to the ETM which records an arrival time for the event. If the event is an initiating event, the ETM stores the arrival time in an event timing database 300 (see FIG. 34) for future use. If the event is a partner event, the ETM computes a difference between that arrival time and an earlier stored time for the initiating event to determine the complete transaction time.

Event timing database 300 is an array of records 302. Each record 302 includes a dialog field 304 for identifying the dialog over which the transactions of interest are occurring and it includes an entry type field 306 for identifying the event type of interest. Each record 302 also includes a start time field 308 for storing the arrival time of the initiating event and an average delay time field 310 for storing the computed average delay for the transactions. A more detailed description of the operation of the ETM follows.

Referring to FIG. 35, when the RTP detects the arrival of a packet of the type for which timing information is being kept, it passes control to the ETM along with relevant information from the packet, such as the dialog identifier and the event type (step 320). The ETM then determines whether it is to keep timing information for that particular event by checking the event timing database (step 322). Since each event type can have multiple occurrences (i.e., there can be multiple dialogs at a given layer), the dialog identifier is used to distinguish between events of the same type for different dialogs and to identify those for which information has been requested. All of the dialog/events of interest are identified in the event timing database. If the current dialog and event appear in the event timing database, indicating that the event should be timed, the ETM determines whether the event is a starting event or an ending event so that it may be processed properly (step 324). For certain events, the absence of a start time in the entry field of the appropriate record 302 in event timing database 300 is one indicator that the event represents a start time; otherwise, it is an end time event. For other events, the ETM determines if the start time is to be set by the event type as specified in the packet being parsed. For example, if the event is a file read a start time is stored. If the event is the read completion it represents an end time. In general, each protocol event will have its own intrinsic meaning for how to determine start and end times.

Note that the arrival time is only an estimate of the actual arrival time due to possible queuing and other processing delays. Nevertheless, the delays are generally so small in comparison to the transaction times being measured that they are of little consequence.

In step 324, if the event represents a start time, the ETM gets the current time from the kernal and stores it in start time field 308 of the appropriate record in event timing database 300 (step 326). If the event represents an end time event, the ETM obtains the current time from the kernel and computes a difference between that time and the corresponding start time found in event timing database 300 (step 328). This represents the total time for the transaction of interest. It is combined with the stored average transaction time to compute a new running average transaction time for that event (step 330).

Any one of many different methods can be used to compute the running average transaction time. For example, the following formula can be used:

New Avg.=[(5*stored Avg.)+Transaction Time]/6. After six transaction have been timed, the computed new average becomes a running average for the transaction times. The ETM stores this computed average in the appropriate record of event timing database 300, replacing the previous average transaction time stored in that record, and it clears start time entry field 308 for that record in preparation for timing the next transaction.

After processing the event in steps 322, 326, and 330, the ETM checks the age of all of the start time entries in the event timing database 300 to determine if any of them are too "old" (step 332). If the difference between the current time and any of the start times exceeds a preselected threshold, indicating that a partner event has not occurred within a reasonable period of time, the ETM deletes the old start time entry for that dialog/event (step 334). This insures that a missed packet for a partner event does not result in an erroneously large transaction time which throws off the running average for that event.

If the average transaction time increases beyond a preselected threshold set for timing events, an alarm is sent to the Workstation.

Two examples will now be described to illustrate the operation of the ETM for specific event types. In the first example, Node A of FIG. 25 is communicating with Node B using the NFS protocol. Node A is the client while Node B is the server. The Network Monitor resides on the same segment as node A, but this is not a requirement. When Node A issues a read request to Node B, the Network Monitor sees the request and the RTP within the Network Monitor transfers control to the ETM. Since it is a read, the ETM stores a start time in the Event Timing Database. Thus, the start time is the time at which the read was initiated.

After some delay, caused by the transmission delays of getting the read message to node B, node B performs the read and sends a response back to node A. After some further transmission delays in returning the read response, the Network Monitor receives the second packet for the event. At the time, the ETM recognizes that the event is an end time event and updates the average transaction time entry in the appropriate record with a new computed running average. The ETM then compares the average transaction time with the threshold for this event and if it has been exceeded, issues an alarm to the Workstation.

In the second example, node A is communicating with Node B using the Telnet protocol. Telnet is a virtual terminal protocol. The events of interest take place long after the initial connection has been established. Node A is typing at a standard ASCII (VT100 class) terminal which is logically (through the network) connected to Node B. Node B has an application which is receiving the characters being typed on Node A and, at appropriate times, indicated by the logic of the applications, sends characters back to the terminal located on Node A. Thus, every time node A sends characters to B, the Network Monitor sees the transmission.

In this case, there are several transaction times which could provide useful network performance information. They include, for example, the amount of time it takes to echo characters typed at the keyboard through the network and back to the display screen, the delay between typing an end of line command and seeing the completion of the application event come back or the network delays incurred in sending a packet and receiving acknowledgment for when it was received.

In this example, the particular time being measured is the time it takes for the network to send a packet and receive an acknowledgement that the packet has arrived. Since Telnet runs on top of TCP, which in turn runs on top of IP, the Network Monitor monitors the TCP acknowledge end-to-end time delays.

Note that this is a design choice of the implementation and that all events visible to the Network Monitor by virtue of the fact that information is in the packet could be measured.

When Node A transmits a data packet to Node B, the Network Monitor receives the packet. The RTP recognizes the packet as being part of a timed transaction and passes control to the ETM. The ETM recognizes it as a start time event, stores the start time in the event timing database and returns control to the RTP after checking for aging.

When Node B receives the data packet from Node A, it sends back an acknowledgment packet. When the Network Monitor sees that packet, it delivers the event to the ETM, which recognizes it as an end time event. The ETM calculates the delay time for the complete transaction and uses that to update the average transaction time. The ETM then compares the new average transaction time with the threshold for this event. If it has been exceeded, the ETM issues an alarm to the Workstation.

Note that this example is measuring something very different than the previous example. The first example measures the time it takes to traverse the network, perform an action and return that result to the requesting node. It measures performance as seen by the user and it includes delay times from the network as well as delay times from the File Server.

The second example is measuring network delays without looking at the service delays. That is, the ETM is measuring the amount of time it takes to send a packet to a node and receive the acknowledgement of the receipt of the message. In this example, the ETM is measuring transmissions delays as well as processing delays associated with network traffic, but not anything having to do with non-network processing.

As can be seen from the above examples, the ETM can measure a broad range of events. Each of these events can be measured passively and without the cooperation of the nodes that are actually participating in the transmission.

The Address Tracker Module (ATM)

Address tracker module (ATM) 43, one of the software modules in the Network Monitor (see FIG. 5), operates on networks on which the node addresses for particular node to node connections are assigned dynamically. An Appletalk® Network, developed by Apple Computer Company, is an example of a network which uses dynamic node addressing. In such networks, the dynamic change in the address of a particular service causes difficulty troubleshooting the network because the network manager may not know where the various nodes are and what they are called. In addition, foreign network addresses (e.g., the IP addresses used by that node for communication over an IP network to which if is connected) can not be relied upon to point to a particular node. ATM 43 solves this problem by passively monitoring the network traffic and collecting a table showing the node address to node name mappings.

In the following description, the network on which the Monitor is located is assumed to be an Appletalk® Network. Thus, as background for the following discussion, the manner in which the dynamic node addressing mechanism operates on that network will first be described.

When a node is activated on the Appletalk® Network, it establishes its own node address in accordance with protocol referred to as the Local Link Access Protocol (LLAP). That is, the node guesses its own node address and then verifies that no other node on the network is using that address. The node verifies the uniqueness of its guess by sending an LLAP Enquiry control packet informing all other nodes on the network that it is going to assign itself a particular address unless another node responds that the address has already been assigned. If no other node claims that address as its own by sending an LLAP acknowledgment control packet, the first node uses the address which it has selected. If another node claims the address as its own, the first node tries another address. This continues until, the node finds an unused address.

When the first node wants to communicate with a second node, it must determine the dynamically assigned node address of the second node. It does this in accordance with another protocol referred to as the Name Binding Protocol (NBP). The Name Binding Protocol is used to map or bind human understandable node names with machine understandable node addresses. The NBP allows nodes to dynamically translate a string of characters (i.e., a node name) into a node address. The node needing to communicate with another node broadcasts an NBP Lookup packet containing the name for which a node address is being requested. The node having the name being requested responds with its address and returns a Lookup Reply packet containing its address to the original requesting node. The first node then uses that address for its current communications with the second node.

Referring to FIG. 36, the network includes an Appletalk® Network segment 702 and a TCP/IP segment 704, each of which are connected to a larger network 706 through their respective gateways 708. A Monitor 710, including a Real Time Parser (RTP) 712 and an Address Tracking Module (ATM) 714, is located on Appletalk network segment 702 along with other nodes 711. A Management Workstation 716 is located on segment 704. It is assumed that Monitor 710 has the features and capabilities previously described; therefore, those features not specifically related to the dynamic node addressing capability will not be repeated here but rather the reader is referred to the earlier discussion. Suffice it to say that Monitor 710 is, of course, adapted to operate on Appletalk Network segment 702, to parse and analyze the packets which are transmitted over that segment according to the Appletalk® family of protocols and to communicate the information which it extracts from the network to Management Workstation 716 located on segment 704.

Within Monitor 710, ATM 714 maintains a name table data structure 720 such as is shown in FIG. 37. Name Table 720 includes records 722, each of which has a node name field 724, a node address field 726, an IP address field 728, and a time field 729. ATM 714 uses Name Table 720 to keep track of the mappings of node names to node address and to IP address. The relevance of each of the fields of records 722 in Name Table 720 are explained in the following description of how ATM 714 operates.

In general, Monitor 710 operates as previously described. That is, it passively monitors all packet traffic over segment 702 and sends all packets to RTP 712 for parsing. When RTP 712 recognizes an Appletalk packet, it transfers control to ATM 714 which analyzes the packet for the presence of address mapping information.

The operation of ATM 714 is shown in greater detail in the flow diagram of FIG. 38. When ATM 714 receives control from RTP 712, it takes the packet (step 730 and strips off the lower layers of the protocol until it determines whether there is a Name Binding Protocol message inside the packet (step 732). If it is a NBP message, ATM 714 then determines whether it is new name Lookup message (step 734). If it is a new name Lookup message, ATM 714 extracts the name from the message (i.e., the name for which a node address is being requested) and adds the name to the node name field 724 of a record 722 in Name Table 720 (step 736).

If the message is an NBP message but it is not a new name Lookup message, ATM 714 determines whether it is a Lookup Reply (step 738). If it is a Lookup Reply, signifying that it contains a node name/node address binding, ATM 714 extracts the name and the assigned node address from the message and adds this information to Name Table 720 (step 740). ATM 714 does this by searching the name fields of records 722 in Name Table 720 until it locates the name. Then, it updates the node address field of the identified record to contain the node address which was extracted from the received NBP packet. ATM 714 also updates time field 729 to record the time at which the message was processed.

After ATM 714 has updated the address field of the appropriate record, it determines whether any records 722 in Name Table 720 should be aged out (step 742). ATM 714 compares the current time to the times recorded in the time fields. If the elapsed time is greater than a preselected time period (e.g. 48 hours), ATM 714 clears the record of all information (step 744). After that, it awaits the next packet from RTP 712 (step 745).

As ATM 714 is processing a packet and it determines either that it does not contain an NBP message (step 732) or it does not contain a Lookup Reply message (step 738), ATM 714 branches to step 742 to perform the age out check before going on to the next packet from RTP 712.

The Appletalk to IP gateways provide services that allow an Appletalk Node to dynamically connect to an IP address for communicating with IP nodes. This service extends the dynamic node address mechanism to the IP world for all Appletalk nodes. While the flexibility provided is helpful to the users, the network manager is faced with the problem of not knowing which Appletalk Nodes are currently using a particular IP address and thus, they can not easily track down problems created by the particular node.

ATM 714 can use passive monitoring of the IP address assignment mechanisms to provide the network manager a Name-to-IP address mapping.

If ATM 714 is also keeping IP address information, it implements the additional steps shown in FIG. 39 after completing the node name to node address mapping steps. ATM 714 again checks whether it is an NBP message (step 748). If it is an NBP message, ATM 714 checks whether it is a response to an IP address request (step 750). IP address requests are typically implied by an NBP Lookup request for an IP gateway. The gateway responds by supplying the gateway address as well as an IP address that is assigned to the requesting node. If the NBP message is an IP address response, ATM 714 looks up the requesting node in Name Table 720 (step 752) and stores the IP address assignment in the IP address field of the appropriate record 722 (step 754).

After storing the IP address assignment information, ATM 714 locates all other records 722 in Name Table 720 which contain that IP address. Since the IP address has been assigned to a new node name, those old entries are no longer valid and must be eliminated. Therefore, ATM 714 purges the IP address fields of those records (step 756). After doing this cleanup step, ATM 714 returns control to RTP 712.

Other embodiments are within the following claims. For example, the Network Monitor can be adapted to identify node types by analyzing the type of packet traffic to or from the node. If the node being monitored is receiving mount requests, the Monitor would report that the node is behaving like node a file server. If the node is issuing routing requests, the Monitor would report that the node is behaving like a router. En either case, the network manager can check a table of what nodes are permitted to provide what functions to determine whether the node is authorized to function as either a file server or a router, and if not, can take appropriate action to correct the problem.

Appendix VI contains microfiche of the source code for an embodiment of the invention. The source code is presented in 32 files which may be grouped as follows:

| | |
|---|---|
| Group 1: | R_DLL.C; R_ICMP.C; R_IP.C; R_NFS.C; R_PMAP.C; R_RPC.C; R_TCP.C; R_UDP.C; RTP.C |
| Group 2: | S_DLL.H; S.H; S_ICMP.H; S_IP.H; S_NFS.H; S_PMAP.H; S_RPC.H; S_TCP.H; S_UDP.H |
| Group 3: | S_DLL_A.C; S_DLL_P.C; S_ICMP_A.C; S_ICMP_P.C; S_IP_A.C; S_IP_P.C; S_NFS_A.C; S_NFS_P.C; S_PMAP_P.C; S_TCP_A.C; S_TCP_P.C; S_UDP_A.C; S_UDP_P.C; STATS_P.C |

The nine files in Group 1 relate to the real time parser code and contain source code for modules that do the parsing and state machine processing. Macros for maintaining statistics also appear among these source code files. The nine files in Group 2 contain the source code that defines the structures which hold the information that is determined during parsing. Among these files, the S.H file contains the base macros for maintaining the statistics. Finally, the remaining 14 files in Group 3 contain code that locates, allocates and deallocates the structures defined by the files found in Group 2. The source code in this group also contains the code that calculates the rates and ages out the data structures that have not been used within a timeout period.

The source code is written in C language. It may be compiled by a MIPS R3000 C compiler (Ver. 2.2) and run on a MIPS 3230 workstation which has a RISC-os operating system (MIPS products are available from MIPS Computer Systems, Inc. of Sunnyvale, Calif.).

We claim:

1. A method for monitoring a plurality of communication dialogs occurring in a network of nodes, each dialog of said plurality of dialogs being effected by a transmission of one or more packets among two or more communicating nodes, each dialog of said plurality of dialogs complying with a different predefined communication protocol selected from among a plurality of protocols available in said network, said plurality of dialogs representing multiple different protocols from among said plurality of available protocols, said method comprising:

passively, in real time, and on an ongoing basis, detecting the contents of packets;

from the detected contents of said packets, identifying all of the dialogs of said plurality of communication dialogs occurring in said network;

deriving from said detected contents of said packets, information about the identified dialogs; and for each of the identified dialogs, storing the derived information about that identified dialog.

2. The method of claim 1 wherein the derived information is information about the states of the identified dialogs.

3. The method of claim 2 wherein said step of deriving information about the states of dialogs comprises;

maintaining a current state for each dialog; and updating the current state in response to the detected contents of packets detected at a later time.

4. The method of claim 2 wherein said step of deriving information about the states of dialogs comprises:

maintaining, for each dialog, a history of events based on information derived from the contents of packets; and analyzing the history of events to derive information about the dialog.

5. The method of claim 4 wherein said step of analyzing the history includes counting events.

6. The method of claim 4 wherein said step of analyzing the history includes gathering statistics about events.

7. The method of claim 4 further comprising:

monitoring the history of events for dialogs which are inactive; and purging from the history of events dialogs which have been inactive for a predetermined period of time.

8. The method of claim 3 wherein said step of deriving information about the states of dialogs comprises updating said current state in response to observing the transmission of at least two data related packets between nodes.

9. The method of claim 4 wherein said step of analyzing the history of events comprises:

analyzing sequence numbers of data related packets stored in said history of events; and detecting retransmissions based on said sequence numbers.

10. The method of claim 3 further comprising:

updating the current state based on each new packet associated with said dialog; and if an updated current state cannot be determined, consulting information about prior packets associated with said dialog as an aid in updating said state.

11. The method of claim 4 further comprising searching said history of events to identify the initiator of a dialog.

12. The method of claim 4, further comprising searching the history of events for packets which have been retransmitted.

13. The method of claim 3 wherein the full set of packets associated with a dialog up to a point in time completely define a true state of the dialog at that point in time, said step of updating the current state in response to the detected contents of transmitted packets comprises generating a current state which may not conform to the true state.

14. The method of claim 4 wherein the step of updating the current state comprises updating the current state to indicate that it is unknown.

15. The method of claim 13 further comprising updating the current state to the true state based on information about prior packets transmitted in the dialog.

16. The method of claim 14 further comprising updating the current state to the true state based on information about prior packets transmitted in the dialog.

17. The method of claim 2 wherein said step of deriving information about the states of dialogs occurring in said network comprises parsing said packets in accordance with more than one but fewer than all layers of a corresponding communication protocol.

18. The method of claim 1 is wherein each said communication protocol includes multiple layers, and each dialog complies with one of said layers.

19. The method of claim 2 wherein said multiple different protocols include a connectionless-type protocol in which the state of a dialog is implicit in transmitted packets, and said step of deriving information about the states of dialogs includes inferring the states of said dialogs from said packets.

20. The method of claim 3 further comprising:

parsing said packets in accordance with a corresponding communication protocol; and temporarily suspending parsing of some layers of said protocol when parsing is not rapid enough to match the rate of packets to be parsed.

21. The method of claim 1 further comprising storing the derived communication information in a database.

22. The method of claim 21 further comprising, in response to an inquiry from a remotely located entity, retrieving from the database data regarding communications about which communication information had previously been detected and stored and sending the retrieved data to said remotely located entity.

23. The method of claim 1 wherein said multiple different protocols include protocols for different layers of a protocol stack as well as protocols for different protocol stacks.

24. Apparatus for monitoring a plurality of communication dialogs which occur in a network of nodes, each dialog of said plurality of dialogs being effected by a transmission of one or more packets among two or more communicating nodes, each dialog of said plurality of dialogs complying with a different predefined communication protocol selected from among a plurality of protocols available in said network, said plurality of dialogs representing multiple different protocols from among said plurality of available protocols, said apparatus comprising:

a monitor connected to the network medium, said monitor programmed to perform the tasks of passively, in real time, and on an ongoing basis: (1) monitoring transmitted packets; (2) from the monitored packets, identifying all of the dialogs of said plurality of communication dialogs; (3) from the monitored packets, deriving communication information associated with said plurality of communication dialogs; and (4) for each of the identified dialogs, storing the communication information about that identified dialog that is derived from said monitored packets; and a workstation for receiving said information about dialogs from said monitor and providing an interface through which said communication information about the identified dialogs is displayed to a user.

25. The apparatus of claim 24 wherein said workstation further comprises means for enabling a user to observe events of active dialogs.

* * * * *